United States Patent
Mischel, Jr. et al.

(10) Patent No.: US 12,474,889 B1
(45) Date of Patent: Nov. 18, 2025

(54) APPARATUSES AND METHODS FOR AN INTERACTIVE DEVICE

(71) Applicant: ELECTRIC MIRROR, LLC, Everett, WA (US)

(72) Inventors: James V. Mischel, Jr., Seattle, WA (US); Robert Larry Zerr, Marysville, WA (US); Richard Allen Lindsay, Mukilteo, WA (US); Phillip Gabriel Tapia, Lake Stevens, WA (US)

(73) Assignee: ELECTRIC MIRROR, LLC, Everett, WA (US)

( * ) Notice: Subject to any disclaimer, the term of this patent is extended or adjusted under 35 U.S.C. 154(b) by 1335 days.

(21) Appl. No.: 15/953,255

(22) Filed: Apr. 13, 2018

Related U.S. Application Data

(60) Provisional application No. 62/656,973, filed on Apr. 12, 2018, provisional application No. 62/488,766, (Continued)

(51) Int. Cl.
*G06F 3/048* (2013.01)
*G06F 3/16* (2006.01)
(Continued)

(52) U.S. Cl.
CPC .......... *G06F 3/167* (2013.01); *G06Q 50/12* (2013.01); *H05B 47/19* (2020.01)

(58) Field of Classification Search
CPC ........ G06F 3/167; H05B 47/19; G06Q 50/12; G01C 21/3608; G10L 15/26
See application file for complete search history.

(56) References Cited

U.S. PATENT DOCUMENTS

| 12,333,512 B2 * | 6/2025 | Cella ................ G02B 26/00 |
| 2004/0117275 A1 * | 6/2004 | Billera ............... G06Q 10/02 |
| | | 705/28 |

(Continued)

OTHER PUBLICATIONS

L. Zhongxiu, "Electronic Commerce Application in Tourism Agents," 2012 Second International Conference on Business Computing and Global Informatization, 2012, pp. 828-831, doi: 10.1109/BCGIN.2012.221. (Year: 2012).*

*Primary Examiner* — David Phantana-angkool
(74) *Attorney, Agent, or Firm* — PELOQUIN, PLLC; Mark S. Peloquin, Esq.

(57) ABSTRACT

A method includes receiving acoustic signals from a user. The acoustic signals are transformed into data. The data are transmitted to a voice-to-text conversion and artificial intelligence system over a network. Information is received from the voice-to-text conversion and artificial intelligence system. The information was obtained from the data and the information is used to create a request to a hotel. A computer readable medium contains executable computer program instructions, which when executed by a data processing system, cause the data processing system to perform a process that includes; receiving acoustic signals from a user; transforming the acoustic signals into data; transmitting the data to a voice-to-text conversion and artificial intelligence system over a network; receiving information from the voice-to-text conversion and artificial intelligence system, wherein the information was obtained from the data; and using the information to create a request to a hotel through a hotel information system.

27 Claims, 42 Drawing Sheets

Related U.S. Application Data filed on Apr. 23, 2017, provisional application No. 62/488,782, filed on Apr. 23, 2017, provisional application No. 62/484,923, filed on Apr. 13, 2017.

(51) Int. Cl.
*G06Q 50/12* (2012.01)
*H05B 47/19* (2020.01)

(56) References Cited

U.S. PATENT DOCUMENTS

| | | | |
|---|---|---|---|
| 2009/0210262 A1* | 8/2009 | Rines | G06Q 10/06 705/5 |
| 2011/0060480 A1* | 3/2011 | Mottla | G07C 9/00571 701/2 |
| 2011/0302420 A1* | 12/2011 | Davida | G06V 40/10 713/180 |
| 2014/0114706 A1* | 4/2014 | Blakely | G06Q 10/02 705/5 |
| 2014/0280757 A1* | 9/2014 | Tran | H04L 67/02 709/219 |
| 2016/0370197 A1* | 12/2016 | Miller | G06Q 10/02 |
| 2017/0251035 A1* | 8/2017 | Siminoff | G08B 27/003 |
| 2017/0323638 A1* | 11/2017 | Malinowski | G10L 15/083 |
| 2018/0172262 A1* | 6/2018 | Garcia | A45D 42/10 |
| 2018/0254967 A1* | 9/2018 | Srivastava | H04L 43/10 |
| 2024/0129493 A1* | 4/2024 | Emmanuel | G06F 9/542 |
| 2024/0310900 A1* | 9/2024 | Kocienda | G06V 20/50 |
| 2024/0420846 A1* | 12/2024 | Hernandez | G16H 20/70 |
| 2025/0199512 A1* | 6/2025 | Cella | G06Q 30/0206 |

* cited by examiner

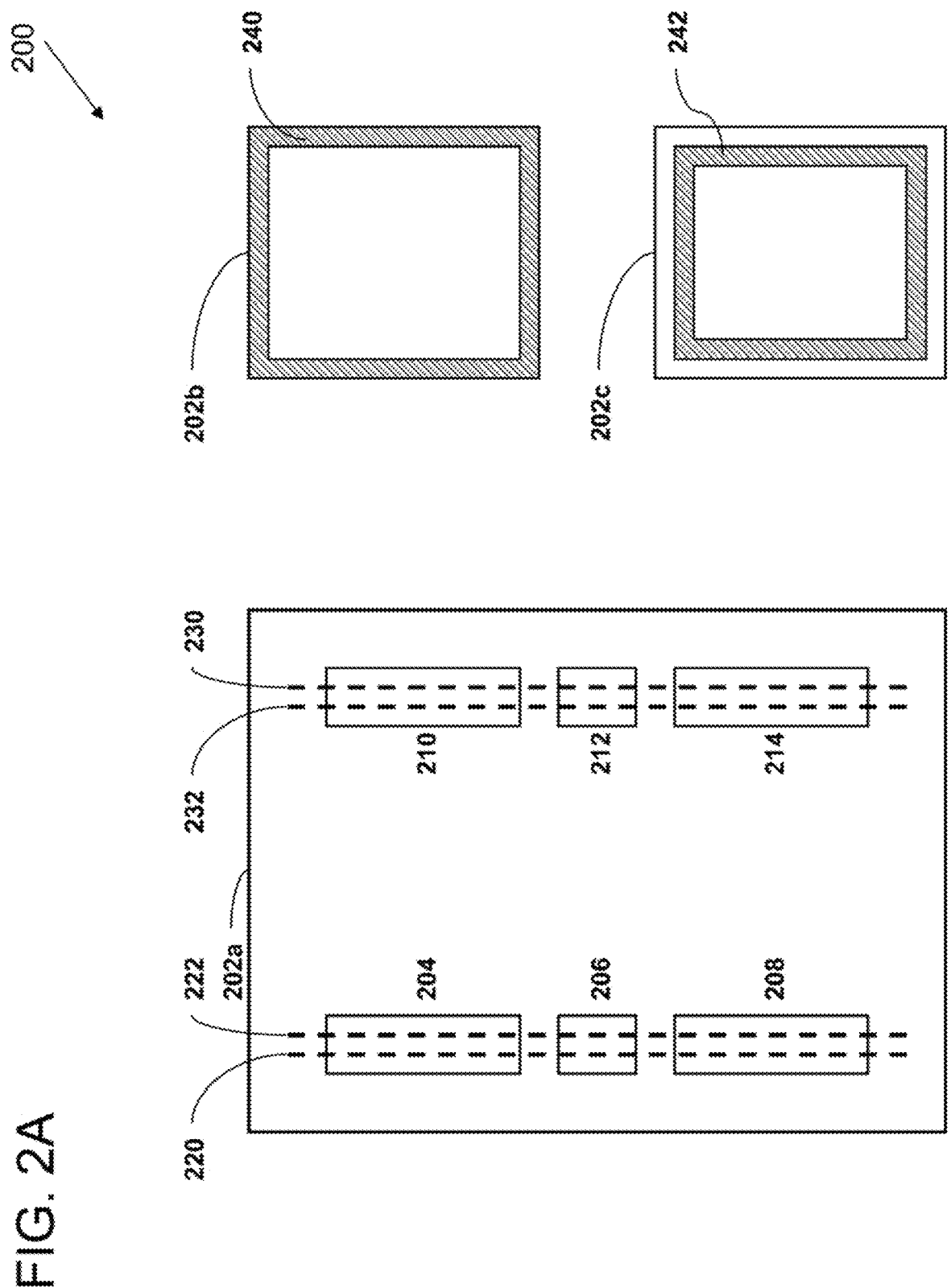

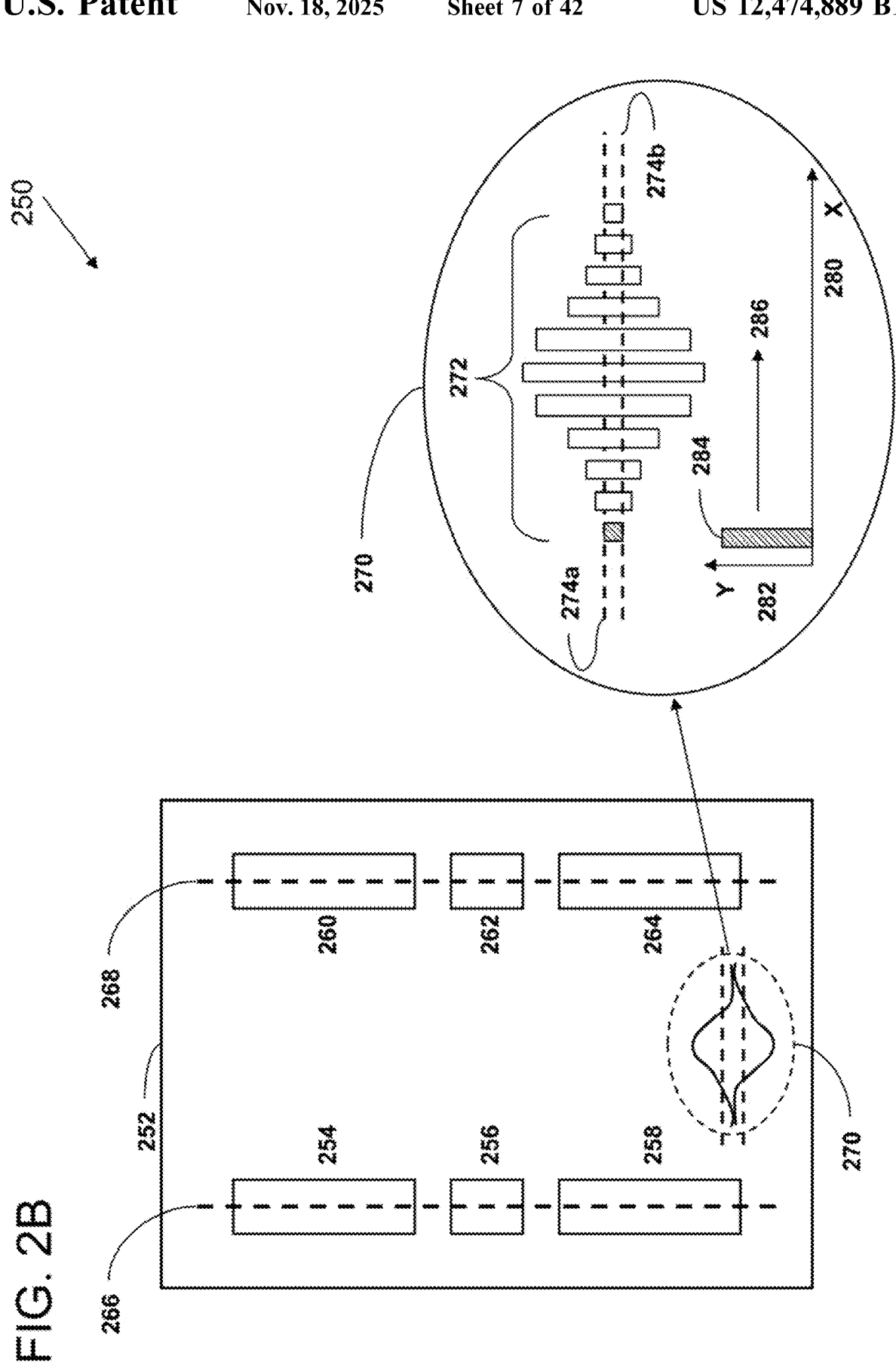

FIG. 3B

| # | STATE | VISUAL FEEDBACK | COLOR |
|---|---|---|---|
| 1 | DEFAULT | COLOR #1 | GREEN |
| 2 | LISTEN | FADE TO COLOR #2 | BLUE |
| 3 | USER VOICE INTERACTION | HOLD COLOR #2 | BLUE |
| 4 | THINKING | MODULATE COLOR #1 & COLOR #2 | BLUE & GREEN |
| 5 | RESPONSE | COLOR #3 | YELLOW |
| 6 | ERROR | COLOR #4 | RED |

DEVICE PROVIDED VISUAL FEEDBACK

350

302
304
306
308
314
318

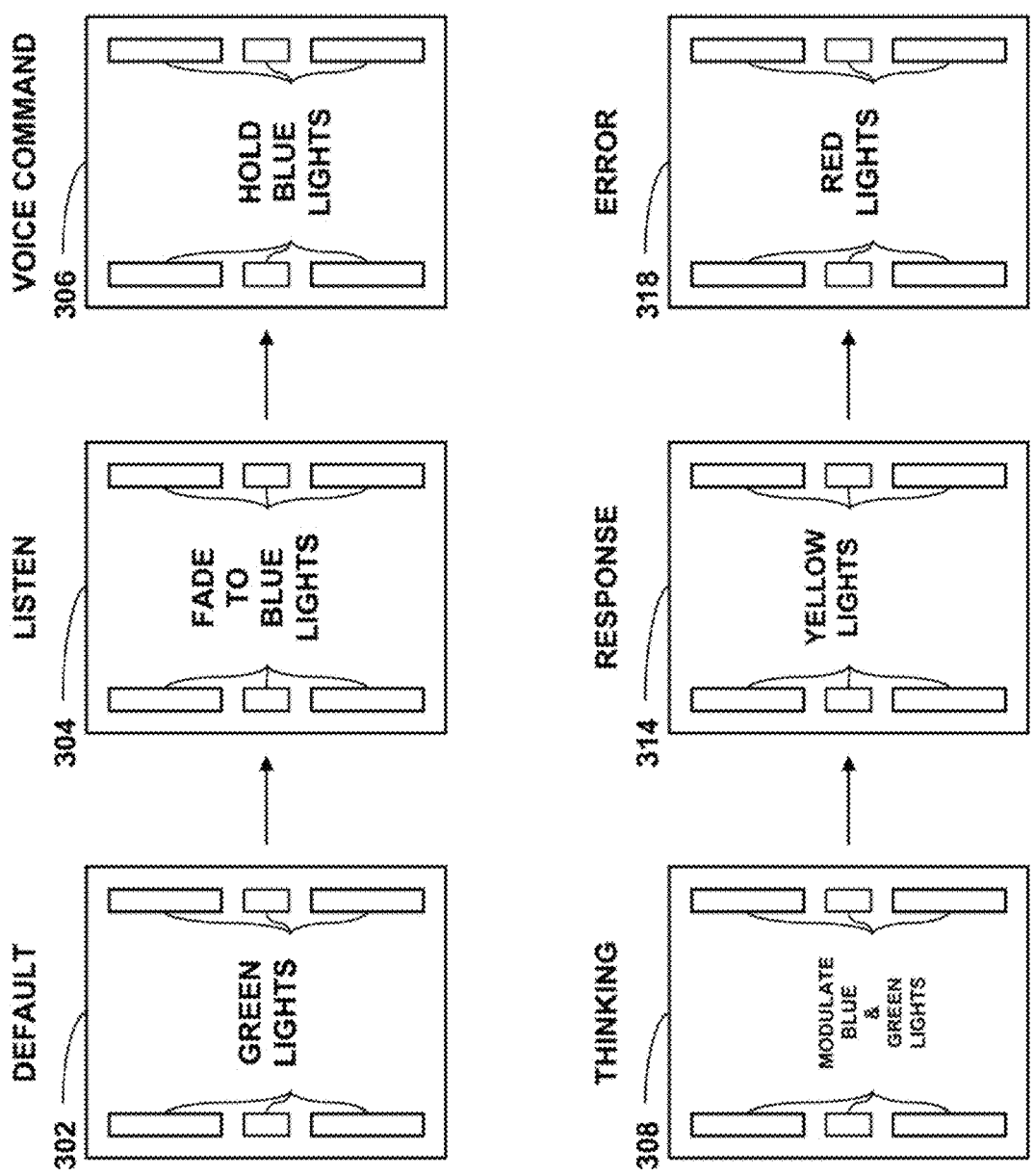

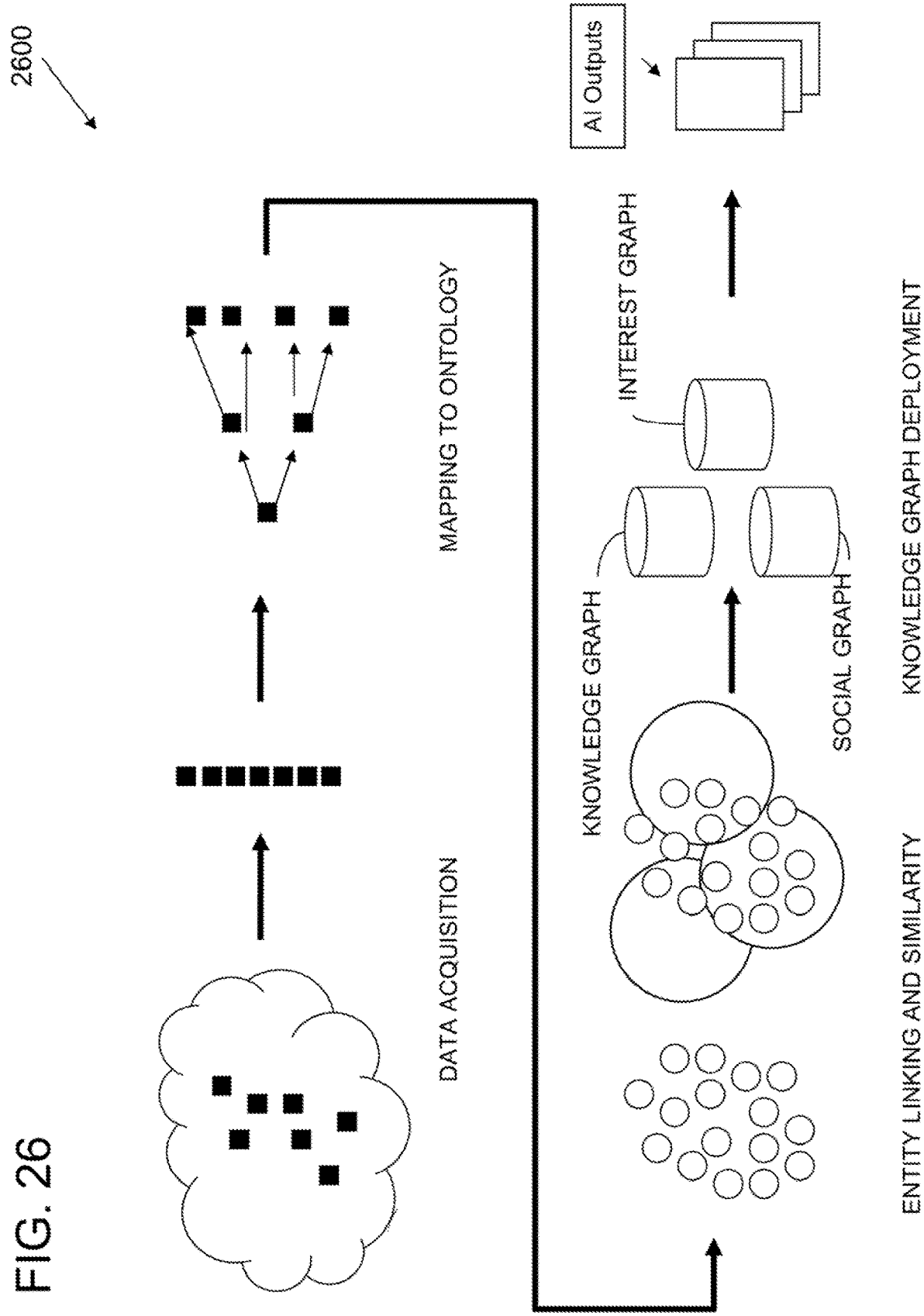

APPARATUSES AND METHODS FOR AN INTERACTIVE DEVICE

RELATED APPLICATIONS

This application claims priority from U.S. Provisional Patent Application No. 62/656,973 entitled "APPARATUSES AND METHODS FOR AN INTERACTIVE DEVICE," filed on Apr. 12, 2018. U.S. provisional patent application No. 62/656,973 entitled "APPARATUSES AND METHODS FOR AN INTERACTIVE DEVICE." is hereby fully incorporated by reference. This application claims priority from U.S. Provisional Patent Application No. 62/488,782 entitled "APPARATUSES AND METHODS FOR AN INTERACTIVE DEVICE," filed on Apr. 23, 2017. U.S. provisional patent application No. 62/488,782 entitled "APPARATUSES AND METHODS FOR AN INTERACTIVE DEVICE," is hereby fully incorporated by reference. This application claims priority from U.S. Provisional Patent Application No. 62/488,766 entitled "APPARATUSES AND METHODS FOR AN INTERACTIVE DEVICE," filed on Apr. 23, 2017. US provisional patent application No. 62/488,766 entitled "APPARATUSES AND METHODS FOR AN INTERACTIVE DEVICE," is hereby fully incorporated by reference. This application claims priority from U.S. Provisional Patent Application No. 62/484,923 entitled "APPARATUSES AND METHODS FOR AN INTERACTIVE MIRROR," filed on Apr. 13, 2017. US provisional patent application No. 62/484,923 entitled "APPARATUSES AND METHODS FOR AN INTERACTIVE MIRROR," is hereby fully incorporated by reference.

BACKGROUND OF THE INVENTION

1. Technical Field

The invention relates generally to interactive devices, and for example to apparatuses, methods, and systems for creating network connected artificially intelligent interactive devices for hospitality environments and environments associated with a building.

2. Background

At times, modern life is complex and proceeds at a fast pace, placing people under the constraint of time. Thus, people are often pressed for time. It is during these times that parallel processing of tasks is often required and inconveniences are presented thereby. Thus, a problem exists that requires a technical solution that uses a technical means to produce a technical effect.

BRIEF DESCRIPTION OF THE DRAWINGS

The invention may best be understood by referring to the following description and accompanying drawings that are used to illustrate embodiments of the invention. The invention is illustrated by way of example in the embodiments and is not limited in the figures of the accompanying drawings, in which like references indicate similar elements.

FIG. 2A illustrates displaying visual feedback from an intelligent voice interactive device, according to embodiments of the invention.

FIG. 2B illustrates displaying visual feedback from an intelligent voice interactive device, according to additional embodiments of the invention.

FIG. 3B illustrates visual feedback states, according to embodiments of the invention.

FIG. 4 illustrates communicating visual feedback, according to embodiments of the invention.

FIG. 26 illustrates an Artificial Intelligence (AI) process according to embodiments of the invention.

DETAILED DESCRIPTION

Figure 1A:
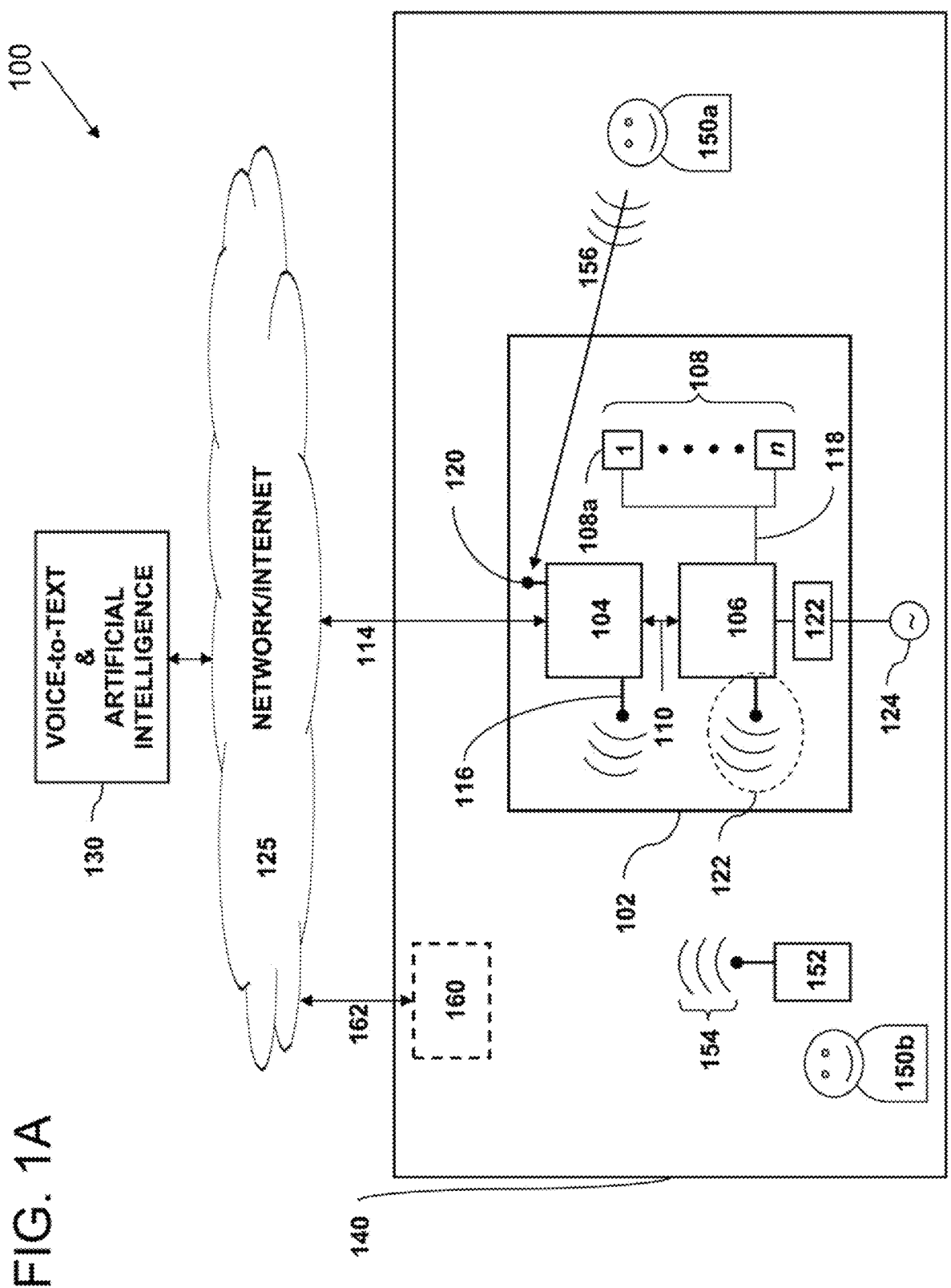
FIG. 1A illustrates architecture for an intelligent voice interactive device, according to embodiments of the invention.

In the following detailed description of embodiments of the invention, reference is made to the accompanying drawings, in which like references indicate similar elements, and in which is shown by way of illustration, specific embodiments in which the invention may be practiced. These embodiments are described in sufficient detail to enable those of skill in the art to practice the invention. In other instances, well-known circuits, structures, and techniques have not been shown in detail in order not to obscure the understanding of this description. The following detailed description is, therefore, not to be taken in a limiting sense, and the scope of the invention is defined only by the appended claims.

In one or more embodiments, methods, apparatuses, and systems are described, that provide interactive artificially intelligent devices for use in a hospitality environment or an environment associated with a building. Interactive artificially intelligent devices are described which include network connected devices, touch interaction devices, voice interaction devices, and both touch and voice interaction devices, all of which can be network connected or cloud connected. As used in this description of embodiments, "cloud" connected refers to being connected to a wide area network such as the Internet. As used in this description of embodiments, a hospitality environment is understood to include a hotel, a motel, a civic center, an art center, etc. An indoor environment is understood to include any indoor environment such as a residential home, a school, a business, a commercial building, etc. In the description of embodiments that follow, any example given for one environment, such as a hospitality environment using a hotel as an example, is applicable to use in another environment such as a commercial environment or a residential home environment. In some embodiments, multiple environments are combined together, such as, for example, a hotel environment can be combined with a commercial environment or a residential environment or all three environments can be combined together in an integrated networked system. Those of skill in the art will understand that when an example is applied to the home environment fewer elements might be used relative to the number of elements needed in a hospitality environment or other commercial environment.

Interactive Device Uses & Form Factors

Embodiments of intelligent interactive devices are used with buildings of any type, such as, but not limited to; commercial buildings, fitness buildings, retail buildings residential building, public buildings, uses involving public spaces. While some examples of intelligent interactive device applications to buildings, uses or form factors are given in the context of hospitality industry examples, it will be understood that such examples are equally applicable in other buildings such as public, residential or the like. Thus, no limitation is implied by the use of hospitality examples.

Some further examples of uses within the hospitality industry are, but are not limited to: hotels, motels, guestrooms, restaurant and eating areas, e.g., snack bar and pool areas, bathrooms, lobby areas, exercise areas, recreational areas, parking areas, elevators, and elevator entry areas. Within a guest room, various embodiments are used on; entry ways, on walls, on desks, on or in vanities, etc.

Some further examples of uses within retail locations are, but are not limited to; any department of a department store, for example, the make-up department, the eyewear department, the jewelry department, etc.

Some further examples of uses within commercial buildings are museums, libraries, etc.

The intelligent interactive devices described herein, can be packaged into different form factors to meet a variety of uses by different users. In various embodiments, an intelligent interactive device is an intelligent interactive mirror. While descriptions of an intelligent interactive mirror are given at times in this description of embodiments, it will be understood that such descriptions are not limited to an intelligent interactive mirror and are readily applicable to intelligent interactive devices that are not configured as mirrors.

In various embodiments, an intelligent interactive mirror can be used as a wall mounted mirror in a hotel room. For example, a wall mounted mirror used in a hotel bathroom, a hotel bedroom, or in a living area of a hotel suite. Additionally, an intelligent interactive mirror is used in common areas of a hotel such as a pool area, a workout area, a snack bar, a cafe, a restaurant, etc. or in the administration areas of the hotel. These locations and uses are provided merely for illustration and do not limit different embodiments.

In other embodiments, an intelligent interactive mirror is provided in free standing format without the need for wall mounting. Free standing format includes, but is not limited to, mirrors that sit on a table or a counter, or a mirror which is supported by the ground.

In other embodiments, an intelligent interactive mirror includes a makeup mirror which is either free standing or wall mounted. Additionally, intelligent interactive mirrors are packaged into form factors which include, but are not limited to; mirrors with lights, mirrors with frames, mirrors with frames and lights, mirrors without frames, wardrobe mirrors, medicine cabinet mirrors, corridor mirrors, light box mirrors, a mirror with chassis, and a mirror without a chassis.

Intelligent interactive mirrors are made in a wide variety of sizes from less than a square foot in area to many square feet in area to wall covering mirrors. When information displays (screens) (either touch or non-touch) are included in an intelligent interactive mirror as described below, the size varies with the desired application and function. Some examples of display size are provided merely for illustration with no limitation implied thereby as: 10.1 inch, 21.5 inch, and 44 inch.

In other embodiments, an intelligent interactive device is mounted on a ceiling of a room. In some embodiments, an intelligent interactive device can be incorporated into a ceiling light fixture. In yet other embodiments, an intelligent interactive device is built into a surface of a room, such as; a wall, ceiling or floor. In yet other embodiments, an intelligent interactive device is built into a piece of art work, such as, for example; a painting, a sculpture, a picture, a piece of furniture, etc. In yet other embodiments, an intelligent interactive device is part of a television set; a video display, a set-top box or other electronics box within the room or associated with a building.

In yet other embodiments, an intelligent interactive device is configured with a safe or a safe storage lockable box. For example, in one or more embodiments directed to the hospitality industry, a guest in a room or other location places an item in the safe during the guest's stay. So that the guest does not forget the item placed in the safe before the guest leaves, a reminder message is displayed on a screen of the intelligent interactive device if the intelligent interactive device is so equipped. Alternatively, a warning message is communicated to the user by other means such as by light, audible tone, audible message, etc. The logic behind the reminder system can be structured with a hierarchy wherein the warning increases in noticeability with time. For example, a light is used close to the guest's checkout time and then an audible tone is used at the check out time. If the item is still in the safe after the guest checks out a text message, email, phone call, etc. can be sent to the guest to remind the guest that the item has been left in the safe or box. In addition to the forgoing, a communication is sent to the hotel management to remove the item from the safe or box so that the item can be removed from the safe and brought for example to lost and found before the next guest arrives in the room. While the foregoing example is given in the context of a guest and a hotel, embodiments of the invention are not limited thereto, the examples using the hospitality industry are given merely for illustration and no limitation is implied thereby.

FIG. 1A illustrates, generally at 100, architecture for an intelligent voice interactive device, according to embodiments of the invention. With reference to FIG. 1A, in various embodiments, an intelligent voice interactive device can include a mirror 102 with a modular communications module (also referred to as a modular computing module). The communications module has a modular architecture with a first computing module 104 and a second computing module 106 in electrical communication via electrical connection line 110 or wireless connection. In some embodiments, it is convenient to use a serial communications line for the electrical connection line 110.

The second computing module 106 is configured to control, by way of electrical connection 118, a general number "n" of physical phenomena devices indicated at 108. In some embodiments, one or more of the physical phenomena devices 108 are located on the second computing module 106. Some examples of physical phenomena devices 108 are, but are not limited to; one or more lights associated with the mirror 102, such as backlights or front frame mounted lights, voice interaction user feedback light(s), one or more speakers, a mirror defogger, a touch sensor, a gesture sensor, a proximity sensor, a motion detector, a load cell, a radio frequency identification (RFID) receiver, a wireless beacon, a microphone mute control, a power control, temperature sensor, pressure sensor, humidity sensor, gas sensor, etc. In some embodiments, the gas sensor is a volatile organic compound (VOC) sensor that can detect the presence of gases, such as but not limited to, paints, formaldehyde, lacquers, paint stripper, cleaning supplies, office equipment, glues, alcohol, adhesives, etc. In some embodiments a multi-sensor package is utilized such the BME 280 and/or the BME 680 from Bosch Sensortec. The second communication module 106 receives electrical power from a power supply 122. Power supply 122 can receive a source of electrical power 124 which can be alternating current supplied by the environment 140 within which the system 100 is deployed. In some embodiments, the power supply 122 outputs electrical power at a single voltage and, in other embodiments, the power supply outputs electrical power at more than one voltage. The number of power supplies represented by power supply 122 will depend on the number and type of physical phenomena devices included in 108. Alternatively, 122 and 124 can be replaced with a battery and circuitry to provide the needed direct current voltage(s) required by the communication module. In various embodiments, 124 can represent a source of power via direct current (DC), supplied by, for example. Power over Ethernet (PoE). While not shown in FIG. 1A, in one or more embodiments, the second computing module 106 supplies electrical power to the first computing module 104. In other embodiments, the first computing module 104 can obtain a source of electrical power through a separate power supply (not shown)

The first computing module 104 is configured with network communications 114 to communicate through one or more of a local area network (LAN), the Internet, etc., indicated at 125, to place the first computing module 104 in electrical communication with a voice-to-text also referred to synonymously as speech-to-text conversion and an artificial intelligence (VT & AI) system represented by 130. The VT & AI system(s) 130 can be implemented, in different embodiments, using various commercially available systems such as Amazon® Alexa, the IBM® Watson Development Environment, the Microsoft Bing Speech API, a custom configured VT & AI system, etc. The VT & AI system can be cloud based or it can reside on an intelligent interactive device. In one or more embodiments, a voice-to-text (VT) system resides on the intelligent device and is implemented with a commercially available software solution such as is available from SNOWBOY™. The resident VT system can be used to process a custom wake word configured for a particular application. The first computing module 104 or the second computing module 106 is configured with at least one microphone 120 to receive acoustic signals 156 from a user 150*a* or from a user 150*b*. User 150*a* can be the same user as user 150*b* or these can represent different users. Microphone 120 can also be one of the physical phenomena devices 108, or microphone 120 can be configured separately from the interactive device through wireless communication. Thus, microphone 120 can be flexibly located. When a user interacts with the system 100 through voice, the microphone 120 receives voice signals from the user. The voice signals are input to the first computing module 104 and are transformed into output data. The output data can be transmitted, or streamed in pieces as generated, using network communications 114 via 125 to the VT & AI system 130. At the VT & AI system 130, the output data is converted into text, control information is established based on predefined trigger words and the logical content of the users voice signals, the result is sent back to the first computing module 104 as input data over the network 125. In other words, the intent contained in the voice signals is extracted by the VT & AI system. The first computing module 104 receives the input data over network communications 114. The input data (string of characters, etc.) is passed from the first computing module 104 to the second computing module 106 over communication line 110. At least one of the physical phenomena devices 108 is a light, such as 108*a*, that is used to provide visual feedback to the user 150*a* or 150*b* related to the artificial intelligence process provided by the VT & AI system 130.

Depending on the logical content of the user's voice signals (contained in the output data) at the initiation of the interaction, part of the response from the VT & AI system 130 can be digital data that is directed to one of the physical phenomena devices 108, which can be a speaker or other transducer configured to produce acoustic signals that are audible to the user. In various embodiments, within the physical phenomena devices 108, a speaker can be provided or a transducer can be fixed to the mirror 102 to provide acoustic signals based on the input data that are audible to the user. In one non-limiting example, provided merely for illustration, at the beginning of the interaction, the user might ask the mirror 102 a question: "What is the weather in Seattle?" The interaction with the system includes an audible response to the user 150*a* or 150*b*, such as, for example, "today the weather in Seattle is sunny." In another non-limiting example, provided merely for illustration, at the beginning of the interaction, the user instructs the system to turn up the volume of one of the physical phenomena devices 108 or to turn ON, OFF, DIM, ADJUST COLOR, etc. one of the lights within the suite of physical phenomena devices 108. These interactions are accompanied by feedback to the user. The feedback to the user can be visual feedback, audible feedback or a combination of both. Feedback to the user is described more fully below in conjunction with FIG. 2A, FIG. 2B, FIG. 3A, and FIG. 39, and FIG. 4.

Examples

In some of the examples described in this description of embodiments, reference is made to the Amazon® Alexa (AVS) VT & AI system by way of illustration, however, no limitation is implied thereby, and it is noted that other commercial VT & AI solutions can be employed as well as a custom VT & AI architecture for system 130. In one or more embodiments, AVS is used to provide the VT & AI system 130 and the associated artificial intelligence (AI) that is used following the conversion of the user's voice signals. An example, merely for illustration, with no limitation implied thereby, in the implementation of Alexa™ with the system 100, is given where the Alexa Voice Services (AVS) is used for VT & AI system 130. Using the AVS software tools, such as the Alexa application programming interface (API), one or more "trigger" words are established that will be used by the VT & AI system 130. For example, if a trigger word is set to: "LIGHT." A user such as 150*a* or 150*b* speaks a command 156 to the system 100, such as: "Alexa turn on the LIGHT." The command is transformed into output data in the first computing module 104 and is transmitted to VT & AI system 130. AVS parses the command and translates the command into text at VT & AI system 130. The text proximate to the trigger word is parsed for words corresponding to logical states such as "ON," "OFF," etc. which are associated with the trigger word. These logical states are used to provide control information (one or more flags) which pertains to a particular device 108 and are used when AVS creates input data associated with that device. AVS returns a JAVA string in JSON (JavaScript Object Notation) format that is part of the input data, referred to above, and contains the control information. If a user asked the mirror a question during an interaction, then AVS's SpeechSynthesizer interface is used to return a speech response to the question. The speech response is returned in the form of a binary audio attachment that is part of the input data. The input date is received by the communication module associated with the mirror 102. In one embodiment, a software process runs on the first computing module 104 to receive the input data from network communication 114 and to extract control information from the input data. The input data is passed to the second computing module 106 over communication line 110. The second computing module 106 transforms the input data into local control signals for one or more of the physical phenomena devices 108, which can include feedback to the user related to the interaction. At least one of the physical phenomena devices 108 is a device such as a light 108*a* that is used to provide visual feedback related to the artificial intelligence (AI) provided by Amazon Voice Services. Alternatively, in other embodiments, sounds are used to provide feedback to the user that apprises the user concerning the progress or state that the AI process is in. States of the AI process and feedback to the user are described more fully below in conjunction with FIG. 2A, FIG. 2B, FIG. 3A, and FIG. 3B, and FIG. 4.

Physical Phenomena Devices for Interaction

In various embodiments, the methods described above are used to register any number of physical phenomena devices with Alexa Voice Services (AVS) or another VT & AI system 130 in order to perform voice-to-text conversion and associated AI processing on a user's voice interaction with system 100. Some non-limiting examples of user interaction functionality with physical phenomena devices 108, provided merely for illustration are, but are not limited to: turning ON/OFF lights; turning ON/OFF mirror defogger; dimming a light(s); adjusting the color of a light; controlling audible music delivery (playing music) through the intelligent interactive device; controlling audible audio book (playing the audio book) through the intelligent interactive device; controlling audible pod casts (playing pod casts) through the intelligent interactive device; combining and controlling the combination of music and light together, combining and controlling the combination of audio and video together from different sources (as described in conjunction with FIG. 6 and the figures that follow below); adjusting the volume of audio played through the intelligent interactive device; playing video through the intelligent interactive device; displaying video and the accompanying audio when a display is included with the intelligent interactive device as described in conjunction with FIG. 6 and the figures that follow below; etc.

Network Communications

Network communications 114 can include various components (not shown), including but not limited to, one or more hubs, one or more wireless routers, Internet relays, switches, etc. according to the particular environment 140 that the system 100 is used within. The environment 140 is an environment provided by some form of building, such as but not limited to; a home, a school, a hospitality environment such as a hotel, motel, conference room, stadium, business, etc.

A wireless interface 116 can also be used to enable the user 150b to interact with the system 100 using a wirelessly enabled communications device 152/154 to communicate with the communication module associated with the mirror 102. In one embodiment, the wirelessly enabled communications device 152/154 is used by the user to control a smart device such as 160 that is connected at 162 to the cloud 125. Smart device 160 can be a light, such as the Phillips® Hue® light, load cell, radio frequency identification (RFID) receiver, or any other smart device that is capable of communications through network 125. Network 125 is one or more of a local area network (LAN), a wide area network (WAN), such as for example, the Internet. Alternatively, the smart device 160 can be controlled by any one of the users 150a or 150b using voice interaction with the device 102 and the VT & AI system 130. In this mode of voice interaction, in one embodiment using Alexa Voice Services (AVS), the smart device 160 has been equipped for voice control through an Amazon "SKILL." The user can issue voice commands to the device 102 of system 100, such as: "Alexa, turn the light on." Incorporating the use of AVS SKILLs into the system 100 is explained more fully below in conjunction with the figures that follow.

Modular Electronics Architecture

The modular architecture of the communication module provides several advantages to the system 100. These advantages include both lowered manufacturing costs provided by longer useful life span of the second computing module and geographic adaptability of the first computing module without impacting the second computing module. Facilitating control of the physical phenomena devices requires making changes to the kernel of the computer that is used to control them. Following the division of functions in the modular communication module architecture, the second computing module 106 is used to control the physical phenomena devices 108. With this division of functions, there is no need to modify the kernel of the first computing module 104 to accommodate control of physical phenomena devices because this task is performed by the second computing module 106. As time passes and processors' speeds increase, the first computing module 104 can be replaced with new generations of processors without the need to make changes to the kernel. Thus, a portion of the communication module, i.e., the second computing module, is used over and over as the speed of the first computing module increases through the introduction of new processors.

The function of network interface and wireless communication 116 over, for example, WIFI is given to the first computing module 104. If the system is deployed into a geographical area that uses a different wireless communication protocol, the first computing module 104 is replaced accordingly with a unit that is configured for use in that geographical area. This aspect of the modularity of the architecture once again allows the functionality provided by the second computing device to remain untouched by the hardware change of the first computing module. Thereby, the system 100 is made adaptable to processor speed improvement and to deployment into different geographical locations that might have different wireless communication protocols. Such modularity saves manufacturing costs, for example.

In various embodiments, by way of illustration with no limitation implied thereby, the first computing module 104 is implemented using a single board computer (SBC), such as one of the computing solutions provided by the Raspberry Pi Foundation, such as the Raspberry Pi 3 Model B. As explained above, as computer technology advances with the development of processors of increasing speed, the first computing module can be replaced with a newer version, such as, for example, a next version of the Raspberry Pi. The first computing module 104 is not limited to the Raspberry Pi family of SBC, running either the Android or Linux operating system. Other manufactures of single board computers (SBCs) are, but are not limited to, the mini computer made by GeekBox®, and a user defined single board computer is used in some embodiments. Some advantages of using a SBC for the first computing module are that such SBCs have enough memory to enable the SBC to transform the acoustic signals spoken by the user into output data, while providing communication to the second computing module via common interfaces such as serial. The Raspberry Pi family of SBCs runs the Android operating system, however, other SBCs running other operating systems can be used for the first computing device.

In various embodiments, by way of illustration with no limitation implied thereby, the second computing module 106 is implemented using a microcontroller from Texas Instruments MSP series, Microchip PIC series. ST Micro STM32F031F6P7, Cypress, etc.

In various embodiments, the first computing module, such as 104 (FIG. 1A) is implemented in an integrated circuit device, which may include an integrated circuit package containing the integrated circuit. In some embodiments, the first computing module is implemented in a single integrated circuit die. In other embodiments, the first computing module is implemented in more than one integrated circuit die of an integrated circuit device which may include a multi-chip package containing the integrated circuit.

In various embodiments, the second computing module, such as 106 (FIG. 1A) is implemented in an integrated circuit device, which may include an integrated circuit package containing the integrated circuit. In some embodiments, the second computing module is implemented in a single integrated circuit die. In other embodiments, the second computing module is implemented in more than one integrated circuit die of an integrated circuit device which may include a multi-chip package containing the integrated circuit.

Alternative Computing Module Architecture

Figure 1B:
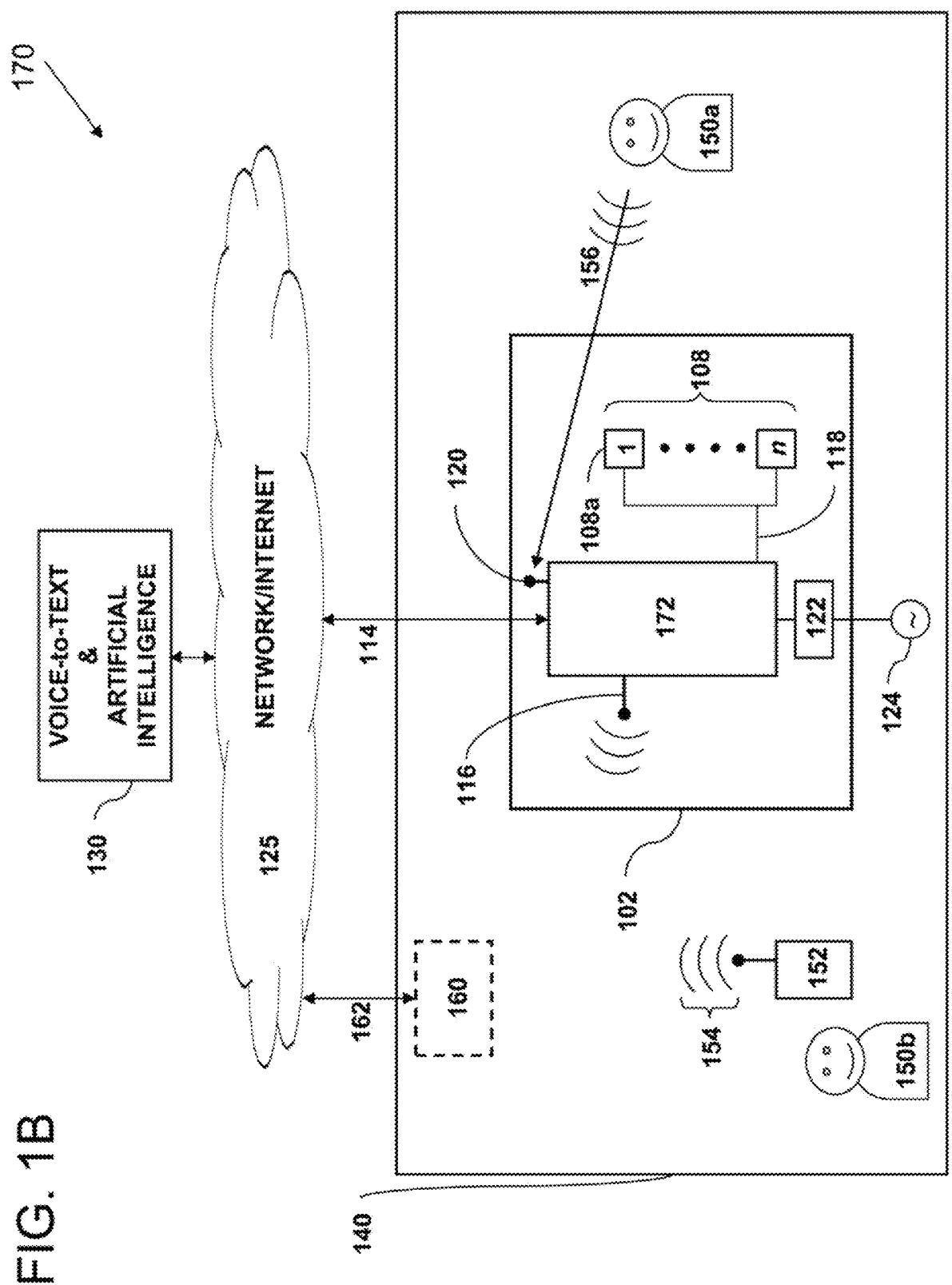
FIG. 1B illustrates another architecture for an intelligent voice interactive device, according to embodiments of the invention.

FIG. 1B illustrates, generally at 170, another architecture for an intelligent interactive device, according to embodiments of the invention. Referring to FIG. 1B, an alternative embodiment is presented, where the communication module is illustrated with the use of a computing module 172. The computing module 172 combines the functions of the first computing module 104 (FIG. 1A) and the second computing module 106 (FIG. 1A). In this configuration, the computing module 172 is electrically connected at 118 to the general number of n physical phenomena devices 108. In some embodiments, one or more of the physical phenomena devices 108 are located on the computing module 172. As described above, microphone 120 can also be one of the physical phenomena devices 108, or microphone 120 can be configured separately from the interactive device through wireless communication. Thus, microphone 1210 can be flexibly located. A source of electrical power for the computing module 172 is indicted by power supply 122 and source 124. Alternatively, 122 and 124 can be replaced with a battery and circuitry to provide the needed direct current voltage(s) required by computing module 172. In various embodiments, as described above in conjunction with FIG. 1A 124 can represent a source of power via direct current (DC), supplied by, for example, Power over Ethernet (PoE).

In various embodiments, the computing module 172 can be configured as a single board computer or a computing module comprised of more than one board. The functionality described above in conjunction with FIG. 1A and the user interaction with the VT & AI system 130 in the context of the discussion of system 100 applies in the same manner to the architecture shown in FIG. 1B with the computing module 172 within the system of 170.

In various embodiments, the computing module, such as 172 (FIG. 1B) is implemented in an integrated circuit device, which may include an integrated circuit package containing the integrated circuit. In some embodiments, the computing module is implemented in a single integrated circuit die. In other embodiments, the computing module is implemented in more than one integrated circuit die of an integrated circuit device which may include a multi-chip package containing the integrated circuit.

Figure 1C:
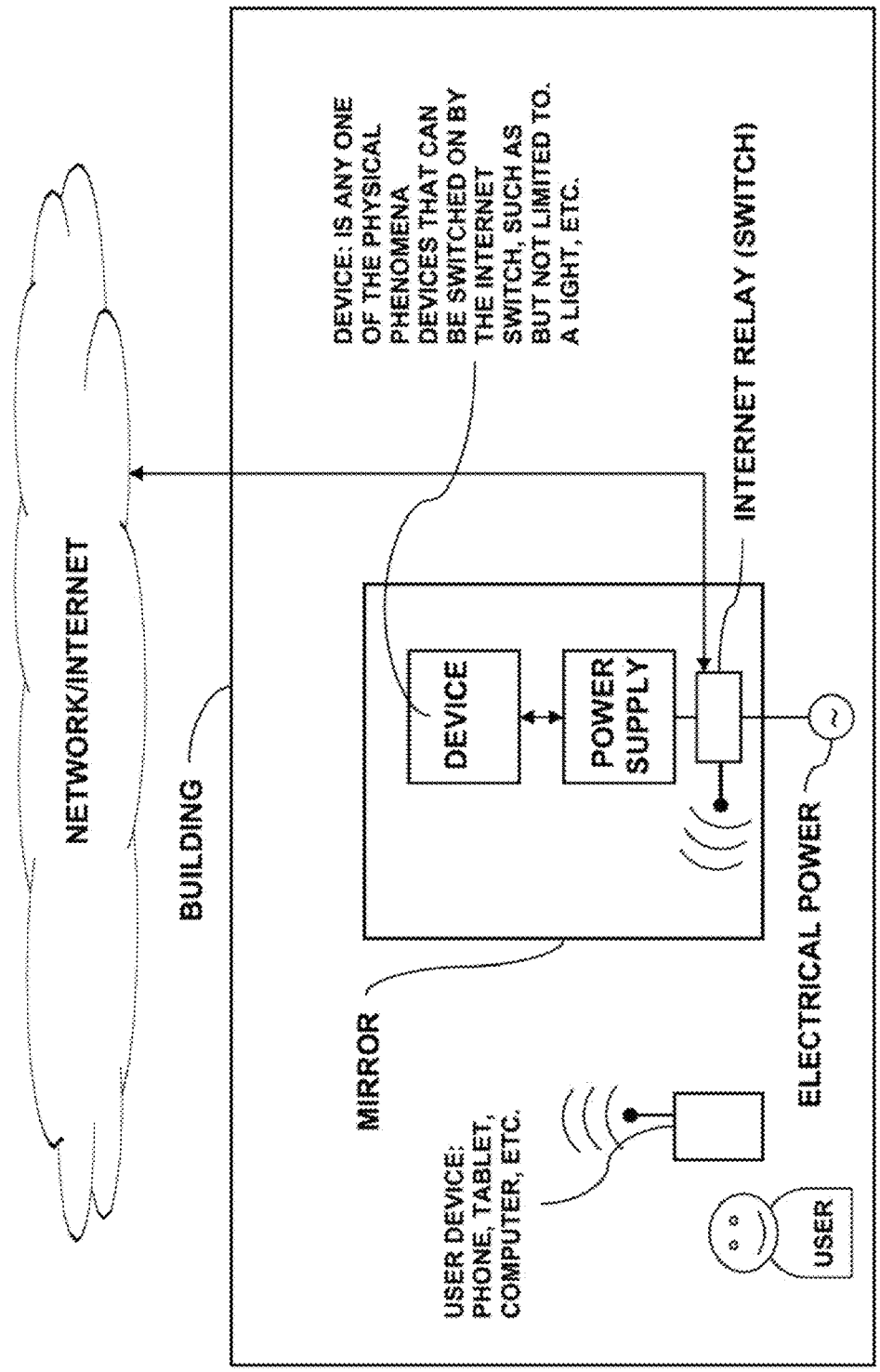
FIG. 1C illustrates architecture for an interactive mirror, according to embodiments of the invention.

FIG. 1C illustrates architecture for an interactive device, according to embodiments of the invention. With reference to FIG. 1C, a mirror includes an Internet relay, a power supply, and a device. The Internet relay is configured for wireless operation, operable from a wirelessly equipped user device such as a mobile phone, tablet, computer, etc. The Internet relay provides a source of electrical power to a power supply to power one or more devices used in conjunction with the mirror. The device can be any one or more of the physical phenomena devices described herein that be operated with the power supply, such as but not limited to a light, etc.

Figure 1D:
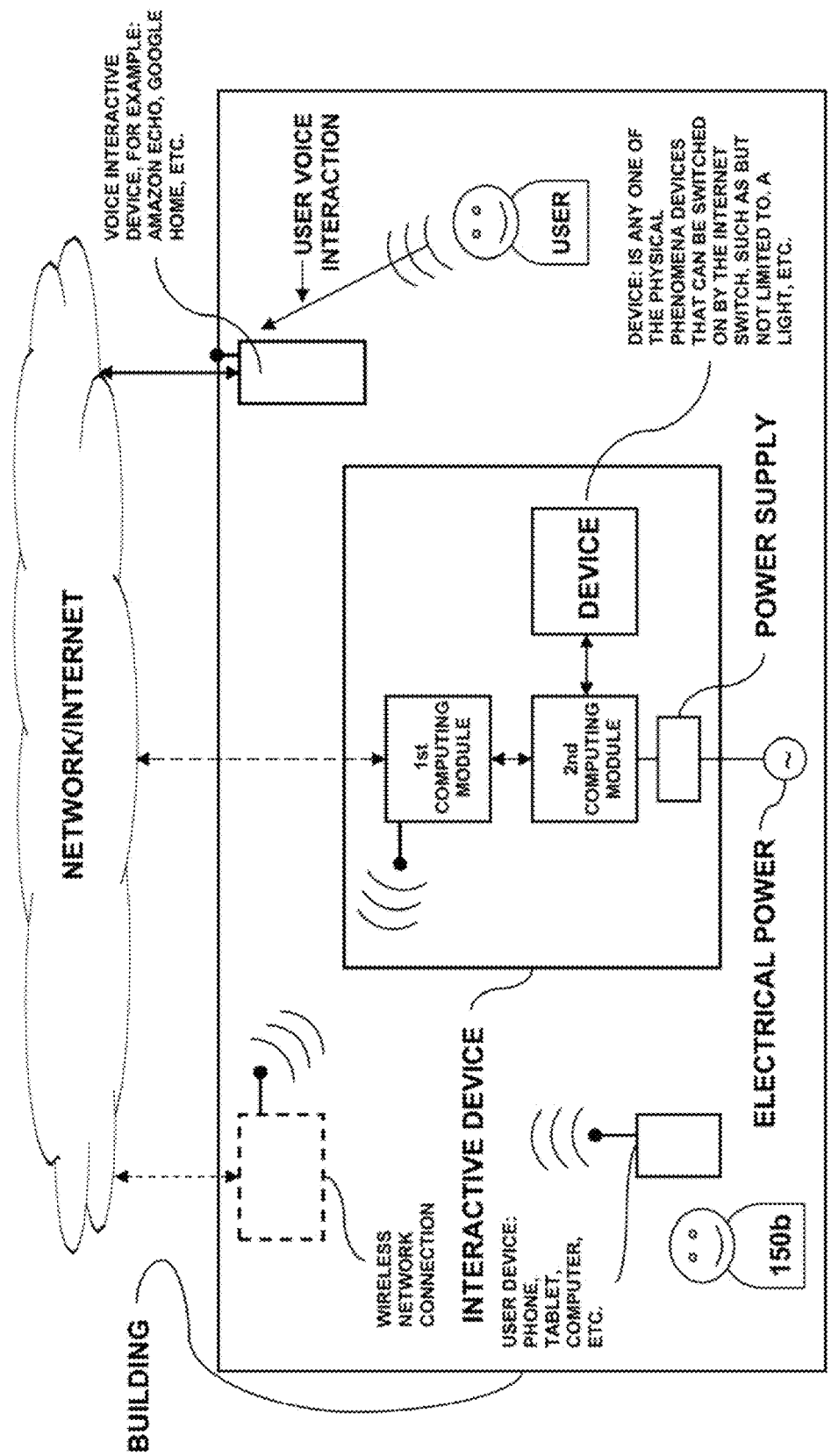
FIG. 1D illustrates architecture for a modular interactive device, according to embodiments of the invention.

FIG. 1D illustrates architecture for a modular interactive device, according to embodiments of the invention. With reference to FIG. 1), an interactive device is configured to be controlled by a voice interactive device such as for example, an Amazon Echo, Amazon Alexa, Google Home, etc. The interactive device of FIG. 1D can be represented by either of the interactive devices from FIG. 1A or FIG. 1B.

Figure 1E:
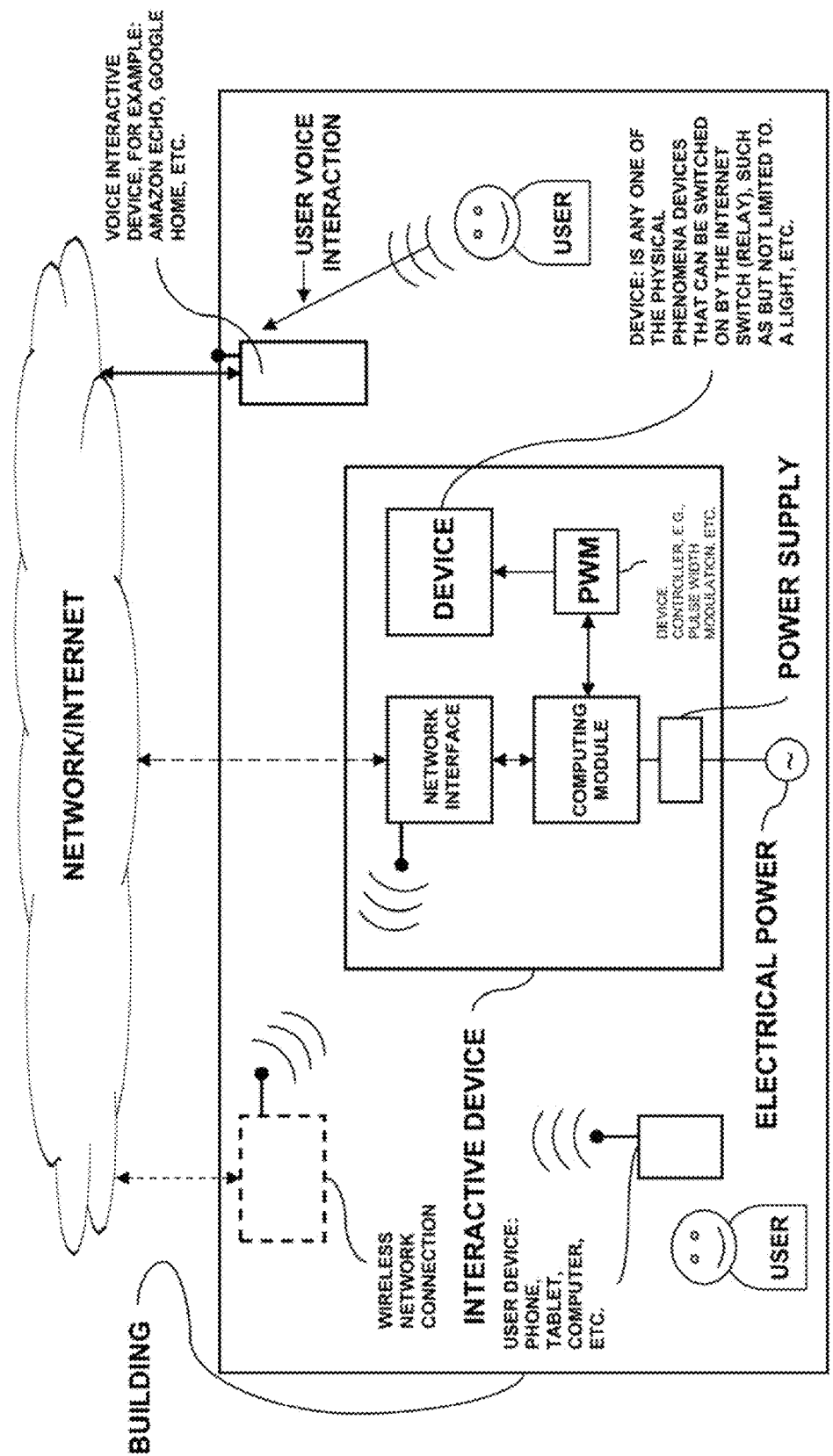
FIG. 1E illustrates another architecture for an interactive device, according to embodiments of the invention.

FIG. 1E illustrates another architecture for an interactive device, according to embodiments of the invention. With reference to FIG. 1E, an interactive device is configured with a network interface to provide wireless network connectivity to the Internet. The network interface can also provide a wired connection to the Internet. The interactive device's Internet connection permits the interactive device to be controlled from a user device (such as but not limited to a mobile phone, tablet, computer, etc.) or from a voice interactive device such as an Amazon Echo, Amazon Alexa, Google Home, etc. The interactive device is configured with a computing module and the computing module is configured to receive information from the network interface. In one or more embodiments, the computing module is configured to communicate with a pulse width modulation (PWM) unit in order to control a device(s). In various embodiments, the computing module is a computing module as described above in FIG. 1A at 106. In various embodiments, the device can be any one or more of physical phenomena devices described herein, such as but not limited to a touch sensor, a light, etc. The device(s) can also be a device that be switched on by an Internet relay (switch) described in FIG. 1C. For example, the device of FIG. 1E can be configured as the device in FIG. 1C. Referring back to FIG. 1E, in other embodiments, a different device controller is used in place of the PWM unit to control the device. Thus, the architecture illustrated in FIG. 1E is flexible and be configured to accommodate different devices and device controllers.

In various embodiments, touch sensors and PWM units are described more fully in U.S. patent application Ser. No. 15/604,617, titled "SYSTEMS AND METHODS FOR CHANGING THE COLOR TEMPERATURE OF A LIGHT." U.S. patent application Ser. No. 15/604,617 is hereby incorporated by reference.

FIG. 2A illustrates, generally at 200, displaying visual feedback from an intelligent voice interactive device, according to embodiments of the invention. With reference to FIG. 2A, in one or more embodiments, an intelligent voice interactive device is a mirror 202a that has a number of backlight regions 204, 206, 208, 210, 212, and 214. In the embodiment illustrated in FIG. 2A, the backlight regions are grouped vertically on the left and right hand sides of the mirror 202a; this arrangement is provided merely for illustration and does not limit embodiments. In other embodiments, the backlight regions are configured differently and can include more or fewer than the number of backlight areas shown in the figures. For example, in another embodiment, the backlight region is a region 240 around the perimeter of the mirror 202b. The region 240 can be placed right at the perimeter of the mirror as shown in 202b or the region can be located away from the perimeter as illustrated in mirror 202c with backlight region 242. Backlight regions 240 and 242 are illustrated by cross-hatching for case of identification in the figure, nothing more is implied by the cross-hatching.

Backlight regions described herein are configured in the mirror 202a, 202b, and 202c by reducing the reflectivity of the mirror within the backlight region. Backlight regions can be used with a diffuser. In various embodiments, light elements are placed on a back side of the mirror and are either set directly behind a backlight region to provide a source of direct backlight or off to one side to provide a source of indirect backlight.

Illustrated with the mirror 202a is a configuration of direct backlight, where light arrays 220, 222, 232, and 230 are placed directly behind their respective backlight regions. Light arrays are a type of physical phenomena device described above in conjunction with the preceding figures. For example, light arrays 220, 222, 232, and 230 can be in the group of physical phenomena devices 108 from FIG. 1A or FIG. 1B. In one embodiment, one of light arrays 220 and 222 is a white light array and the other is a Red Green Blue (RGB) light array to produce colored light. Similarly, on the right-hand side, one of light arrays 232 and 230 is a white light strip and the other is a Red Green Blue (RGB) light array to produce colored light. In one or more embodiments, the light arrays are light emitting diode (LED) elements arranged into a strip. In other embodiments, the light arrays are made from other types of light elements, such as, for example, organic light emitting diode (OLED), etc. In various embodiments, light arrays are used with mirrors 202b and 202c however, to provide clarity of illustration they are not shown in the figures. In the mirror configuration 202a the same backlight region is used to provide backlight for a user with a white light strip and feedback to the user for the artificial intelligence aspect of the mirror 202a. This is observed in that both light arrays 220 and 222 traverse the same backlight regions 204, 206, and 208. Similarly, the same light arrays 230 and 232 traverse the same backlight regions 210, 212, and 214. In other embodiments, the backlight function of the mirror is provided in a different backlight region from the backlight region used to provide the visual feedback from the intelligent voice interactive mirror to the user.

FIG. 2B illustrates, generally at 250, displaying visual feedback from an intelligent voice interactive device, according to additional embodiments of the invention. In FIG. 2B, the physical phenomena devices used to provide the primary backlight in the device 252 have been separated from the physical phenomena device(s) used to provide visual feedback to the user on the artificial intelligence (AI) process following the voice interaction. In one or more embodiments, the device 252 is a mirror and illustrates a configuration of direct backlight, where light array 266 is placed directly behind backlight regions 254, 256, and 258 and a light array 268 is placed directly behind backlight regions 260, 262, and 264.

A region 270 contains a backlight region, which is used primarily for providing feedback to the user to communicates the state of the AI process. Within the region 270, in one embodiment, the mirror 252 has been prepared to emit a light shape that resembles the envelope of a cycle of a standing wave or pulse. In one or more embodiments, the region 270 is made up from a plurality 272 of vertically oriented backlight regions of first increasing height and then decreasing height as shown at 272, thereby resembling the envelope of a standing wave. The plurality of vertically oriented backlight regions 272 is illuminated with a light array 274 providing a source of backlight. In various embodiments, the region 272 is equipped with a diffuser to provide a softened appearance to the light or the light can be made to disappear into the mirror. In various embodiments, the light emitted by the array 274 can be provided in different ways to provide different effects. For example, in one embodiment the array is illuminated from left to right at a rate having a period of approximately 1 to 2 seconds during certain AI states as described below. The repetitive illumination is illustrated in the figure with Y axis 282 indicating light intensity and an X axis 280 representing a longitudinal axis of the light array 274. In operation, a light pulse 284 is generated as the light elements in the array are successively illuminated from left to right along the direction shown at 286. Such a pattern can be used with one or more of the states shown below in conjunction with FIG. 3A and FIG. 3B. Alternatively, a light pulse 284 is generated as the light elements in the array are successively illuminated from right to left along a direction opposite to that shown at 286. Another effect is obtained by synchronizing a speed of the light pulse 284 with the speech provided by the VT & AI system when an audible response is returned from the VT & AI system in response to a user interaction.

In FIG. 2B, light arrays 266, 268, and 274 are a type of physical phenomena device described above in conjunction with the preceding figures. For example, light arrays 266, 268, and 274 can be in the group of physical phenomena devices 108 from FIG. 1A or FIG. 1B. FIG. 2B illustrates separating the primary backlight regions (254, 256, 258, 260, 262, and 264) and their light arrays (266 and 268) from the backlight region 272 and its light array 274 that are used to provide visual feedback to the user concerning the state of the AI process. In other embodiments, different backlight regions are used to provide visual feedback to the user concerning the state of the AI process, for example in some embodiments a horizontal rectangle is used. In other embodiments, a circular backlight region is used. In yet other embodiments, a user defined shape is provided for the backlight region that provides feedback to the user. In some embodiments the user defined shape is in the form of a logo, name or advertisement. Accordingly, various shapes of backlight region can be provided in 270. In addition, the region 270 can be located in different places on the mirror 252.

Figure 3A:
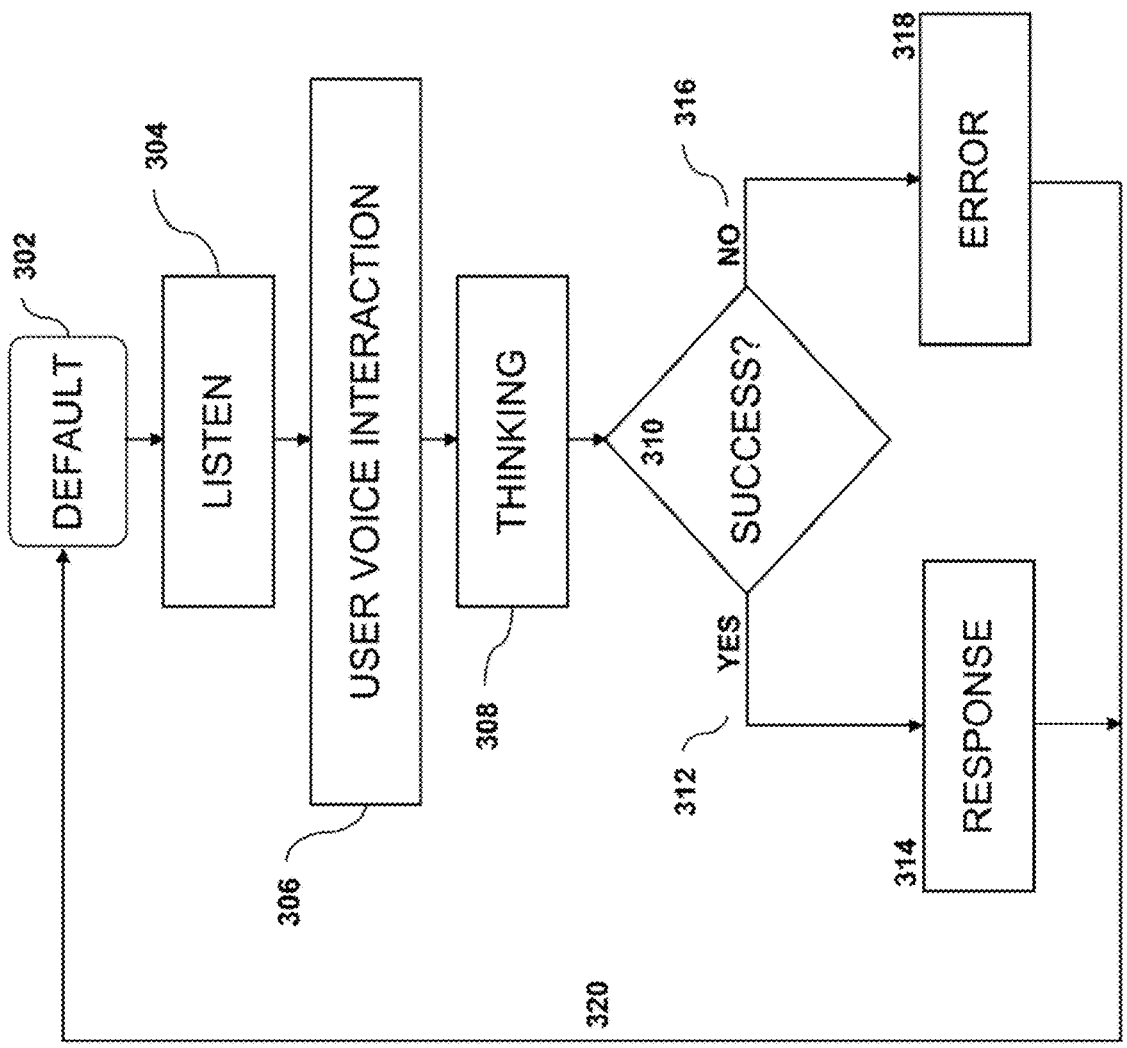
FIG. 3A illustrates a process and logical states corresponding to a voice interaction with an intelligent voice interactive device, according to embodiments of the invention.

FIG. 3A illustrates, generally at 300, a process and logical states corresponding to a voice interaction with an intelligent voice interactive device, according to embodiments of the invention. FIG. 3B illustrates, generally at 350, visual feedback states, according to embodiments of the invention. FIG. 4 illustrates, generally at 400, communicating visual feedback, according to embodiments of the invention. With reference to FIG. 3A, FIG. 3B, and FIG. 4 collectively, a process and corresponding logical states are presented which characterize a flow of a user interaction with a voice interactive artificially intelligent device. In the example of FIGS. 3A/3B/4, a visual feedback module (VFM) is used together with Alexa Voice Services (AVS) to choreograph customized visual feedback and audio feedback (when available) to the user in order to communicate the status of the artificial intelligence (AI) process resulting from the user interaction with the device. Visual feedback to the user is the customization of light with the functional/logical state of the AI process and the accompanying sound (when provided by AVS, which is not always present in each state) presented to the user of the intelligent interactive device in order to keep the user informed on the status of the AI process.

In other embodiments, when an intelligent voice interactive device includes a mirror visual feedback is provided through one or more areas of the mirror. The one or more areas of the mirror can be created such that the light is visible when in an on state and then the light becomes invisible when switched to an off state. Such a configuration appears to the user that the areas of light have disappeared into the mirror when switched off because when switched off the areas provide a reflection to the user. Methods and apparatuses to provide such disappearing functionality to the mirror and lights are described more fully in U.S. Pat. No. 8,099,247. U.S. Pat. No. 8,099,247 is hereby incorporated by reference.

In FIG. 3A, a process commences at a block 302. The block 302 represents the default state (state number 1) for the physical phenomena device(s). Considering a backlight on the intelligent interactive device as the physical phenomena device used to provide visual feedback to the user, the default state for the backlight is what the setting of the backlight was at the start of the interaction. In one embodiment, whether the backlight is ON or OFF and if ON then backlight light color and light intensity establish a default state. Within this discussion of visual feedback, the AI process is inactive during the default state. In other words, the default state is the state that the intelligent interactive device is in when a user walks up to it.

If the physical phenomena device used to provide visual feedback is powered up, the default state number 1 can have visual feedback associated with it, such as for example color number 1 as shown on line 302 of FIG. 3B. In one embodiment, color number 1 is the color green and a configuration of an intelligent interactive device using the color green for the default state is illustrated in one embodiment at 302 in FIG. 4. The visual feedback module (VFM) keeps the intelligent interactive device in state number 1 until a user engages with the intelligent interactive device during an interaction. Other colors can be used for state number 1 and, in some embodiments, state number 1 is characterized by the physical phenomena device (light element) residing in an OFF state.

Returning to FIG. 3A, at a block 304 the interaction system is activated to the LISTEN state. Activation can occur in different ways; for example, system detection of a user or by a user's initiation of the LIISTEN state 304. In various embodiments, a system detects a user's presence via proximity detection of a user with one or more proximity sensors. In various embodiments, a user initiates the LISTEN state 304 by speaking a command to the system or by initiating a system state change. A system state change can be accomplished by providing an input to the system by way of a switch or other physical phenomena device configured to provide its output to the interaction system either physically triggered by a user or wirelessly triggered by the user via interaction with a sensor's range of detection.

In one or more embodiments, using AVS for the VT & AI system 130, when the user issues a wake command the interaction system enters the LISTEN state. When AVS is used for the VT & AI system 130, awake command is either a word like "ALEXA," spoken by the user, or a user input which can be derived from a physical phenomena device such as a touch control on the mirror, a gesture sensor on the mirror, a special sound detected and processed locally (speech-to-text conversion) within the communications module and then converted to the wake input which is then sent to the VT & AI system 130. An example of a special sound is, but is not limited to, a sound emitted by a user such as clicking his or her fingers.

With other VT & AI systems, user defined wake words are used to wake the system to receive user voice signals. For example, a voice-to-text (VT) detection engine, such as the commercially available SNOWBOY voice-to-text software engine, runs locally on one of computing modules that is part of the voice interactive artificially intelligent device. The SNOWBOY VT engine can run on the first computing module 104 (FIG. 1A) or the computing module 172 (FIG. 1B) or on any computing module configured with any of the voice interactive artificially intelligent devices described herein. In one or more embodiments, provide merely for illustration, the SNOWBOY VT engine is configured to respond to a wake word defined by a user for a custom configuration. Some examples of wake words configured for custom applications using SNOWBOY are "mirror," or "Electric Mirror™." In other embodiments, the user configured wake word used with SNOWBOY is the name of a hotel where the voice interactive artificially intelligent device is installed. In the context of this description of embodiments, but with no limitation implied hereby, the user spoken word "ALEXA" will be used for illustration of the visual feedback associated with the block 304 for the "LISTEN" state. In response to the wake word at the block 304, the visual feedback module (VFM) causes one or more physical phenomena devices to fade to the second color as indicated at line 304 in FIG. 3B. In one or more embodiments, the second color is the color blue and a configuration of an intelligent interactive device using the color blue for the LISTEN state is illustrated in one embodiment at 304 in FIG. 4.

Returning to FIG. 3A, at a block 306 the user engages in a voice interaction with the system by speaking. During this time, the user issues a voice command to the system, either asking a question or issuing an instruction. The visual feedback module (VFM) causes one or more physical phenomena devices associated with the intelligent interactive device to provide visual feedback in state 3 by displaying color number 2 without modulation as shown at line 306 in FIG. 3B, "hold color number 2." In one or more embodiments, the second color is the color blue and a configuration of an intelligent interactive device using the color blue for the VOICE COMMAND state 3 is illustrated in one embodiment at 306 in FIG. 4.

Returning to FIG. 3A, at a block 308 the AI system is processing the user's voice interaction illustrated by the label "THINKING," which is state 4. During this time the user waits for the system's response to the issued voice communication from block 306. The visual feedback module (VFM) causes one or more physical phenomena devices associated with the intelligent interactive device to provide visual feedback in state 4 by modulating the intensity of color number 1 and color number 2 as a function of time or space which in one embodiment results in displaying a blinking sequence of color number 1 and color number 2 as shown at line 308 in FIG. 3B, "color #1 and color #2 blinking." In one or more embodiments, the first color is green and the second color is the color blue and a configuration of a intelligent interactive device using the color green and blue for the THINKING state 4 is illustrated in one embodiment at 308 in FIG. 4.

Returning to FIG. 3A, depending on the content of the user's voice interaction from previous block 306 (state 3) the AI system can return two different conditions. A first condition, that indicates success, control within the VFM branches at 312 to the block 314 described below as RESPONSE, which is state 5. A second potential condition at 310, that indicates one or more problems processing the voice interaction results in control flowing at branch 316 to a block 318 described below as ERROR which is the ERROR state 6.

At a block 314 the AI system provides a successful response to the users voice interaction. During this time, the visual feedback module (VFM) adjusts the physical phenomena device(s) responsive to the input data accordingly in combination with any speech response that was returned from the AI system relative to the user's issued voice communication from block 306. The VFM provides visual feedback with the one or more physical phenomena devices in state 5 in the intelligent interactive device by displaying a third color. In one or more embodiments, the third color is yellow as indicated at line 314 in FIG. 3B and a configuration of the intelligent interactive device using the color yellow for the RESPONSE state 5 is illustrated in one embodiment at 314 in FIG. 4.

In other embodiments, when a display region is included with the intelligent interactive device, visual feedback can include visual feedback data displayed thereon such as an image of a rainbow or other visual symbol, image, or video corresponding to state 5. In some embodiments, only audio feedback is provided to a user. Thus, in various embodiments feedback to the user can be any combination of video and/or audio feedback.

Returning to FIG. 3A, at a block 318, state 6, the AI system was unsuccessful in completing the instruction contained in the user's voice interaction from the block 306 (state 3). During this time, the visual feedback module (VFM) adjusts the physical phenomena device's (or devices') response(s) to the input data accordingly in combination with any speech response that was returned from the AI system relative to the user's issued voice communication from block 306. The intelligent interactive device provides visual feedback in state 6 via the VFM by displaying a fourth color. In one or more embodiments, the fourth color is red as indicated at line 318 in FIG. 31B and a configuration of the intelligent interactive device using the color red for the ERROR state 5 is illustrated in one embodiment at 318 in FIG. 4.

At the conclusion of either state 5 or state 6, control transfers at 320 back to the block 302, thereby placing the system back into the default state number 1 where the process of user interaction is ready to begin anew. In various embodiments, the visual feedback module (VFM) is implemented with logic in either software, hardware, or a combination of both within the communication module.

Figure 5A:
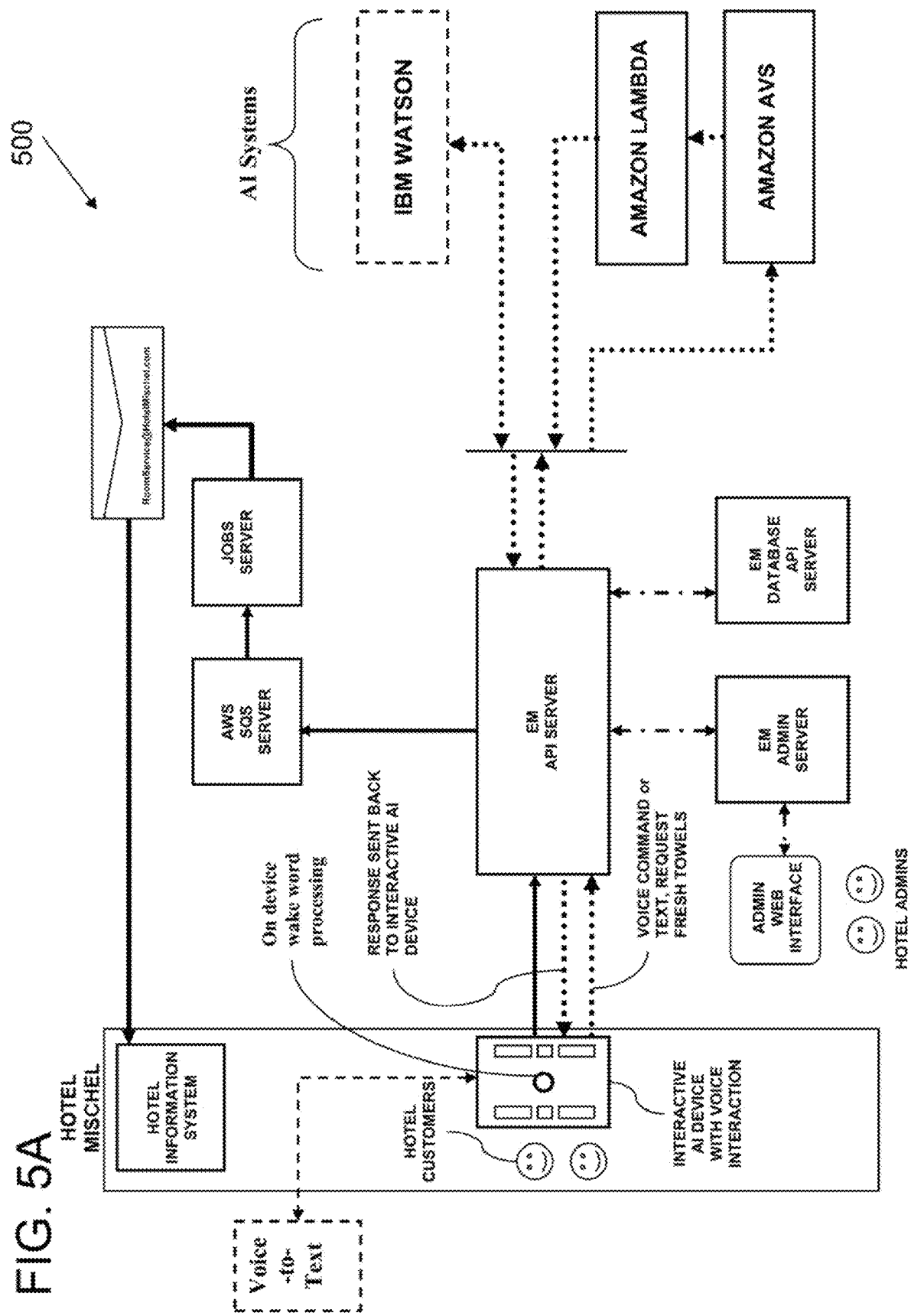
FIG. 5A illustrates communications network architecture to support intelligent voice interaction in a device, according to embodiments of the invention.

FIG. 5A illustrates, generally at 500, communications network architecture to support intelligent voice interaction in a device, according to embodiments of the invention. With reference to FIG. 5A, a hospitality environment is illustrated with an intelligent voice interactive device. The intelligent voice interactive device combines voice interaction with artificial intelligence as described above in conjunction with the preceding figures. In one or more embodiments, the hospitality environment is a hotel, such as Hotel Mischel, with a plurality of intelligent voice interactive devices. Only one intelligent voice interactive device is shown for clarity but it is understood that the description will support a general number of i intelligent voice interactive devices. The intelligent voice interactive devices can be distributed within the guest rooms, in a pool area, a workout area, etc. within Hotel Mischel. In various embodiments, the system 500 is scaled to accommodate a general number of j individual hotels, such as Hotel Mischel, Hotel Zerr, etc. In such a deployment, each hotel is given its own secure account on the Electric Mirror (EM) ADMIN Server.

Through the multi-account functionality of the EM ADMIN Server, each hotel, e.g., Hotel Mischel, Hotel Zerr, etc. has its own Hotel ADMIN Web Interface accessed by its own account. The Hotel ADMIN Web Interface provides a single management point that is used to control any number of intelligent voice interactive devices, from one to thousands or more (a general number i) of intelligent voice interactive devices that are deployed within a given hotel or hospitality environment.

Each hotel, identified by "HOTEL ADMINS" uses their respective ADMIN Web Interface to furnish the data needed in order for the system to execute the voice commands that are directed to intelligent voice interactive devices by the hotel's customers. Such data includes but is not limited to; identifying indicia for the device such an Internet Protocol (IP) address used with the device, what hotel and room number or physical location within the hotel property a given device is located at, data necessary to direct execution of the user command such as for example, delivery method of communication back to the hotel. Examples of such communication back to the hotel are, but are not limited to; email, text message, phone number, etc. An example of communication back to the hotel using email is described in the example to follow below.

The data entered by the hotel administrators (admins) is stored on the EM Database API Server and is accessed by the EM API Server during processing of voice commands issued by the customers of the plurality of hotels which are served by the system 500.

The following example is given in the context of a single voice request issued by a single customer of a single hotel; however, it is understood that in operation, system 500 is configured to process multiple requests from multiple customers within a given hotel and similarly from multiple hotels within the network. In one or more embodiments, using Amazon's Alexa Voice Services (AVS) for the voice-to-text conversion & artificial intelligence (VT & AI) system 130 (FIG. 1A or FIG. 1B) voice interactive artificial intelligence functionality is incorporated into the device using a "custom SKILL" referred to in this example as a "Hotel Skill." A "Hotel Skill" is described more fully below in conjunction with the figures that follow, such as, but not limited to FIG. 20. A number of different requests can be enabled with the custom skill that provides services to customers of the hotel, such as, but not limited to, a.) bring fresh towels to my room, b.) retrieve my car from valet parking I will be checking out at a give time, c.) I'd like to order lobster tonight via room service, etc. In one embodiment, as an example of the Hotel Skill, the customer (user) issues a voice command to the device as follows: "Alexa ask the hotel to bring me fresh towels." As described above, the communication module in the device processes the received voice signals from the user, thereby creating output data. The communication module sends the output data over the network to the EM API Server. The EM API Server retrieves information relative to the particular device which placed the request from the EM Database API Server, for example, the room number (in this example 410) or location of the device within the hotel, and the protocol for fulfillment of the request, e.g., method of contact previously setup for Hotel Mischel via Hotel Mischel's ADMIN Web Interface, as described above, in order to fulfill the particular request (in this case bringing fresh towels to Room 410), i.e., email, text, etc.

The EM API Server sends the request to Amazon AVS for voice-to-text conversion as described above. Amazon AVS and Amazon Web Services (AWS) Lambda process the request creating a voice response and control information related to the custom Hotel SKILL invoked by the user's voice command and returns input data to the EM API server. In one or more embodiments, the EM API Server sends a voice response (binary audio file when created by AVS) back to the requesting device to inform the customer: "I sent a notification to room service; fresh towels are on their way." The EM API Server uses the control information to communicate with the Amazon Web Services (AWS) (Simple Que Service) SQS Server and the Jobs server in order to send a communication back to the Hotel Mischel in order to fulfill the customers request for fresh towels. Queuing is implemented in job processing to make sure that requests are not lost and are completed. Upon fulfillment of the request for fresh towels, a message is sent back to the device completing the request.

Other VT & AI solutions can be used in the system of FIG. 5A. For example, in place of the Amazon system described above, a combination of voice-to-text and AI is provided from other systems. In one or more embodiments, the interactive device communicates through the cloud with a voice-to-text (VT) system such as Google speech-to-text, IBM speech-to-text, etc. thereby avoiding sending voice data through the EM API Server. In operation, the voice data is sent from the interactive device to the VT system and then after conversion, the data is returned to the interactive device. The data is then sent to an AI system such as IBM's Watson for processing and the result is returned to the interactive device. Optionally, in some embodiments, a custom wake word is processed locally on the interactive device as described above.

Figure 5B:
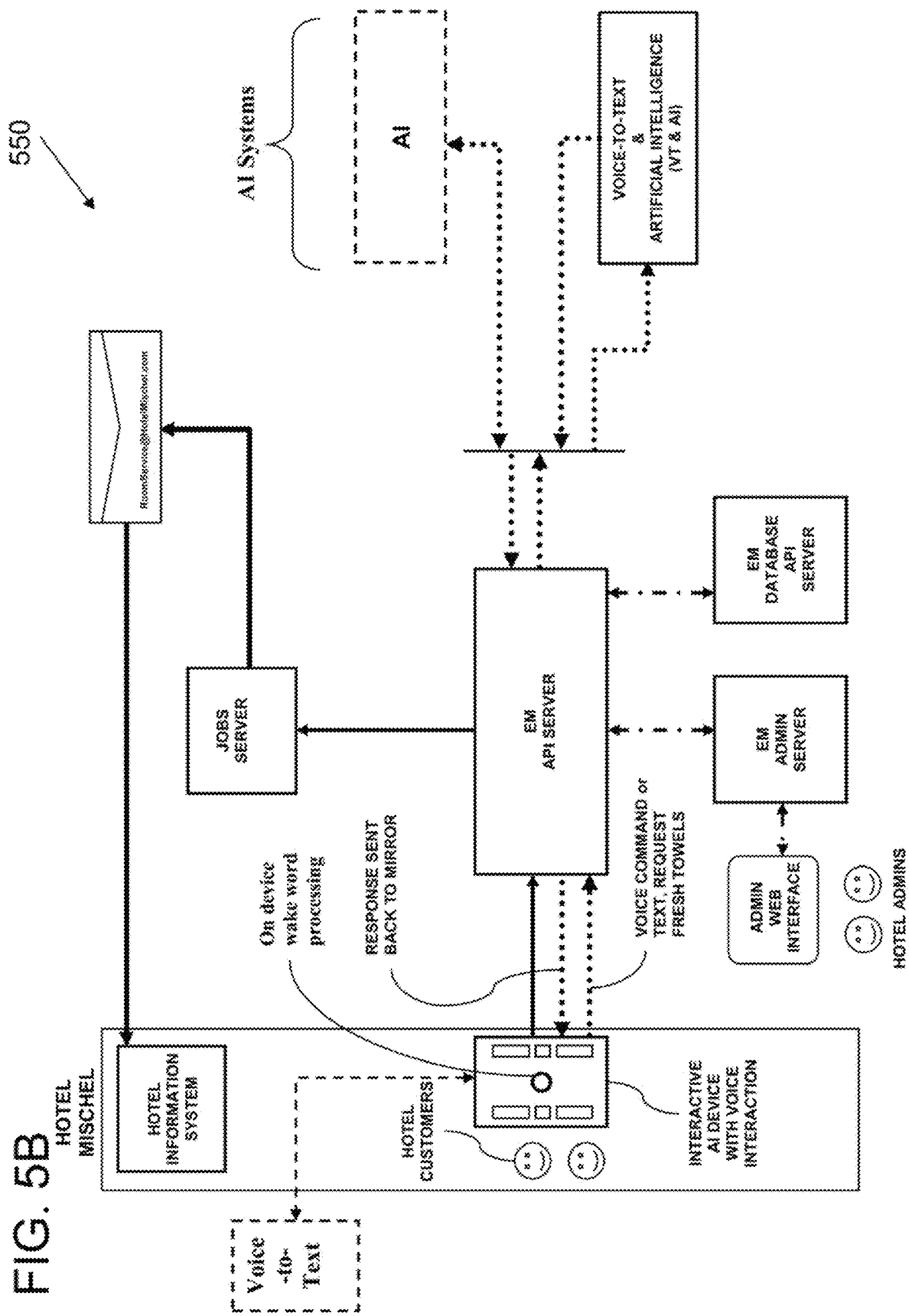
FIG. 5B illustrates alternative communications network architecture to support intelligent voice interaction in a device, according to embodiments of the invention.

FIG. 5B illustrates, generally at 550, alternative communications network architecture to support intelligent voice interaction in a device, according to embodiments of the invention. With reference to FIG. 5B, the voice-to-text conversion and an artificial intelligence (VT & AI) system (other than Amazon's AVS) is architected with a voice-to-text translation engine and structure of establishing trigger words and logic to obtain control information from the voice-to-text translation (extraction of a user's intent contained within the voice signals). This is done in response to a user's speech that is output from a device. The VT & AI system parses the speech local to the trigger word in order to establish control information which is returned to the device as described above. In the embodiment of FIG. 5B, the AWS SQS server is replaced with the Jobs server shown in the figure. The Jobs server receives the translated voice data from the VT & AI and control information and then queues up the required action that corresponds to the customer's request if needed.

Figure 6:
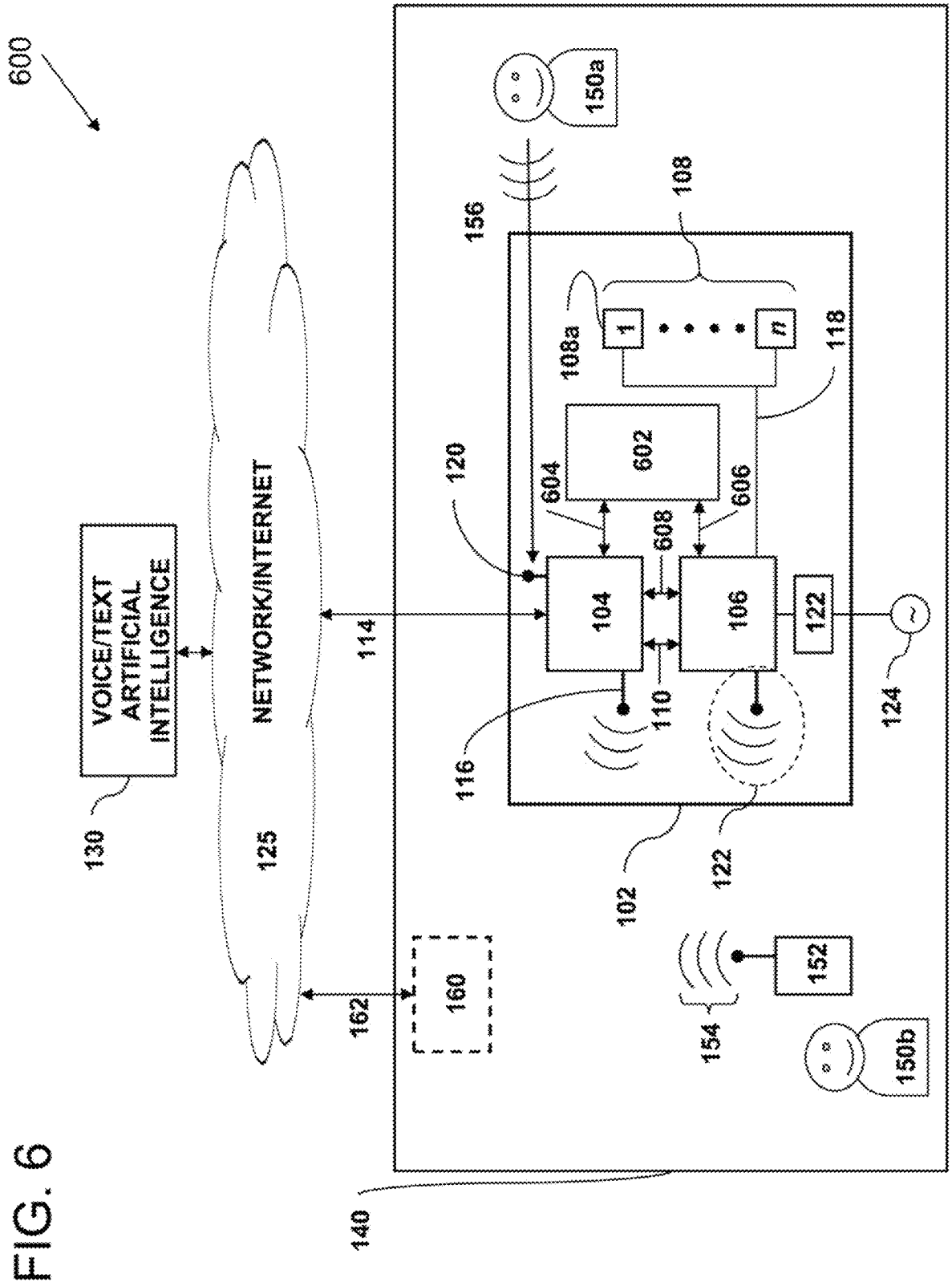
FIG. 6 illustrates architecture for an intelligent voice interactive device, according to embodiments of the invention.

Alternatively, the speech data is not sent through the EM API Server. In one or more embodiments, the interactive device communicates through the cloud with a voice-to-text (VT) system such as Google speech-to-text, IBM speech-to-text, etc. In operation, the voice data is sent from the interactive device to the VT system and then after conversion, the text data is returned to the interactive device. The data is then sent to an AI system such as IBM's Watson for processing and the result is returned to the interactive device. Optionally, in some embodiments, a custom wake word is processed locally on the interactive device. Custom wake word processing is described more fully in conjunction with the figures that follow Interactive Devices FIG. 6 illustrates, generally at 600, architecture for an intelligent voice interactive device, according to embodiments of the invention. With reference to FIG. 6, a display 602 is included with the communication module. The display 602 receives a video signal, such as, for example, a HDMI video signal from the first computing device 104. The display 602 receives power from the second computing module at 606. The accompanying audio signal is passed from the first computing module 104 to the second computing module 106 at 608. The audio signal is amplified in the second computing module and is output to one or more physical phenomena devices 108 such as speakers or transducers as described above. In one or more embodiments, the audio consists of two or more channels of audio.

In some embodiments, the modular architecture of the communication module (first computing module, second computing module) is replaced with the unified architecture illustrated in FIG. 1B with computing module 172 and the display 602 is attached thereto.

In some embodiments, the intelligent interactive device is provided in the form of an intelligent voice interactive mirror. In some embodiments, one or more of the physical phenomena devices 108 are located on the computing module 106 or 172 (according to a particular configuration). As described above, microphone 120 can also be one of the physical phenomena devices 108, or microphone 120 can be configured separately from the interactive device through wireless communication. Thus, microphone 1210 can be flexibly located.

Figure 7:
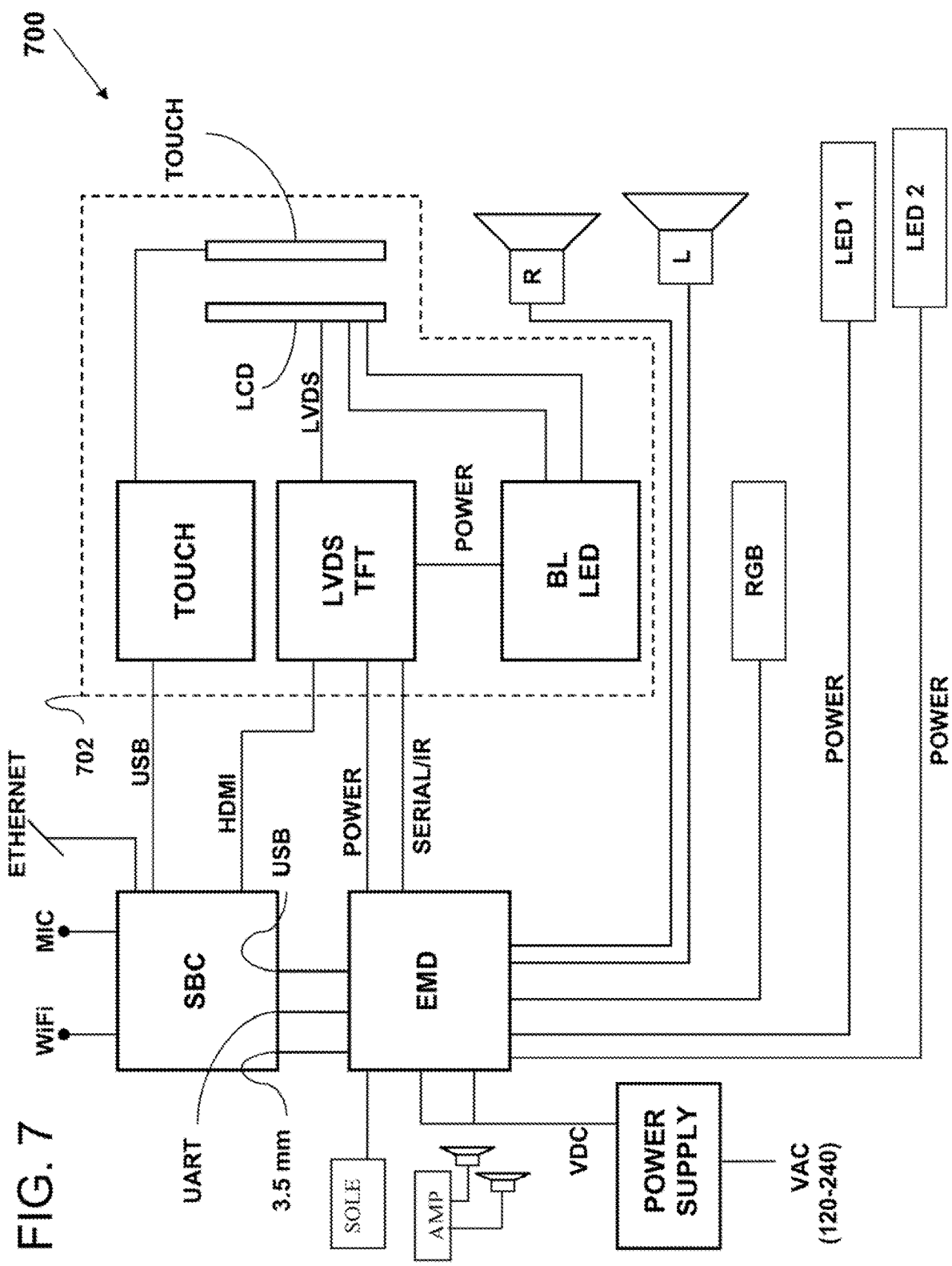
FIG. 7 illustrates architecture for an intelligent voice and touch interactive device, according to embodiments of the invention.

FIG. 7 illustrates, generally at 700, architecture for an intelligent voice and touch interactive device, according to embodiments of the invention. With reference to FIG. 7, a device is illustrated with touch and voice interaction functionality. The communications module of the device in 700 incorporates the modular architecture described above in conjunction with FIG. 1A with a first computing module labeled SBC and a second computing module labeled EMD. Broken line 702 indicates the components that constitute the touch screen display. In one or more embodiments, the touch screen display is a liquid crystal display (LCD) utilizing a low-voltage differential signaling (LVDS) design. Alternatively, the display can be made utilizing the embedded display port (eDP) standard. Touch controller is indicated by "Touch" and backlight emitting diodes (LED) are indicated with reference "BL LED." In other embodiments, different display technology is used, such as for example Organic Light Emitting Diodes (OLED). The LVDS TFT component can be distributed between the SBC and the LCD.

In some embodiments, the modular architecture of the communication module (first computing module (SBC), second computing module (EMD)) is replaced with the unified architecture illustrated in FIG. 1B with computing module 172 and the interactive touch display 702 is attached thereto.

In some embodiments, the intelligent voice and touch interactive device is provided in the form of an intelligent voice and touch interactive mirror.

Figure 8A:
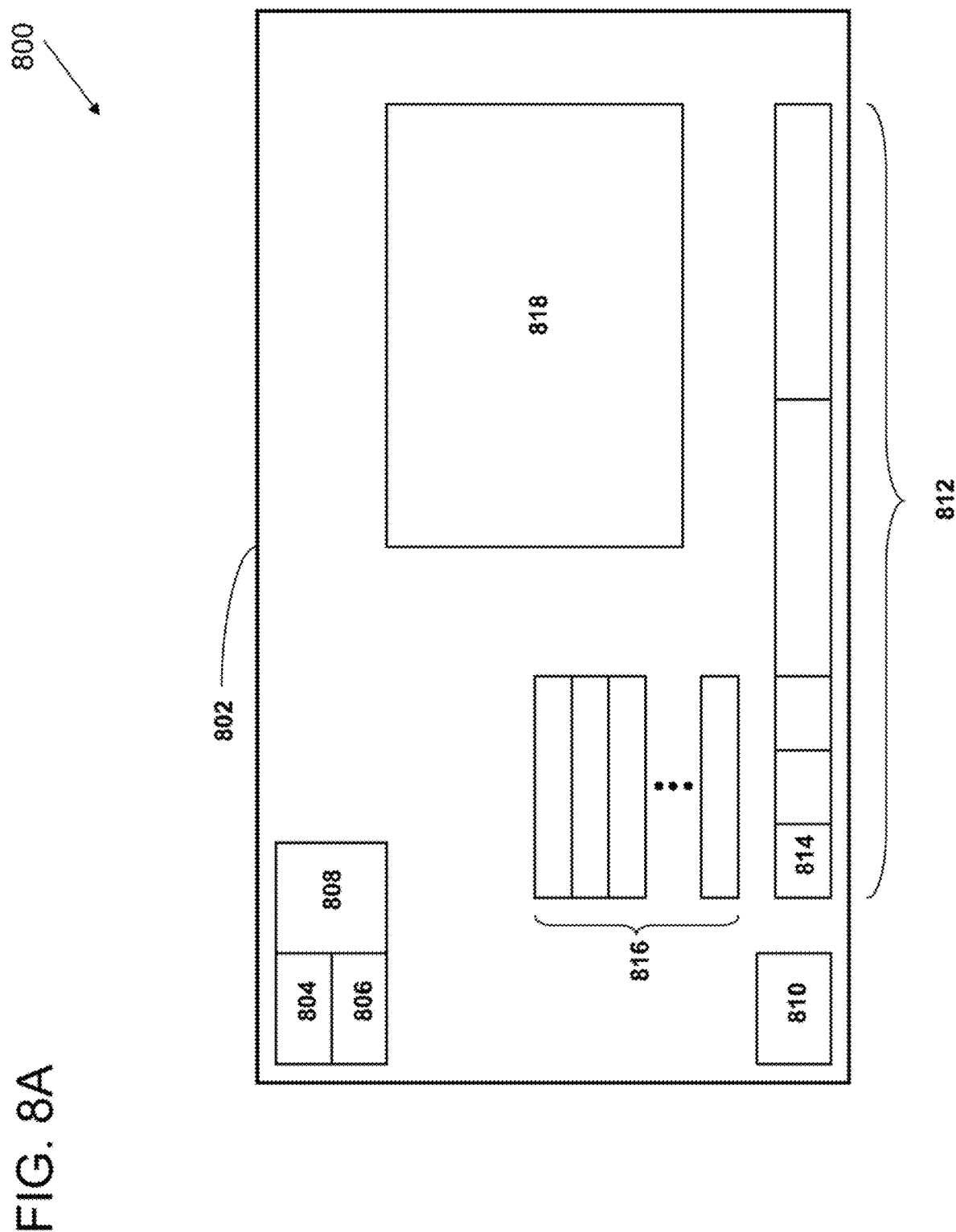
FIG. 8A illustrates a user interface logical arrangement, according to embodiments of the invention.

FIG. 8A illustrates, generally at 800, a user interface logical arrangement, according to embodiments of the invention. With reference to FIG. 8A, a display screen of an intelligent voice and touch interactive device is illustrated at 802. In some embodiments, the intelligent voice and touch interactive device is provided in the form of an intelligent voice and touch interactive mirror. The display screen 802 could be in one or more embodiments the touch display 702 shown in FIG. 7. The display screen 802 is portioned into a plurality of regions chosen to communicate information to a user in an intuitive fashion. For example, a region 804 is used to display time. A region directly beneath the time display is a region 806, which is used to display the date. Thus, time and date are in the upper left hand corner of the display.

Directly to the right of the region 804/806 is a region 808, which is used to display weather. Thus, the upper left portion of the display is used to communicate time/date/weather. These data are important to most users and are logically grouped together to provide easy location on the display.

In the bottom left corner is a region 810, which is used for hospitality or commercial branding according to the environment in which the display is used. In this example, Hotel Mischel is illustrated below in FIG. 8B and FIG. 8C. In other embodiments, the region 810 is used to customize the display according to the owner's desires, such as "Our Business," "Our House" or the like.

Directly to the right of the region 810 is a region 812, that contains a plurality of regions that are used for control of the display. For example, a region 814 is a menu region that is used to provide a menu button. Touch or voice command will activate the menu button, bringing up an array of possible selections as illustrated in menu 816. In one embodiment, the region 814 is illustrated in FIG. 8B and is described further below.

A region 818 is used for display of content such as video, images corresponding with music, etc.

Figure 8B:
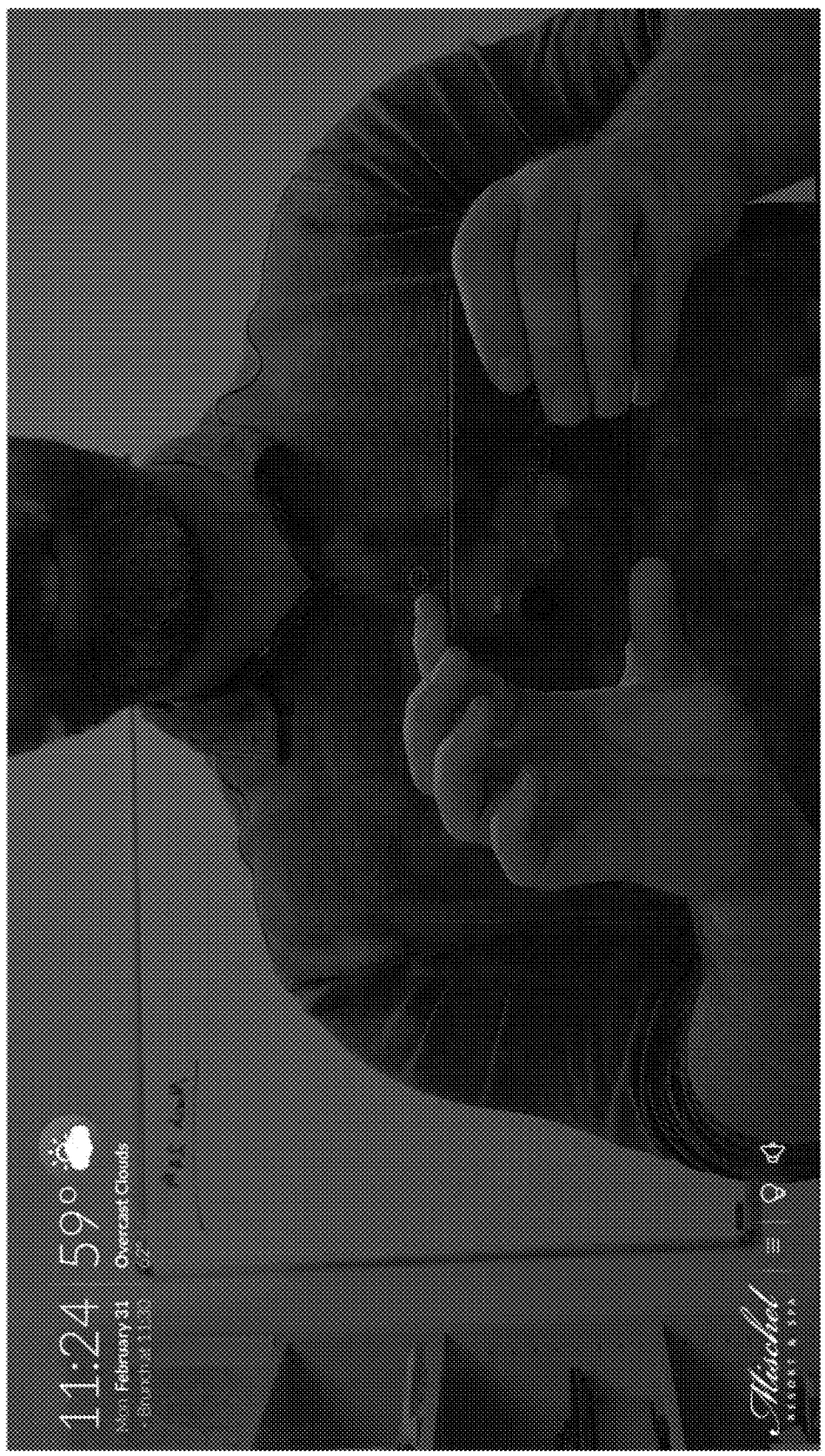
FIG. 8B illustrates a display of a user interface following the logical arrangement of FIG. 8A in one state, according to embodiments of the invention.

FIG. 8B illustrates a display of a user interface following the logical arrangement of FIG. 8A in one state, according to embodiments of the invention. With reference to FIG. 8B, in one or more embodiments, all of the regions described above in conjunction with FIG. 8A are populated; however the menus are closed in FIG. 8B.

Figure 8C:
FIG. 8C illustrates a display of a user interface following the logical arrangement of FIG. 8A, in a second state, according to embodiments of the invention.

FIG. 8C illustrates a display of a user interface following the logical arrangement of FIG. 8A, in a second state, according to embodiments of the invention. In one embodiment, the region 812 (FIG. 8A) has three sub-regions which provide the functionality, from left to right, as follows; "menu," "backlight adjustment," and "volume adjustment." In other embodiments, more than three sub-regions are provided, that can provide, for example, a message field from the Hotel concerning an offer (advertisement). The state of the display in FIG. 8C has the program menu open. The region 818 can be used to display a variety of images or video content as described more fully below in conjunction with the figures that follow.

Figure 8D:
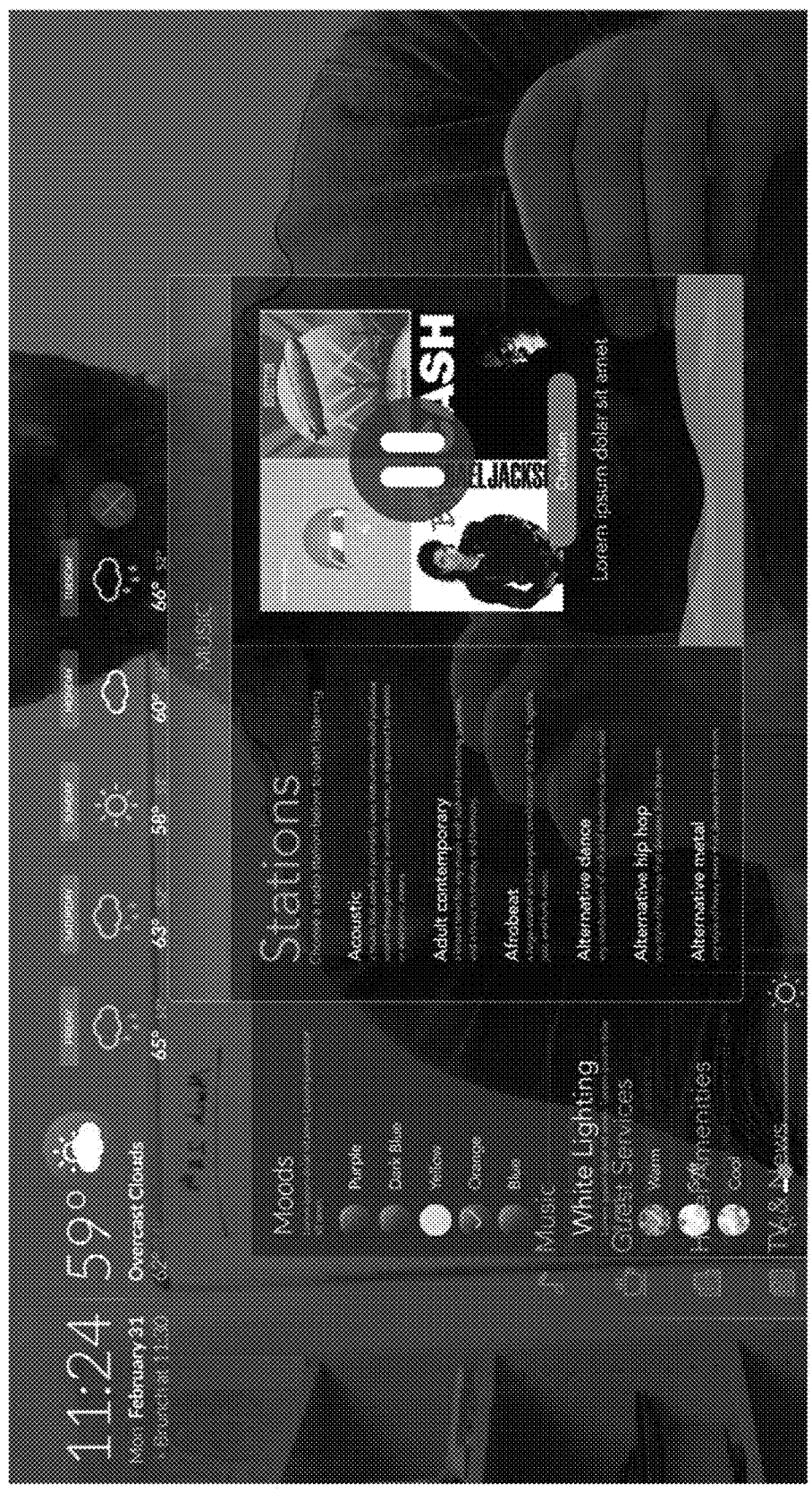
FIG. 8D illustrates a display of a user interface following the logical arrangement of FIG. 8A, in a third state, according to embodiments of the invention.

FIG. 8D illustrates a display of a user interface following the logical arrangement of FIG. 8A, in a third state, according to embodiments of the invention. With reference to FIG. 8D, the menus are open and music is playing. In one embodiment, music playing as illustrated in FIG. 8C is an example of the Music program described in conjunction with the figures below.

Interactive Device (No Voice)—with Touch Interaction

Figure 9A:
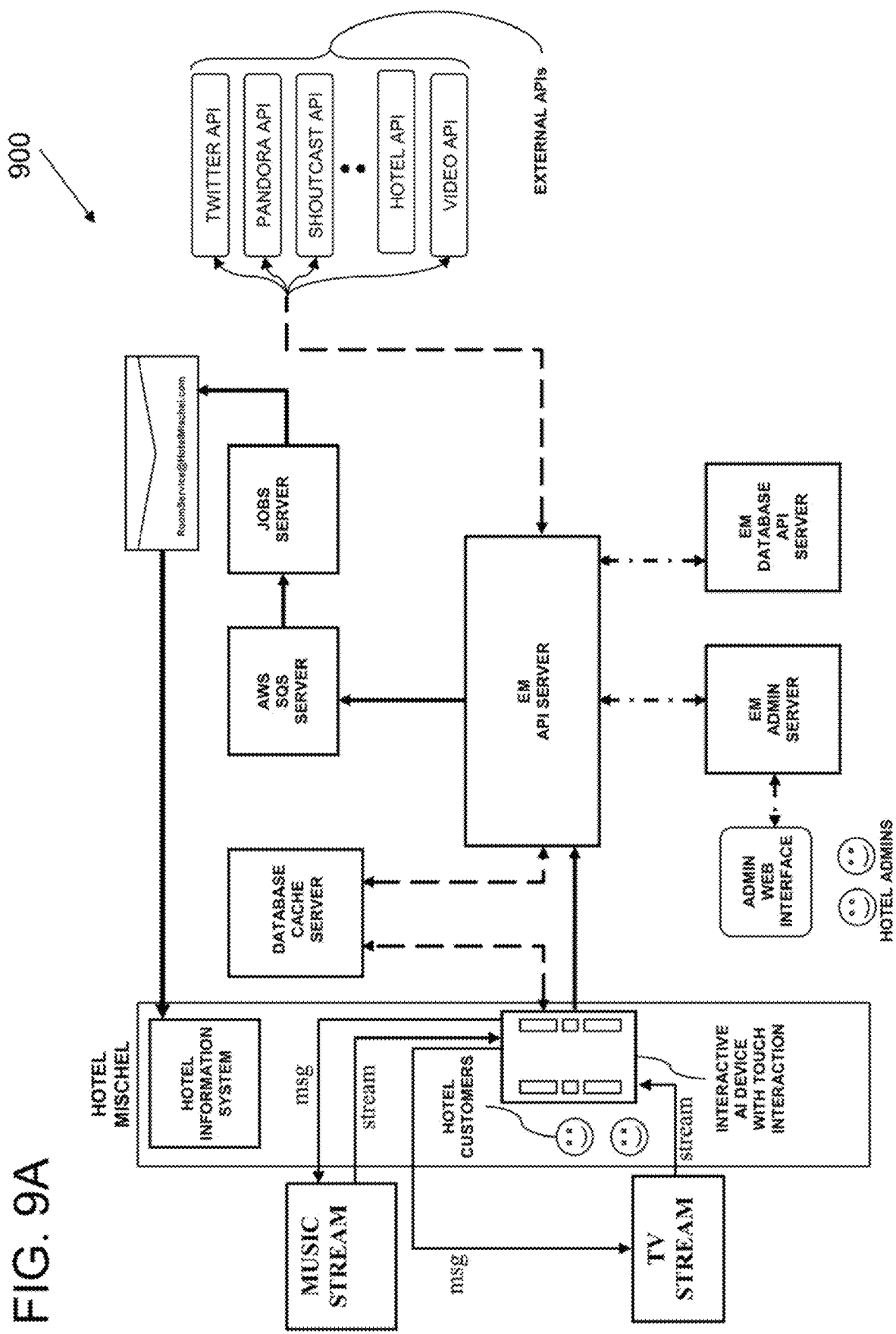
FIG. 9A illustrates communications network architecture to support an interactive mirror with content delivery and touch interaction, according to embodiments of the invention.

FIG. 9A illustrates communications network architecture to support an interactive device with content delivery and touch interaction, according to embodiments of the invention. With reference to FIG. 9A, a hospitality environment is illustrated with a touch interactive device that can be configured as a mirror in some embodiments. The touch interactive device contains intelligent touch interaction functionality as described above in conjunction with the preceding figures. In one or more embodiments, the hospitality environment is a hotel, such as Hotel Mischel, with a plurality of touch interactive devices as described above. Only one touch interactive device is shown in the figure for clarity, but it is understood that the description will support a general number of i touch interactive devices. The touch interactive devices can be distributed within the guest rooms, in a pool area, a workout area, etc. within Hotel Mischel. In various embodiments, the system 900 is scaled to accommodate a general number of j individual hotels, such as Hotel Mischel, Hotel Zerr, etc. In such a deployment each hotel is given its own secure account on the EM ADMIN Server.

Through the multi-account functionality of the EM ADMIN Server, each hotel, e.g., Hotel Mischel, Hotel Zerr, etc. has its own Hotel ADMIN Web Interface accessed by its own account. The Hotel ADMIN Web interface provides a single management point that is used to control any number of touch interactive devices, from one to thousands or more (a general number m) of touch interactive devices that are deployed within a given hotel or hospitality environment.

Each hotel, identified by "HOTEL ADMINS" uses their respective ADMIN Web Interface to furnish the data needed by the touch interactive devices for use by the hotel's customers. Such data includes, but is not limited to, identifying indicia for the device such as Internet Protocol (IP) address used with the device, what hotel and room number or location within the hotel property a given device is located at, data necessary to direct execution of user commands (such as data related to providing services initiated by a user's touch interaction with a device), such as for example, delivery method of communication back to the hotel; content available to a device, such as, logo, weather location, news feeds, music types, Twitter, etc. Execution of services often requires communication back to a hotel for execution of the requested action in fulfillment of the service. Examples of communication back to the hotel are, but are not limited to; email, text message, phone number, etc. An example of communication back to the hotel using email is described in the example to follow below.

The data entered by the hotel administrators (admins) is stored on the EM Database API Server and is accessed by the EM API Server during processing of voice commands issued by the customers of the plurality of hotels which are served by the system 900.

The EM Database API Server stores the template data for the touch interactive devices. For example, the hotel admin user setup templates that establish what data is available on the devices, e.g., address, news feed source, Twitter, room number and other information used to establish the functionality and content sources for the interactive devices.

In one or more embodiments, a touch interactive device is the front end to all of the data and services that are available to the customers of a hotel. The touch interactive device makes calls to the Database Cache Server for weather, news, TV, music, hotel advertisement, other content, etc. as described more fully below in the figures that follow.

Data presented to the user on a touch interactive device is retrieved from the EM Database Cache Server. The EM API Server makes requests to the external APIs and caches them to the EM Database Cache Server, keeping the EM Database Cache Server updated and current. The intermediary function of the EM API Server reduces API calls directly to the external API services.

An advantage of the staged architecture (device, EM Database Cache Server, EM API Server, and external API resources) is to provide a proxy between the devices and many complex systems (API resources) in order to leverage scalability, redundancy, and to reduce the load and cost on external API services by means of caching a single API call (on the EM Database Cache Server) and then relaying that call to 10,000s of devices within system 900.

The server architecture of system 900 also permits system wide changes to be accomplished at the server level instead of the device level. For example, if a weather service stops working it is not necessary to make changes (software changes) on all of the installed devices. Instead, the changes are made at the server level and those changes are reflected in all connected devices. Remote booting of interactive devices is accomplished through use of the various architectures illustrated in the figures within this description of embodiments.

In operation, a hotel customer (user) interacts with a touch interactive device by opening some functionality available on the display screen such as weather, music, news or other widget. The device makes a request to the EM Database Cache Server for current data. If no current data is available, the request is pushed to the EM API Server. The FM API Server receives device requests and asks external APIs for current data. In one embodiment, external APIs are indicated in FIG. 9A as TWITTER API, PANDORA API, SHOUTCAST API, VIDEO API, etc. New data received from the external APIs are published to the EM Database Cache Server and the device is updated.

Depending on a configuration of the system of FIG. 9A, in some embodiments, the interactive device communicates with the cloud directly and does not go through the EM API Server. For example, following a user interaction, the interactive device connects with a source of cloud-based music content and the music content streams back to the interactive device. Similarly, following a user interaction, the interactive device connects to a source of cloud-based video content and the video content streams back to the interactive device. This architecture reduces the requirements on the EM API Server and has advantages in some applications where a large number of interactive devices are deployed in a network.

In various embodiments, the touch interactive artificially intelligent (AI) device is capable of executing services for customers of a hotel. The example provided above, with the voice interactive AI device, delivering fresh towels to room 410 of Hotel Mischel can also be performed by the touch interactive artificially intelligent (AI) device deployed in FIG. 9A. In this example, the hotel customer makes a request for fresh towels by opening the room service application (APP) on the device. For example, in one or more embodiments, a room service program can be accessed from menu region 814 and a selection from region 816 in an interactive device configured with a Room Service artificial intelligence (AI) software program (referring to FIG. 8A). Note that the room service program is described more fully below as pan of the Hotel Services software application described in conjunction with FIG. 20 and FIG. 21A.

Referring to FIG. 9A, the towel request is sent to the EM API Server. The EM API Server in combination with the EM Database API Server retrieves the protocol for processing the towel request. The EM API Server pushes the towel request out to the AWS SQS Server. The AWS SQS Server is responsible for queuing requests from the device to external services. Such as sending a communication via the protocol used to fulfill a towel request at Hotel Mischel. The request stays in the queue until the Jobs Server has completed the expected task. After the task is completed, notification is sent out notifying the requesting device that the request has been lodged and the fresh towels should arrive shortly.

Figure 9B:
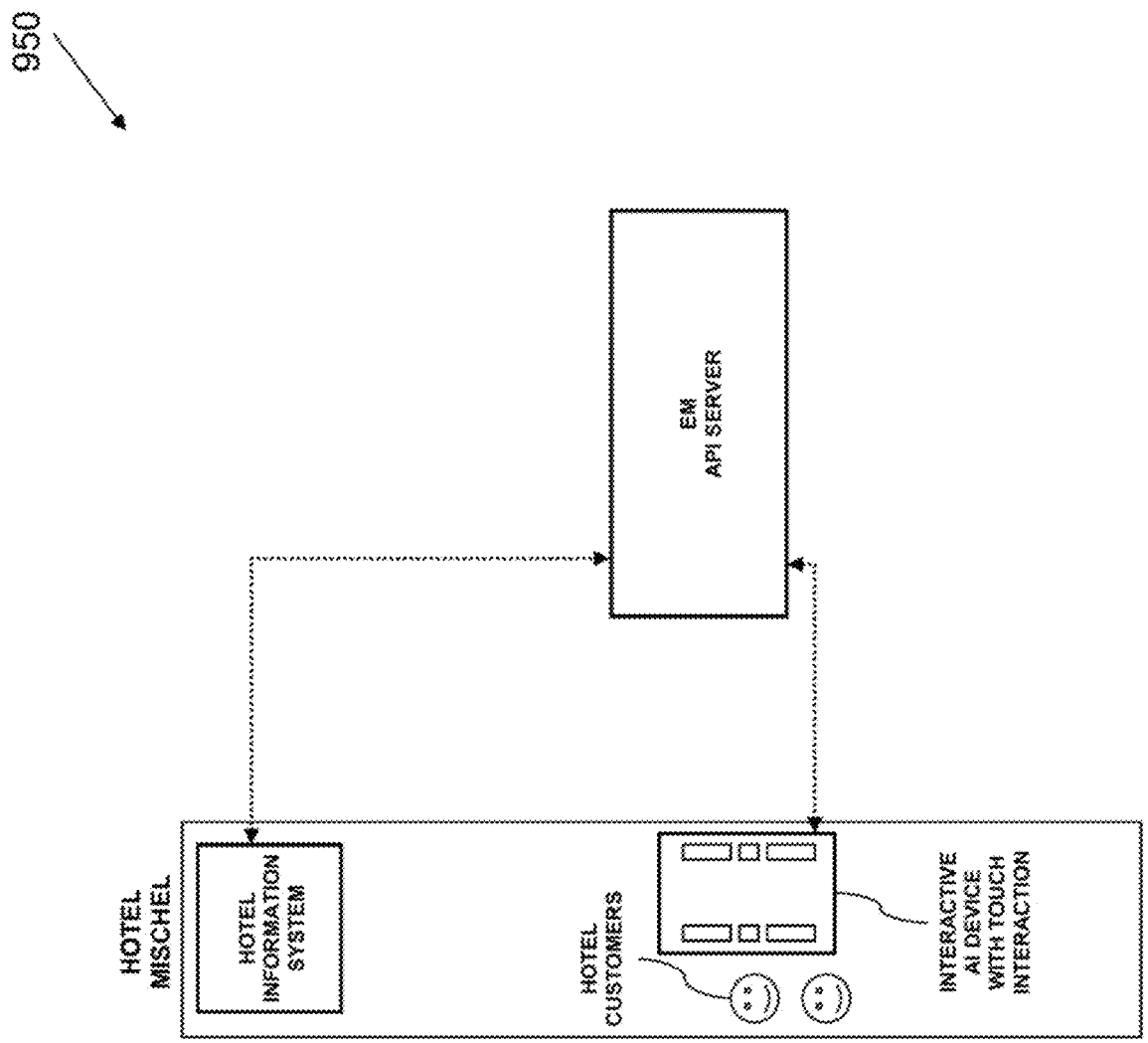
FIG. 9B illustrates communications network architecture to support an interactive device with content delivery and touch interaction, according to embodiments of the invention.

FIG. 9B illustrates, generally at 950, another variation of communications network architecture to support an interactive device with content delivery and touch interaction, according to embodiments of the invention. With reference to FIG. 9B, the ADMIN Web Interface, the EM ADMIN Server, and the EM Database API Server, and the EM API Server are combined together into a single server shown in FIG. 9B as EM API Server. Note that this alternative configuration is also applicable to FIG. 5A. FIG. 5B, shown above and FIG. 10 and FIG. 11 shown below which are used to support voice interactive devices.

FIG. 9B also illustrates another integration of an interactive device network into a hotel information system (HIS). The alternative integration is also applicable to FIG. 5A, FIG. 5B, shown above and FIG. 10 and FIG. 11 shown below which are used to support voice interactive devices.

Figure 9C:
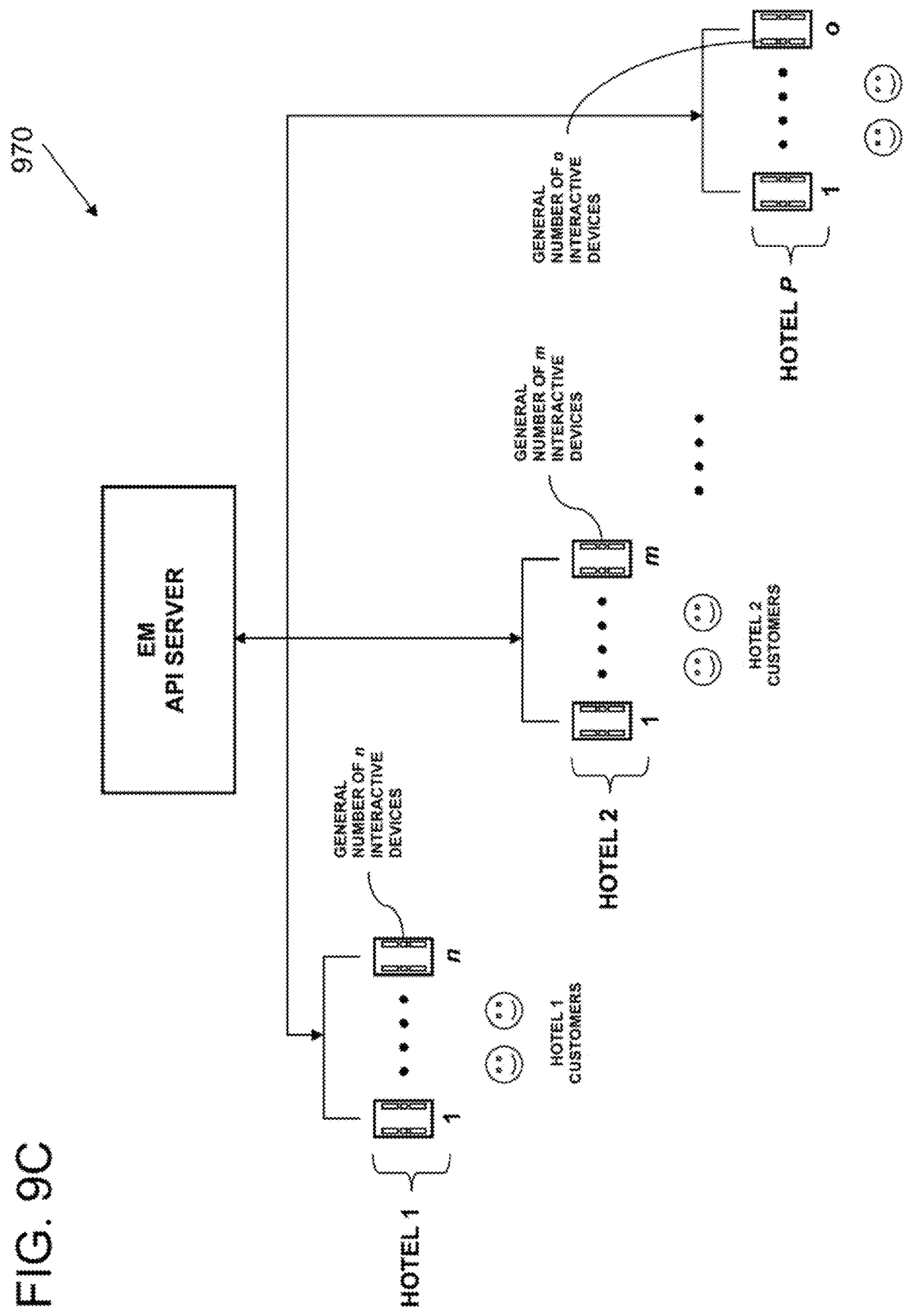
FIG. 9C illustrates a plurality of interactive devices and a plurality of hotels within an interactive device network, according to embodiments of the invention.

FIG. 9C illustrates a plurality of interactive devices and a plurality of hotels within an interactive device network, according to embodiments of the invention. With reference to FIG. 9C, central control and management of a plurality of interactive devices through a common control point is indicated in the figure as EM API Server. The plurality of interactive devices is distributed by hotel. For example, hotel 1 has a plurality of interactive devices indicated by a general number "n." Hotel 2 has a plurality of interactive devices indicated by a general number "m." A general number of hotels is indicated by "P" and hotel P contains a general number of interactive devices "o." The interactive devices managed through the central point, EM API Server, can be any combination of; touch interactive devices, voice interactive devices, or touch & voice interactive devices. In some embodiments, interactive devices are configured with VT & AI interactive capability provided either through AVS SKILLs or other VT & AI systems such as for example combinations of Google Voice, IBM Speech, IBM Watson, etc. The central control and management of interactive devices presented in FIG. 9C is applicable to the figures described above and below, such as, but not limited to; 5A, FIG. 5B, FIG. 9A, FIG. 9B, FIG. 10, FIG. 11 and others.

Figure 10:
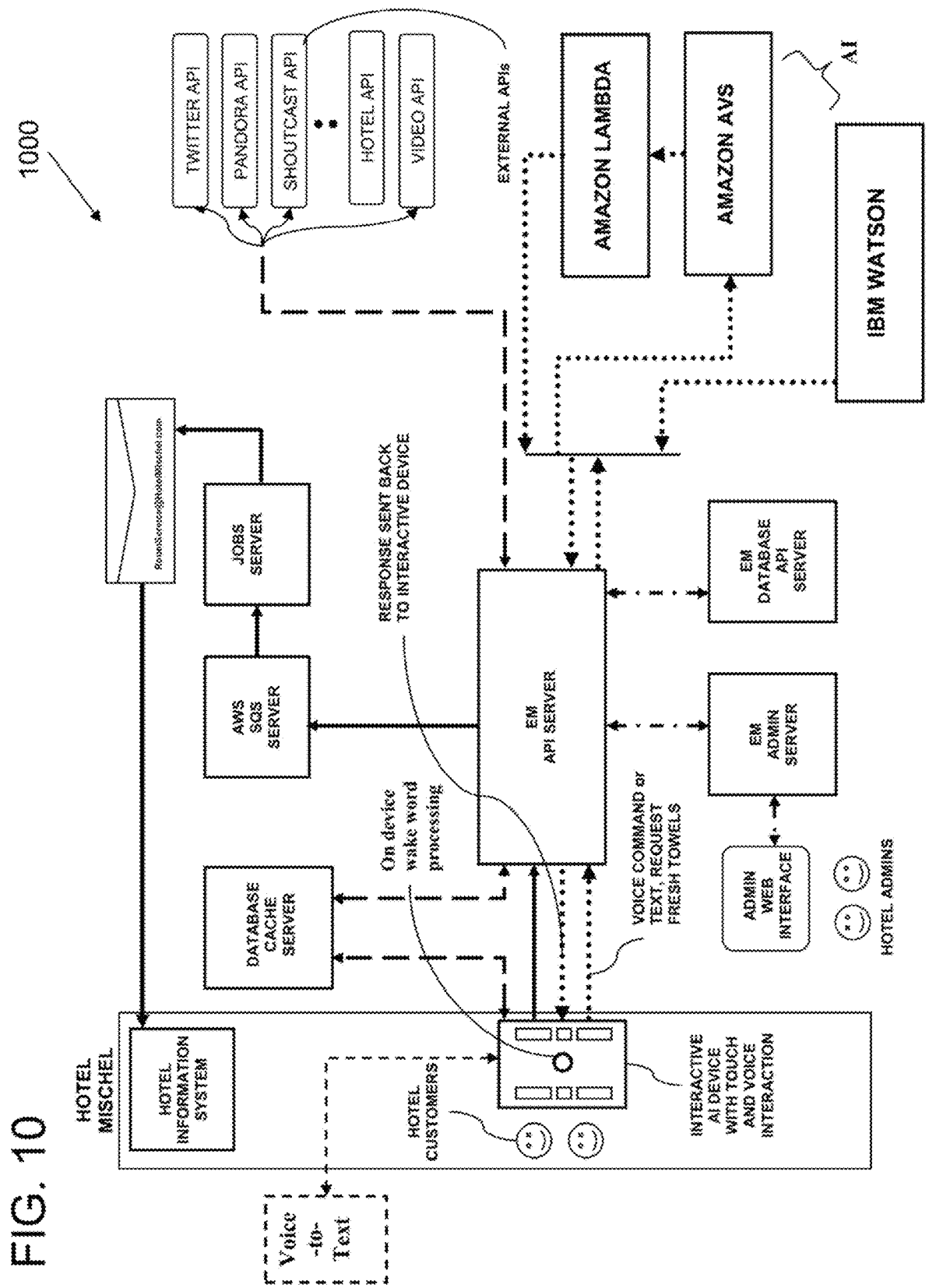
FIG. 10 illustrates communications network architecture to support combined intelligent voice interaction, touch interaction, and content delivery in a device, according to embodiments of the invention.

FIG. 10 illustrates, generally at 1000, communications network architecture to support combined intelligent voice interaction, touch interaction, and content delivery in a device, according to embodiments of the invention. With reference to FIG. 10, the architecture present therein is the combination of the network architecture from FIG. 5A or FIG. 5B and FIG. 9A or FIG. 9B.

When a touch and voice interactive device is placed in the network illustrated in 1000, a user (e.g., Hotel Mischel customer) can obtain hotel services through either the AI touch interaction functionality of the device or from the AI voice interaction functionality of the device. In the example above ordering fresh towels, the customer could have obtained the fresh towels by either method, i.e., the method of FIG. 5A or FIG. 5B the method of FIG. 9A or FIG. 9B.

Other VT & AI solutions can be used in the system of FIG. 10. For example, in place of the Amazon system described above, a combination of voice-to-text and AI is provided from other systems. In one or more embodiments, the interactive device communicates through the cloud with a voice-to-text (VT) system such as Google speech-to-text, IBM speech-to-text, etc. thereby avoiding sending voice data through the EM API Server. In operation, the voice data is sent from the interactive device to the VT system and then after conversion, the text data is returned to the interactive device. The data is then sent to an AI system such as IBM's Watson for processing and the result is returned to the interactive device. Optionally, in some embodiments, a custom wake word is processed locally on the interactive device as described above.

Combinations

The combined architecture illustrated in FIG. 10 also permits the combination of content delivery from two or more independent sources. In one non-limiting example, provided merely for illustration a video source and an Alexa Skill are combined into a unified audio/video customer experience. For example, current Alexa Skills are audio based such as: "Fireplace Sounds," "Ocean Sounds," "Rain Sounds," "Bird Song," etc. These Skills stream audio onto the Amazon Echo speaker. However, there is no video to accompany the audio on the Amazon Echo Speaker. By using the system and methods of FIG. 10, an Alexa Skill such as Fireplace Sounds is combined with video of a fireplace and is played in a software application running on the communication module within the interactive mirror. With reference to FIG. 8A, the application can be accessed via the region 814 (menu) and selection of the relevant application from the list presented in 816.

Figure 11:
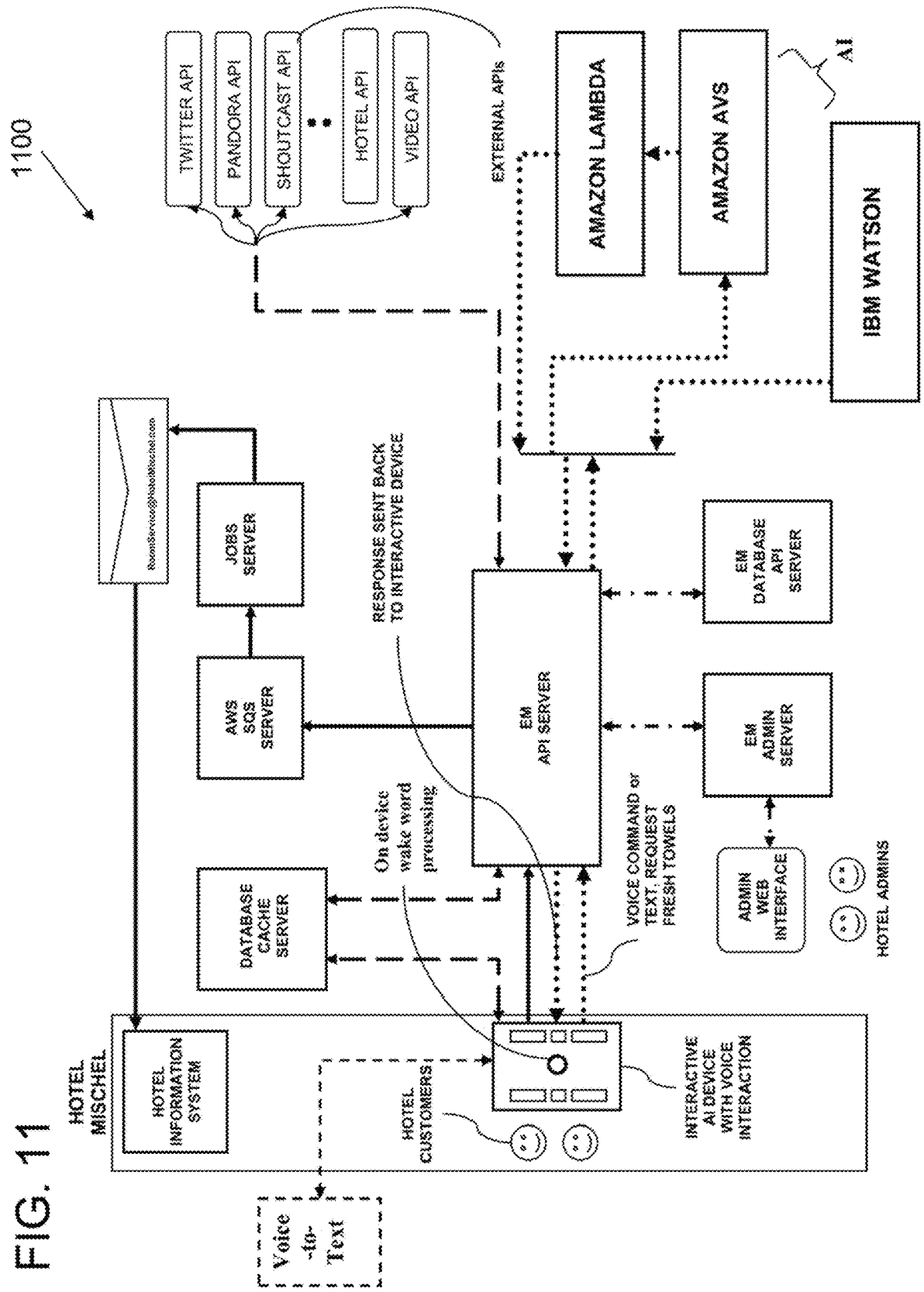
FIG. 11 provides the integration of video and audio according to embodiments of the invention.

In an alternative embodiment, a non-touch screen voice interactive device is used in the network of FIG. 11 to provide voice interactive functionality and video displayed to the customer on the display provided in a device having an architecture illustrated in FIG. 6. As used in this description of embodiments, "non-touch" means that the display is not a touch display (screen). With respect to FIG. 11 and FIG. 6, the device containing a non-touch screen, such as 602, can be configured with a switch or switches such as a capacitive touch sensor(s) or a gesture sensor(s) as one or more of the physical phenomena devices, such as one or more of 108. In such a configuration, the non-touch screen display 602 is able to display content to the user and to obtain the content apart from a touch screen action by the user. In various embodiments, the content update to the device described above in conjunction with the previous figures, is accomplished when the user turns the display 602 on via a switch which then initiates a request from the device to the EM Database Cache Server or if the display is always powered up the device can be configured to make periodic request from the Database Cache Server to update its content.

In another embodiment, the non-touch screen display used in the device of FIG. 11 provides the integration of video and audio described above with respect to Alexa Skills such as: "Fireplace Sounds," "Ocean Sounds," "Rain Sounds," "Bird Song," etc. This is accomplished either by menu selection with a remote control or by a custom SKILL developed to combine video from the EM API Server with the Alexa Skill through voice command.

In other embodiments, the systems of FIG. 9A, FIG. 10, and FIG. 11 are used to deliver television (TV) content to a hospitality environment such as Hotel Mischel. TV content originates from the external APIs and is delivered to the device(s) on request by a user as facilitated by the content delivery system of FIG. 11 using one of the video APIs.

Alternatively depending on the configuration of the system, an interactive device can connect to cloud-based sources of music or TV as described in conjunction with the figures above. Other VT & AI solutions can be used in the system of FIG. 11. For example, in place of the Amazon system described above, a combination of voice-to-text and AI is provided from other systems. In one or more embodiments, the interactive device communicates through the cloud with a voice-to-text (VT) system such as Google speech-to-text, IBM speech-to-text, etc. thereby avoiding sending voice data through the EM API Server. In operation, the voice data is sent from the interactive device to the VT system and then after conversion, the text data is returned to the interactive device. The data is then sent to an AI system such as IBM's Watson for processing and the result is returned to the interactive device. Optionally, in some embodiments, a custom wake word is processed locally on the interactive device as described above.

Hotel Services

Figure 12A:
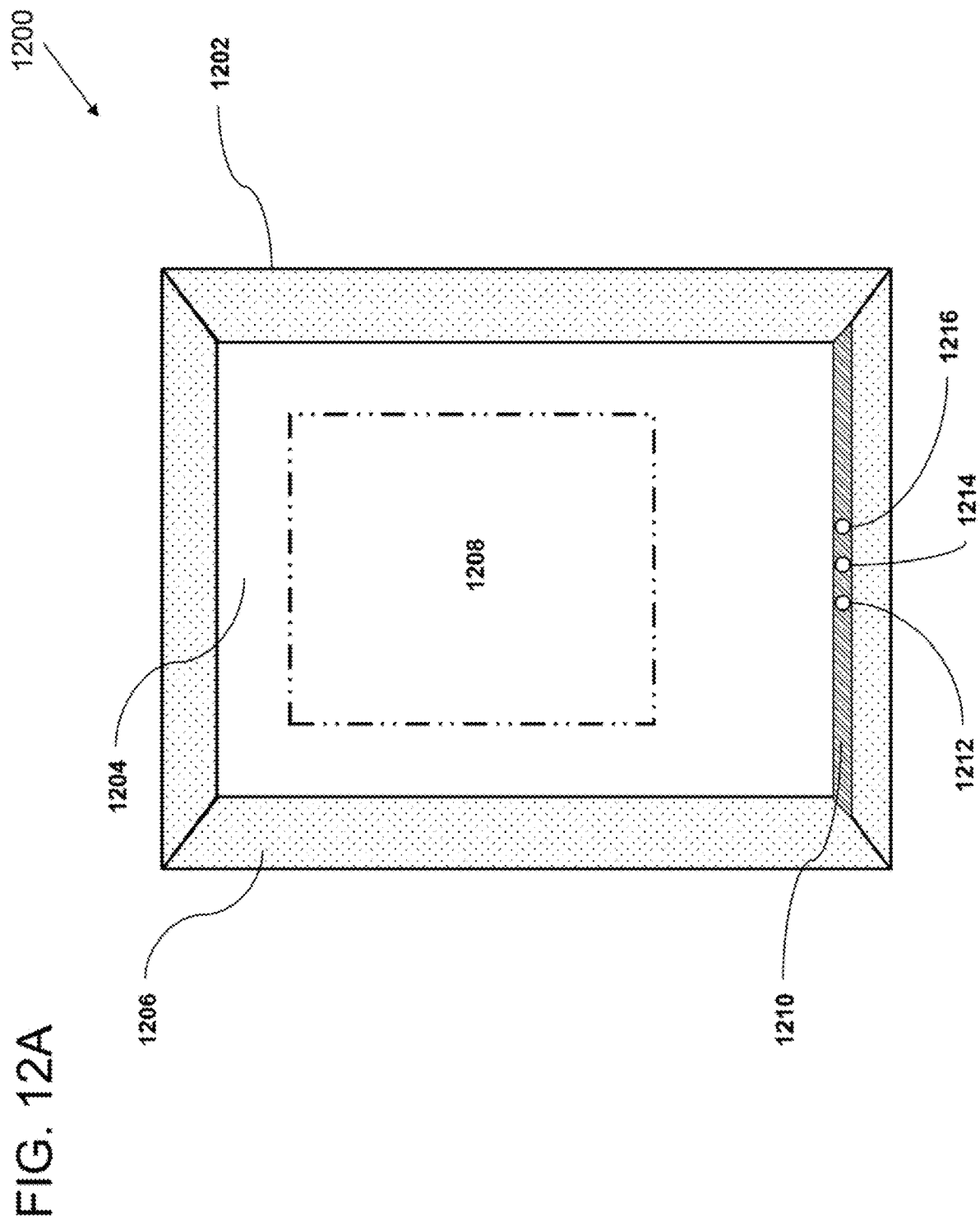
FIG. 12A illustrates physical phenomena device placement in a device frame, according to embodiments of the invention.
Figure 12B:
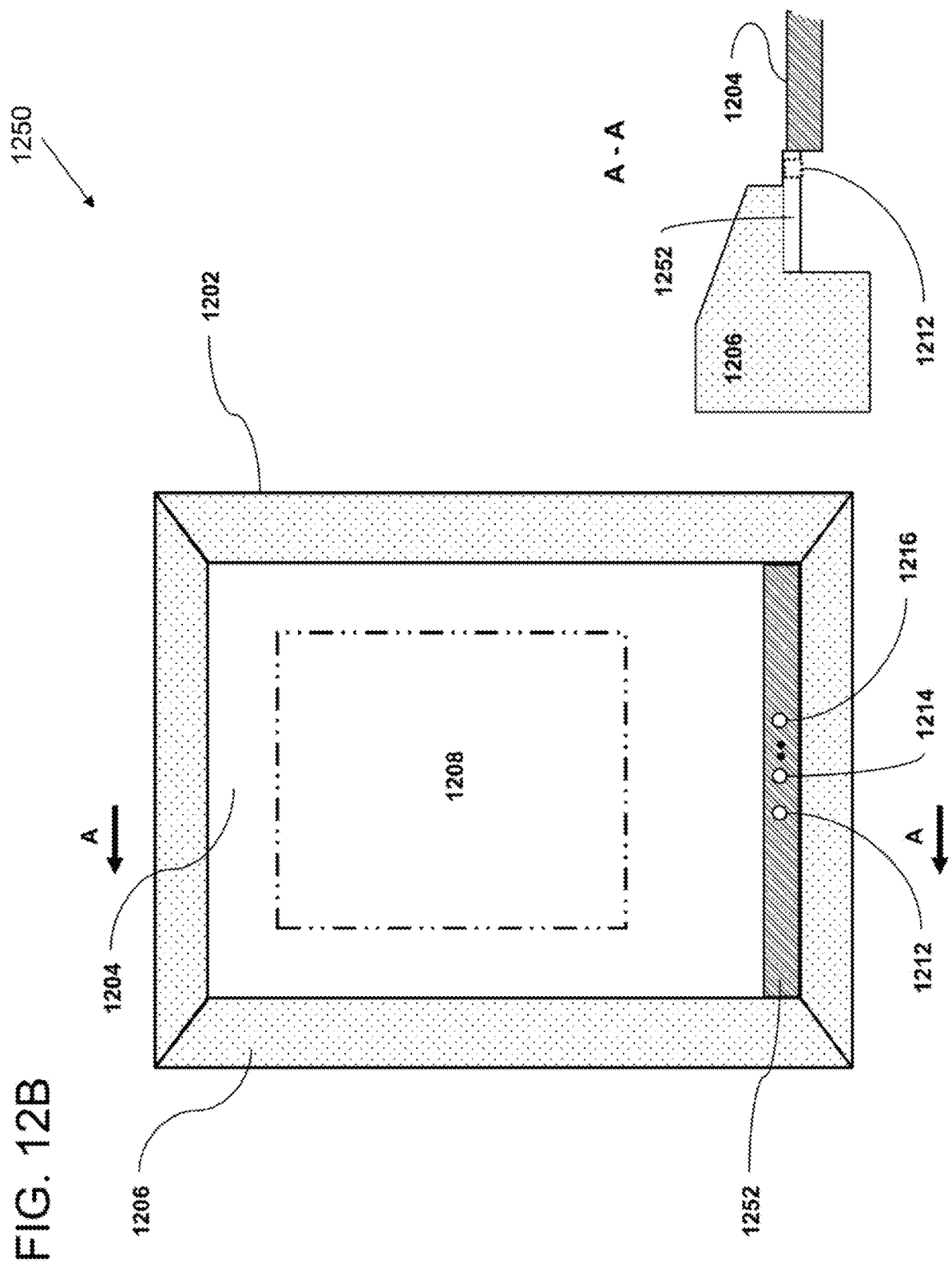
FIG. 12B illustrates physical phenomena device placement in a technology panel, according to embodiments of the invention.

FIG. 12A illustrates, generally at 1200, physical phenomena device placement in a device frame, according to embodiments of the invention. In one or more embodiments, a voice interactive device is configured as a voice interactive mirror. As described above, when a description is given using a mirror as an example of a device, such description is not limiting, but is merely illustrating an application to a mirror. Such description is readily applicable to devices other than mirrors. With reference to FIG. 12A, a voice interactive mirror 1202 has a frame 1206 and a mirror glass 1204. The frame 1206 has a region 1210 within which one or more physical phenomena devices are placed. The region 1210 is illustrated in a bottom member of the frame in FIG. 12A, however, in other embodiments; the region 1210 can be located in another member of the frame such as the top member or the left member or the right member of the frame 1206. In yet other embodiments, the region 1210 is not part of the frame but is part of an intermediate member that fits between the frame 1206 and the mirror glass 1204, an example of which is illustrated in FIG. 12B. An optional display is located on a back side of the mirror glass 1204 and is indicated at 1208. Note that the location 1208 of the optional display can be anywhere on the backside of the mirror glass 1204 and is located as shown in FIG. 12A merely for illustration.

Figure 14:
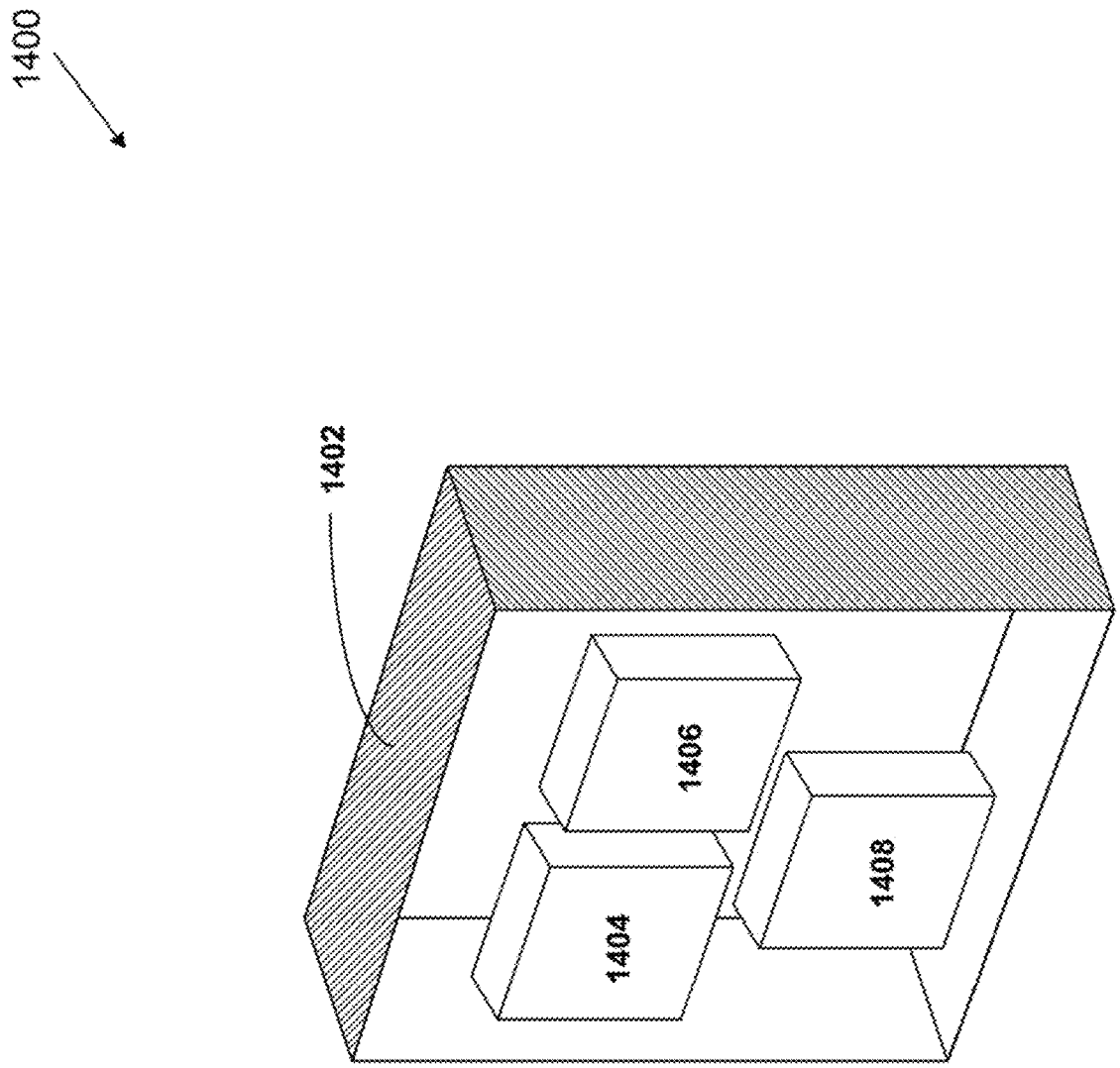
FIG. 14 illustrates packaging interactive device communication electronics, according to embodiments of the invention.

In one or more embodiments, a microphone is indicated by one of 1212, 1214, and 1216. A microphone can also be located on a chassis that the mirror is mounted to such as for example the chassis 1402 (FIG. 14). Alternatively, a microphone can be mounted below, above, to the left or to the right of the frame 1206. In one or more embodiments, a touch or gesture sensor is indicated by one of 1212, 1214, and 1216. In various embodiments, the touch or gesture sensor is a capacitive touch sensor. In one or more embodiments, a speaker is indicated by one of 1212, 1214, and 1216. In one or more embodiments, a camera is indicated by one of 1212, 1214, and 1216. A microphone (one or more of 1212, 1214, and 1216) is used to receive acoustic signals from a user during an interaction with the mirror 1202 as described above in conjunction with the previous figures. A speaker (one or more of 1212, 1214, and 1216) is used to broadcast acoustic signals back to a user (from a VT & AI system) during an interaction with the mirror 1202 as described above in conjunction with the previous figures. A camera (one or more of 1212, 1214, and 1216) is used to capture images or video of a front side of the mirror 1202 (including, in some embodiments, images of the user) during an interaction with the mirror 1202. In various embodiments, the captured images or video are used to adjust one or more of the physical phenomena devices (e.g., display, backlighting, etc.) or to accomplish a communication with a remote device accessible to the interactive mirror through an attached network. In some embodiments, a microphone mute control is one of the physical phenomena devices included in one or more of 1212, 1214, and 1216. A microphone mute control permits a user to mute the microphone. Muting the microphone disconnects the user from the VT & AI system that a mirror is in communication with. Note that the number of physical phenomena devices is not limited, and a general number is indicated in FIG. 12A.

FIG. 12B illustrates, generally at 1250, physical phenomena device placement in a panel, according to embodiments of the invention. With reference to FIG. 12B, a general number of physical phenomena devices, indicated by 1212, 1214, and 1216 are placed in a panel 1252. In various embodiments, the panel 1252 functions as an extension of the mirror 1204. An advantage of using the panel 1252 to mount the physical phenomena devices is that the mirror frame does not require modification. The mirror frame can be used, as is, during assembly of the interactive device.

Within FIG. 12B, view A-A illustrates a partial cross-sectional view of an interactive device. Optionally, the panel 1252 is proximate with or coupled to a structure 1254. The structure 1254 borders the mirror 1204 on one side and the frame 1206 and on the other side the structure 1254 serves to secure the mirror 1204 to the fame 1206. The structure 1254 can also provide a container or envelope, within which the electronics are located, such as the computing modules, power supply, physical phenomena devices, etc. In various embodiments, the cross section of the structure 1254 is u-shaped, square, rectangular, or provided in a shape necessary to facilitate securing the mirror and frame. In some embodiments, one or more physical phenomena devices are located within the structure 1254, such as but to limited to speakers. In other embodiments the panel 1252 and the structure 1254 are combined together into one unit. While the panel 1252 and the surface 1204 are shown misaligned (upper surfaces are at different elevations) in some embodiments, the upper surfaces of the two are aligned at the same elevation.

Note that as described herein, at times reference is made to a mirror; however, the interactive device need not be a mirror. For example, the interactive device illustrated in FIG. 12A, FIG. 12B or elsewhere herein, can be a framed picture, a plaque, a piece of furniture, etc. no limitation is implied by an illustration provided with reference to a mirror.

Figure 13:
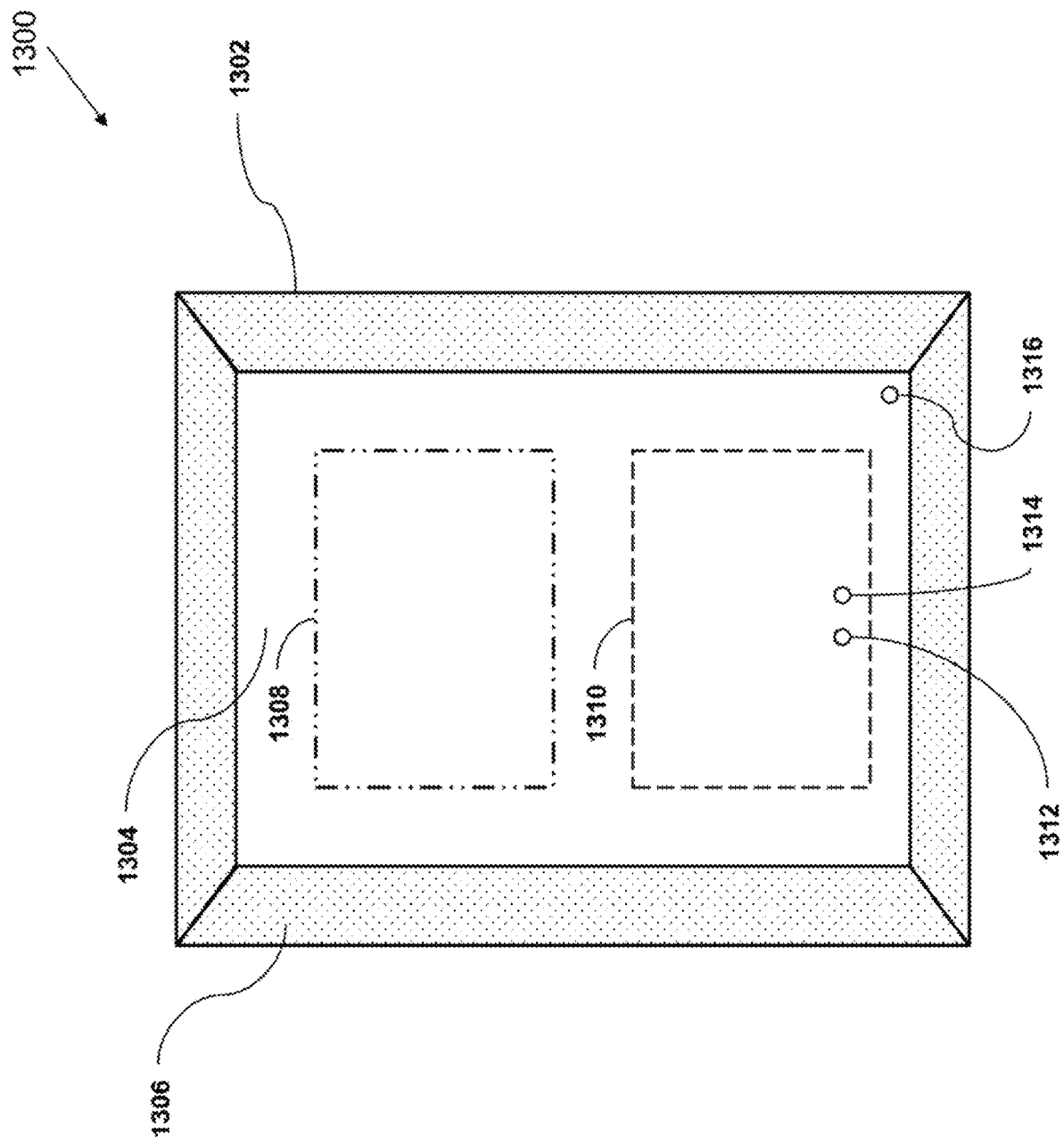
FIG. 13 illustrates additional locations for physical phenomena device placement, according to embodiments of the invention.

FIG. 13 illustrates, generally at 1300, additional locations for physical phenomena device placement, according to embodiments of the invention. With reference to FIG. 13, a voice interactive mirror 1302 has a frame 1306 and a mirror glass 1304. One or more physical phenomena devices are located either on the mirror glass 1304 or behind the mirror glass at 1312, 1314, and 1316. An optional display is located on a back side of the mirror glass 1304 and is indicated at 1308. Note that the location 1308 of the optional display is flexible and can be located in various places on the backside of the mirror glass 1304. The location 1308 shown for the optional display is located as shown in FIG. 13 merely for illustration.

In one or more embodiments, a microphone is indicated by one of 1312, 1314, and 1316. In one or more embodiments, a touch or gesture sensor is indicated by one of 1312, 1314, and 1316. In various embodiments, the touch or gesture sensor is a capacitive touch sensor. In one or more embodiments, a speaker location is indicated by one of 1312, 1314, and 1316. In some embodiments, a speaker would be located on a back side the mirror glass 1304 to minimize obscuring the reflective surface of the mirror. In one or more embodiments, a camera is indicated by one of 1312, 1314, and 1316. A microphone (one or more of 1312, 1314, and 1316) is used to receive acoustic signals from a user during an interaction with the mirror 1302 as described above in conjunction with the previous figures. A speaker (one or more of 1312, 1314, and 1316) is used to broadcast acoustic signals back to a user (from a VT & AI system) during an interaction with the mirror 1302 as described above in conjunction with the previous figures. A camera (one or more of 1312, 1314, and 1316) is used to capture images or video of a front side of the mirror 1302 (including in some embodiments of the user) during an interaction with the mirror 1302. In various embodiments, the captured images or video are used to adjust one or more of the physical phenomena devices (e.g., display, backlighting, etc.) or to accomplish a communication with a remote device accessible to the interactive mirror through an attached network. In some embodiments, a microphone mute control is one of the physical phenomena devices included in one or more of 1312, 1314, and 1316. A microphone mute control permits a user to mute the microphone. Muting the microphone disconnects the user from the VT & AI system that a mirror is in communication with. Note that the number of physical phenomena devices is not limited to the three illustrated in FIG. 13, a number larger than three is used in some embodiments and a number less than three is used in other embodiments. The number three is used merely for illustration in FIG. 13.

The frame 1306 is optional, and in some embodiments the interactive mirror 1302 is provided without the frame 1306. One or more of the physical phenomena devices 1312, 1314, and 1316 can be located in the frame 1306.

An area 1310, indicated with broken lines, illustrates a location for an electronics chassis that is used to attach the electronic components described above to the mirror in order to provide the interaction (e.g., a combination of voice and/or touch interaction(s)) with the user. Note that in some embodiments, the optional display 1308 is located separately from the electronics chassis or the optional display 1308 can be included within the electronics chassis. In some embodiments, the optional display 1308 is provided with its own chassis for mounting relative to the mirror 1304.

FIG. 14 illustrates, generally at 1400, packaging interactive device communication electronics, according to embodiments of the invention. With reference to FIG. 14, a chassis 1402 is illustrated housing several electronics components 1404, 1406, and 1408. The electronics components 1404, 1406, and 1408 represent one or more of the electronics components described above, such as, but not limited to, a first computing module, a second computing module, a power supply, etc. In other embodiments, more or fewer than the three components 1404, 1406, and 1408 are configured within the chassis 1402. In some embodiments, the chassis 1402 is positioned at 1302 as illustrated in FIG. 13 above.

Figure 15:
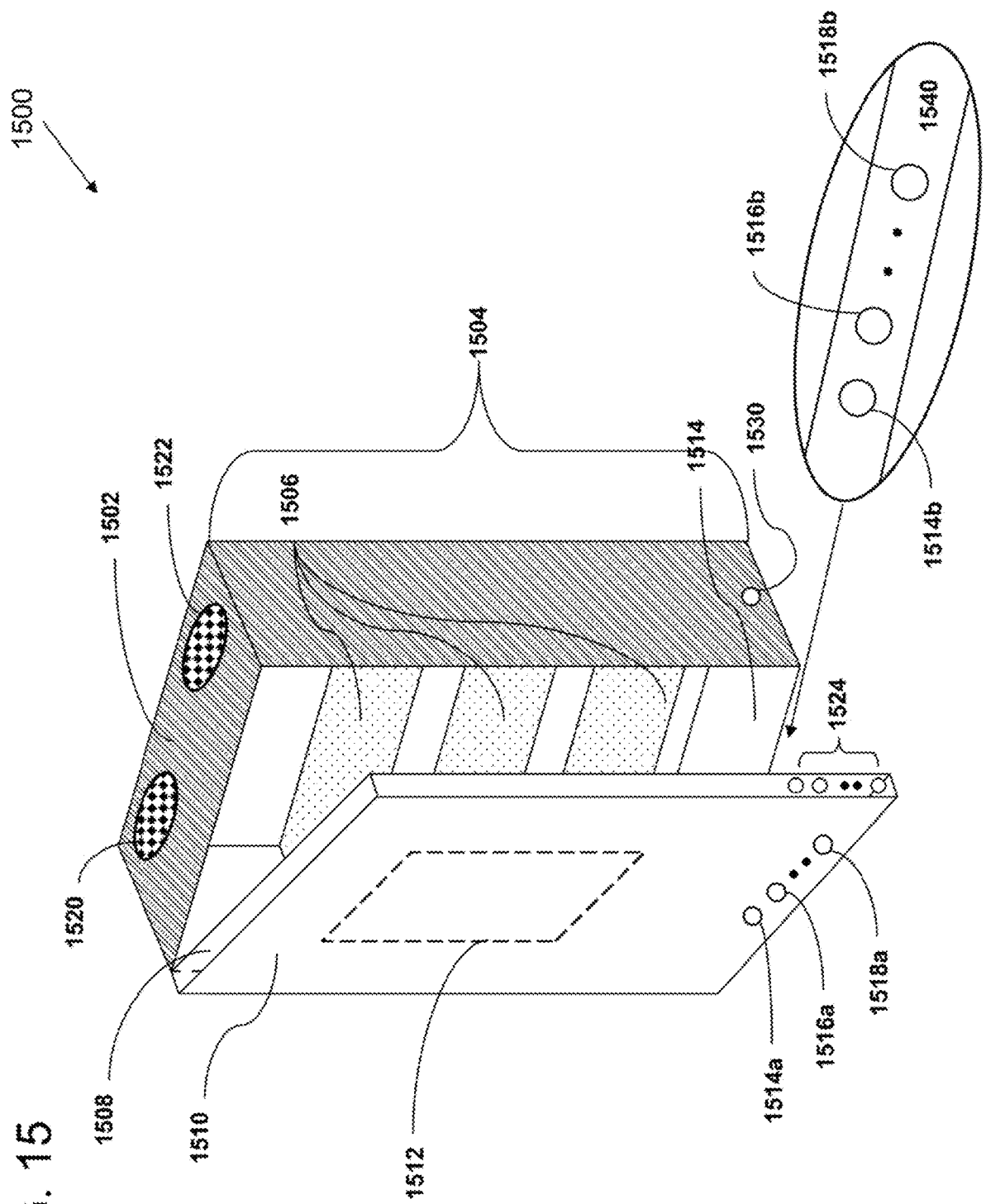
FIG. 15 illustrates an interactive device configured as an interactive medicine cabinet, according to embodiments of the invention.

FIG. 15 illustrates, generally at 1500, an interactive device configured as an interactive medicine cabinet, according to embodiments of the invention. With reference to FIG. 15, an interactive medicine cabinet 1502 has a housing 1504, containing a number of shelves 1506 and a medicine cabinet door 1508. The medicine cabinet door 1508 includes a front glass layer 1510. The medicine cabinet door 1508 can include one or more regions, collectively indicated by 1512, which provide a display and/or one or more backlight regions as described above in conjunction with the preceding figures.

One or more physical phenomena devices are located either on the mirror glass 1510 or behind the mirror glass 1510 at 1514a, 1516a, and 1518a (and are provided as touch sensors). An optional display is located on aback side of the mirror glass 1510 and is indicated at 1512. Note that the location 1512 of the optional display is flexible and can be located in various places on the backside of the mirror glass 1510. The location 1512 shown for the optional display is located as shown in FIG. 15 merely for illustration.

Note that the physical phenomena devices can be located in places other than the medicine cabinet door. For example, in some embodiments, the physical phenomena devices 1514b, 1516b, and 1518b are located in a portion of the chassis 1540 of the interactive medicine cabinet 1502. In other embodiments, physical phenomena devices such as 1520 and 1522 are located on a portion of the chassis (top surface). Physical phenomena devices 1520 and 1522 are in some embodiments speakers. In some embodiments, physical phenomena devices are located on a side portion of the interactive medicine cabinet chassis 1504 such as is illustrated at 1530. In other embodiments, the physical phenomena devices are provided in a frame of the medicine cabinet door as indicated at 1524.

In one or more embodiments, a microphone is indicated by one of 1514a, 1516a, 1518a, 1514b, 1516b, and 1518b. In one or more embodiments, a touch or gesture sensor is indicated by one of 1514a, 1516a, 1518a, 1514b, 1516b, and 1518b. In various embodiments, the touch or gesture sensor is a capacitive touch sensor. In one or more embodiments, a speaker location is indicated by one of 1514a, 1516a, 1518a, 1514b, 1516b, and 1518b. In some embodiments, a speaker would be located on a back side the mirror glass 1510 to minimize obscuring the reflective surface of the mirror. In one or more embodiments, a camera is indicated by one of 1514a. 1516a, 1518a, 1514b, 1516b, and 1518b. A microphone (one or more of 1514a, 1516a, 1518a, 1514b, 1516b, 1518b, 1520, 1522, and 1524) is used to receive acoustic signals from a user during an interaction with the medicine cabinet 1502 as described above in conjunction with the previous figures. A speaker (one or more of 1514a, 1516a, 1518a, 1514b, 1516b, 1518b, 1520, 1522, and 1524) is used to broadcast acoustic signals back to a user (from a VT & AI system) during an interaction with the medicine cabinet 1502 as described above in conjunction with the previous figures. A camera (one or more of 1514a, 1516a, 1518a, 1514b, 1516b, 1518b, 1520, 1522, and 1524) is used to capture images or video of a front side of the medicine cabinet 1502 (including in some embodiments of the user) during an interaction with the medicine cabinet 1502. In various embodiments, the captured images or video are used to adjust one or more of the physical phenomena devices (e.g., display, backlighting, etc.) or to accomplish a communication with a remote device accessible to the interactive medicine cabinet through an attached network. In some embodiments, a microphone mute control is one of the physical phenomena devices included in one or more of 1514*a*, 1516*a*, 1518*a*, 1514*b*, 1516*b*, 1518*b*, 1520, 1522, and 1524. A microphone mute control permits a user to mute the microphone. Muting the microphone disconnects the user from the VT & AI system that a mirror is in communication with. Note that a general number of physical phenomena devices is illustrated in FIG. 15.

Figure 16:
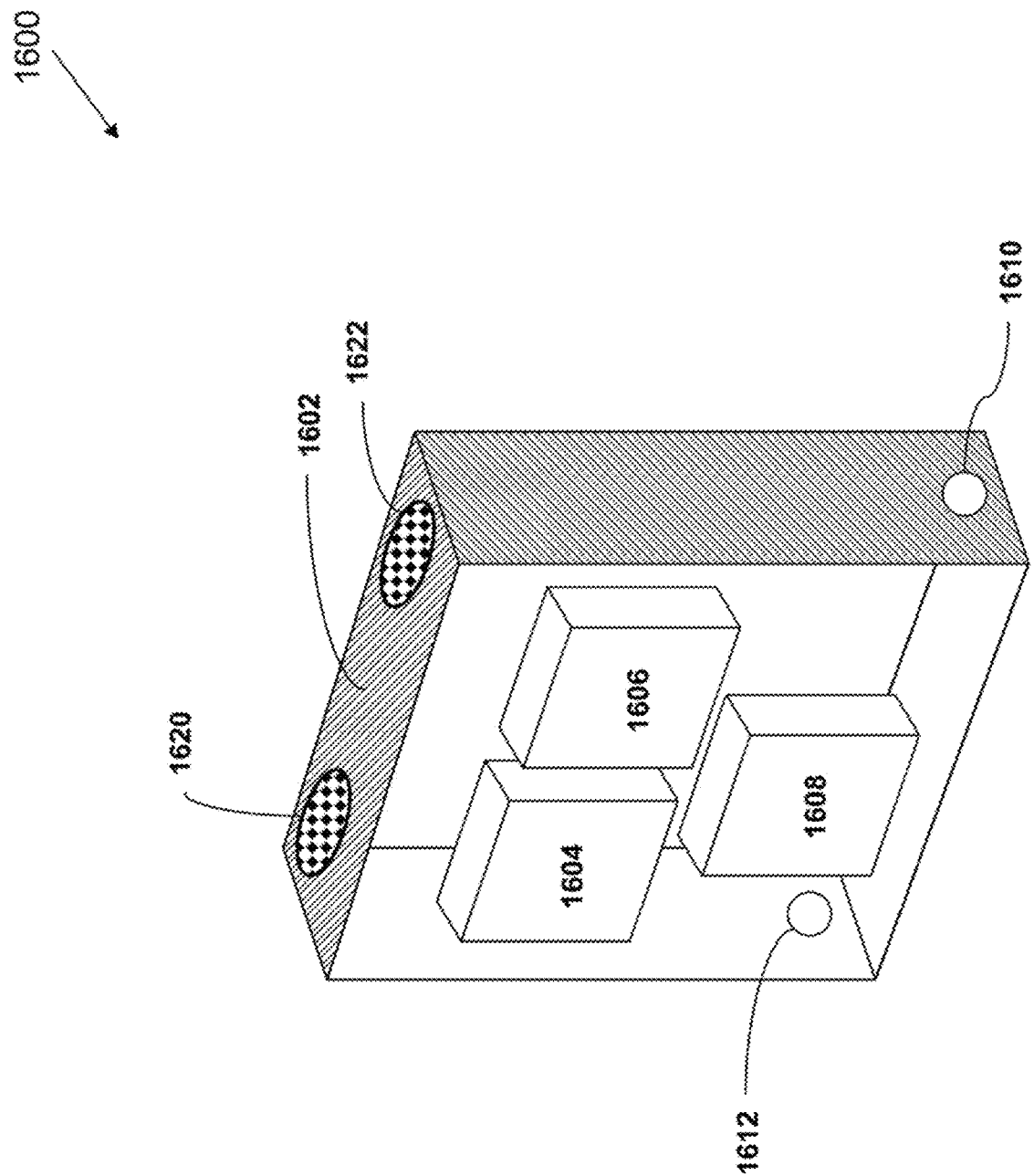
FIG. 16 illustrates alternative packaging of interactive device communication electronics, according to embodiments of the invention.

FIG. 16 illustrates, generally at 1600, alternative packaging of interactive device communication electronics, according to embodiments of the invention. With reference to FIG. 16, a chassis 1602 is illustrated housing several electronics components 1604, 1606, and 1608. The electronics components 1604, 1606, and 1608 represent one or more of the electronics components described above, such as but not limited to; a first computing module, a second computing module, a power supply, etc. In other embodiments, more or fewer than the three components 1604, 1606, and 1608 are configured within the chassis 1602. In some embodiments, the chassis 1602 is positioned at 1310 as illustrated in FIG. 13 above. In other embodiments, the chassis 1602 is configured into the interactive medicine cabinet of FIG. 15.

The chassis is configured in various embodiments with one or more of physical phenomena devices 1610, 1612, 1620 and 1622. Some examples of the physical phenomena devices 1610, 1612, 1620 and 1622 are, but are not limited to touch or gesture sensors, speakers, microphones, etc.

Figure 17:
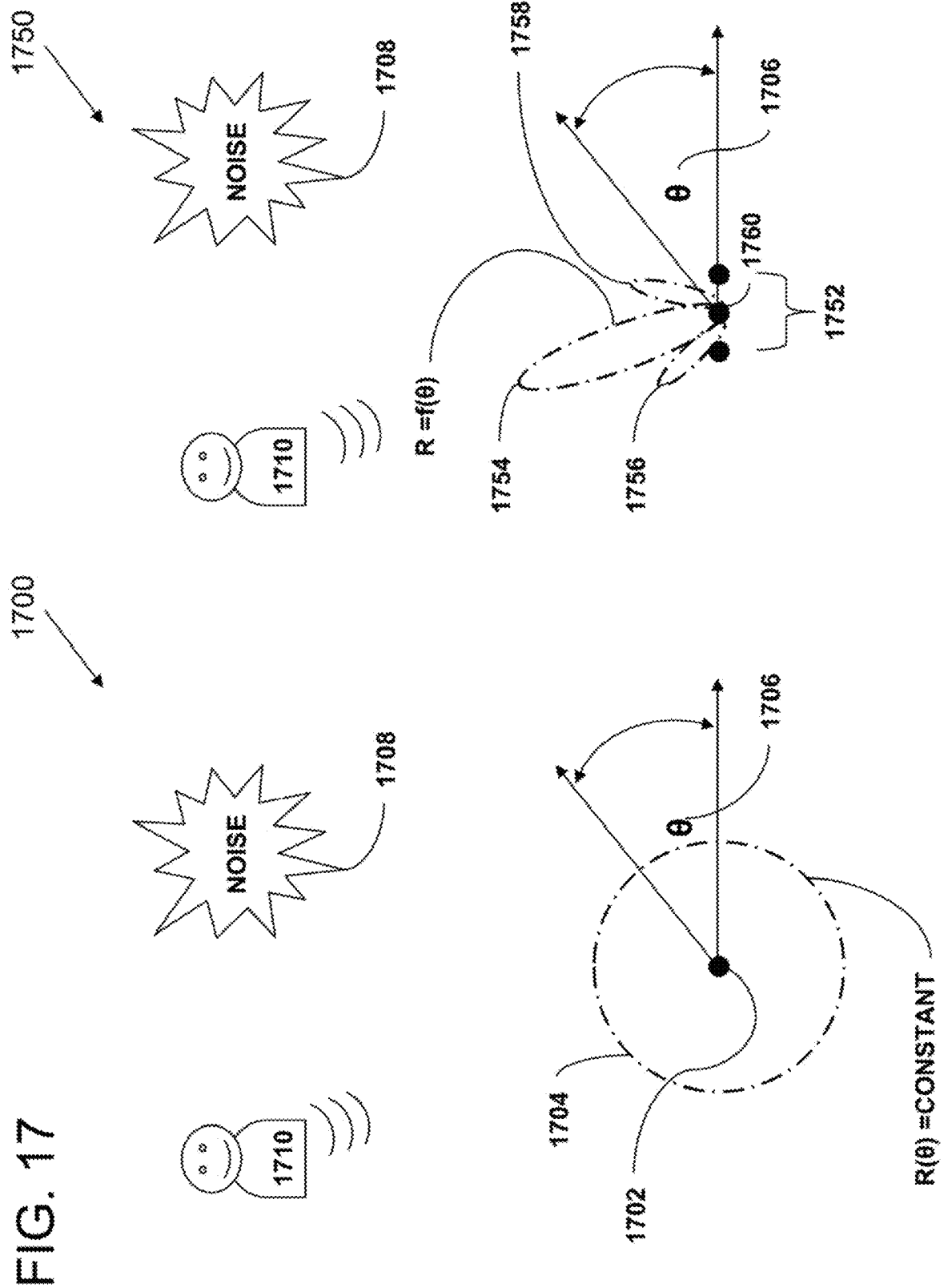
FIG. 17 illustrates beamforming, according to embodiments of the invention.

FIG. 17 illustrates beamforming, according to embodiments of the invention. With reference to FIG. 17, two different microphone response patterns are illustrated, an omni-directional response at 1700 and a directional response at 1750. Embodiments, of the interactive device systems described herein are made with either type of microphone.

In the system of 1700, an omni directional microphone 1702 is illustrated. Omni directional microphone 1702 has a response magnitude "R" which is independent of arrival angle θ, this relationship is indicated by R(θ)=CONSTANT. A response pattern 1704 for the omni directional microphone 1702 is constant with respect to the arrival angle θ of desired audio. A source of desired audio, represented by a user 1710, and a source of noise 1708 will both be received by the microphone 1702 without any spatial filtering contribution from the microphone 1702 since the microphone is omni directional. In some embodiments, omni directional microphones will provide adequate system performance. A system advantage can be provided by spatial filtering at the microphone level.

In one or more embodiments, beamforming is used to provide spatial filtering by creating an acoustic response R(θ) which is not constant with respect to arrival angle θ. In various embodiments, a non-omni directional microphone response is obtained by employing one or more beamforming techniques. One beamforming technique is to use a sensor that has a non-omni directional response such a cardioid sensor. A cardioid sensor has a response which follows a cardioid pattern as a function of arrival angle θ. In some embodiments, a microphone having a cardioid response pattern is used to diminish sensitivity to noise relative to the sensitivity to the desired audio. A cardioid microphone is an example of a unidirectional microphone.

In some embodiments, a unidirectional microphone is configured with its main response axis perpendicular to a surface of the interactive device. In one non-limiting example, when the device is a mirror, a unidirectional microphone is configured with its main response axis perpendicular to the plane of the mirror.

In various embodiments, time delay beamforming is used with an array of microphones as indicated at 1752. Three microphones are indicated at 1752; however, the array 1752 can consist of more or fewer than the three illustrated. The acoustic signals from the three microphones are time delayed and summed together to obtain a beamformed output R=f(θ). In one embodiment, a portion of a beamformed output is illustrated with a main lobe 1754 and first side lobes 1756 and 1758. The rest of the side lobe pattern is omitted for simplicity in the figure. Note that a peak (radial distance from array center 1760) of the side lobes 1756 and 1758 is less than a peak (radial distance from array center 1760) of the main lobe 1754. This difference in side lobe level creates a spatial filter that is less sensitive to the arrival angle of the noise 1708 and is more sensitive to the arrival angle of desired audio coming form the user 1710 in the steer direction illustrated in the figure.

In various embodiments, the beamforming process is accomplished in hardware or software or with a combination of both. In some embodiments, a beamforming process is configured to continuously scan through angle θ by varying time delays applied to the outputs of the microphones 1752. At each increment Δθ, established by a set of time delays for each microphone, a magnitude of the received acoustic signal associated with a system wake word is computed. The direction of the maximum received acoustic signal, associated with the wake word, establishes the steer direction θs for the array during the capture of the acoustic signals which are sent to the VT & AI system to process the user's command. Other steer directions that have a smaller magnitude for the system wake word are deemed off target directions and are discarded. The off target directions can have a greater contribution of undesired audio from, for example, noise 1708 and can degrade the VT & AI system performance resulting in system errors on translation of voice-to-test.

Figure 18:
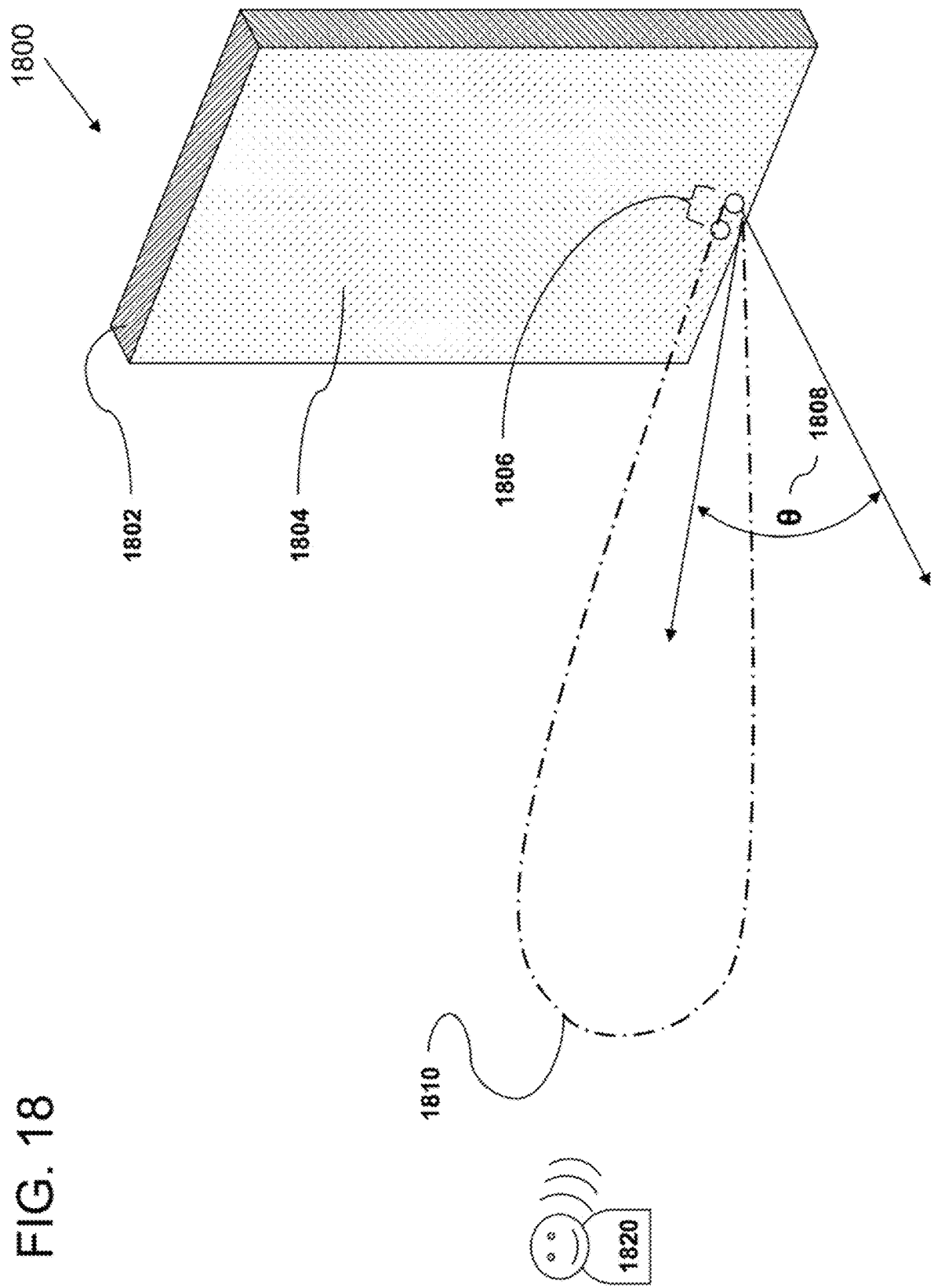
FIG. 18 illustrates beamforming in a device, according to embodiments of the invention.

FIG. 18 illustrates, generally at 1800, beamforming in a device, according to embodiments of the invention. With reference to FIG. 18, an interactive device 1802 has a layer of mirror glass 1804 and an array of microphones 1806. The array of microphones 1806 are processed to produce a response pattern that has a main lobe 1810 that is steered to a source of desired audio represented by a user 1820 who is speaking a command to the interactive mirror. The beam formed array of microphones 1806 provides a spatial filter that reduces acoustic noise thereby increasing a signal-to-noise ratio for the desired audio signal. This provides a benefit by contributing to a greater accuracy of the VT & AI system.

As described in this description of embodiments, one or more microphones are used with the interactive device. In various embodiments, microphones can be placed within a volume of the frame, placed on a chassis, clipped onto the mirror glass, placed in a hole in the mirror glass, placed behind the mirror glass with slits in the mirror glass to allow acoustic communication with acoustic waves spoken by a user.

In various embodiments, microphones of different type or form are used, such as but not limited to; a motion sensor mounted to a surface, a laser microphone that detects motion of a surface, a condenser microphone, an electret microphone, Micro-Electro-Mechanical System (MEMS) microphone or microphone array, and a unidirectional microphone, etc. Embodiments of the invention are practiced with any type of microphone that can detect acoustic signals spoken by a user.

In various embodiments, the speakers used with an interactive device are made using a variety of technologies and can be mounted in a variety of places both on the interactive device as well as located externally from the interactive device and accessed by wireless or wired communication. Some non-limiting examples of speaker technology are, but are not limited to, moving coil speakers and transducers mounted to a surface that excites the surface thereby using a device surface as the surface that sets the air in motion. Some non-limiting examples of speaker location are, but are not limited to; placing the speaker(s) on a back side of the interactive device chassis, placing the speaker(s) in the inside of the interactive device chassis, placing the speaker(s) within a volume of a device frame, placing speaker(s) between a device frame and a surface, e.g., in a sub-frame member, placing speaker(s) external to the interactive device in a part of the space near the device such as on a ceiling or a wall of the room or area where the interactive device is located.

Figure 19:
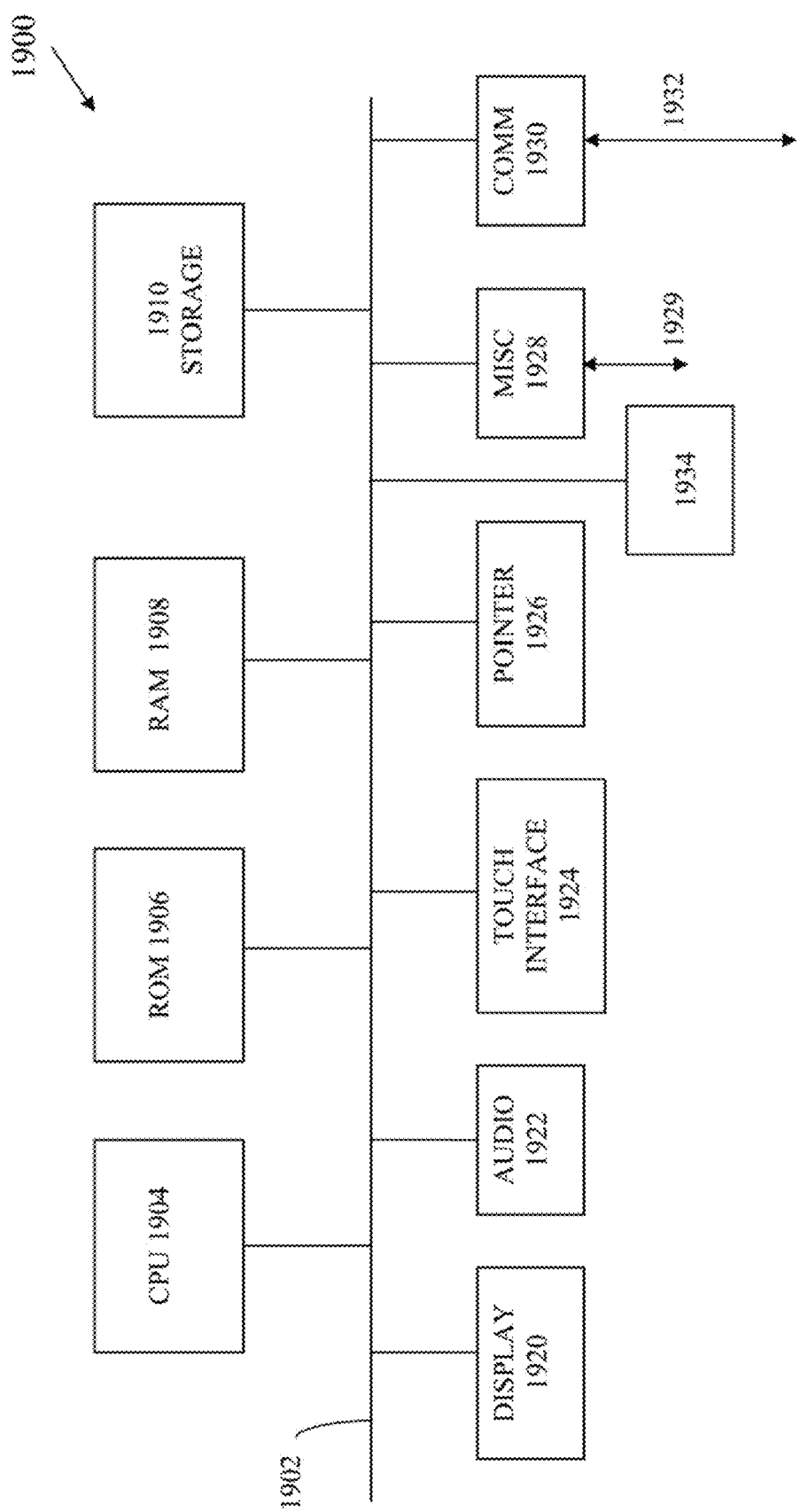
FIG. 19 illustrates a block diagram of a computing module, according to embodiments of the invention.

FIG. 19 illustrates, generally at 1900, a block diagram of a computing module or a communications module, according to embodiments of the invention. With reference to FIG. 19, as used in this description of embodiments, a computing module or a communications module can be based on a device such as a computer, in which embodiments of the invention may be used. The block diagram is a high level conceptual representation and may be implemented in a variety of ways and by various architectures. Bus system 1902 interconnects a Central Processing Unit (CPU) 1904 (alternatively referred to herein as a processor), Read Only Memory (ROM) 1906, Random Access Memory (RAM) 1908, storage 1910, display 1920, audio, 1922, touch interface 1924, pointer 1926, miscellaneous input/output (I/O) devices 1928, and communications 1930. 1934 represents a controller for a device such as a physical phenomenon device, 1934 can represent any number of different controllers used with the devices described herein, such as, but not limited, to pulse width modulation (PWM), etc. RAM 1908 can also represent dynamic random access memory (DRAM). It is understood that memory (not shown) can be included with the CPU block 1904. The bus system 1902 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 994 (FireWire), Universal Serial Bus (USB), universal asynchronous receiver-transmitter (UART), serial peripheral interface (SPI), inter-integrated circuit (I2C), etc. The CPU 1904 may be a single, multiple, or even a distributed computing resource. Storage 1910 may be Compact Disc (CD), Digital Versatile Disk (DVD), hard disks (HD), solid state disk (SSD), optical disks, tape, flash, memory sticks, video recorders, a redundant array of independent disks (RAID), etc. Note that depending upon the actual implementation of a computing module, the computing module may include some, all, more, or a rearrangement of components in the block diagram. Thus, many variations on the system of FIG. 19 are possible.

Connection with a network is obtained with 1932 via 1930 either wirelessly or through a wired connection, as is recognized by those of skill in the art, which enables the computing module 1900 to communicate with voice-to-text artificial intelligence (VTAI) systems which can be in remote locations for example cloud based. 1932 and 1930 or 1928 and 1929 flexibly represent communication elements in various implementations, and can represent various forms of telemetry, GPRS, Ethernet, Wide Area Network (WAN). Local Area Network (LAN), Internet connection, WiFi, WiMax, ZigBee, Infrared, etc. and combinations thereof. In various embodiments, a touch interface is optionally provided at 1924.

In various embodiments, depending on the hardware configuration different wireless protocols are used in the networks to provide the systems described in the figures above. One non-limiting embodiment of a technology used for wireless signal transmission is the Bluetooth wireless technology standard which is also commonly known as IEEE 802.15.1 standard. In other embodiments, the wireless signal transmission protocol known as WiFi is used which uses the IEEE 802.11 standard. In other embodiments, the ZigBee communication protocol is used which is based on the IEEE 802.15.4 standard. These examples are given merely for example and do not limit different embodiments. Transmission Control Protocol (TCP) and Internet Protocol (IP) are also used with different embodiments. Embodiments are not limited by the data communication protocols listed herein and are readily used with other data communication protocols not specifically listed herein.

Figure 20:
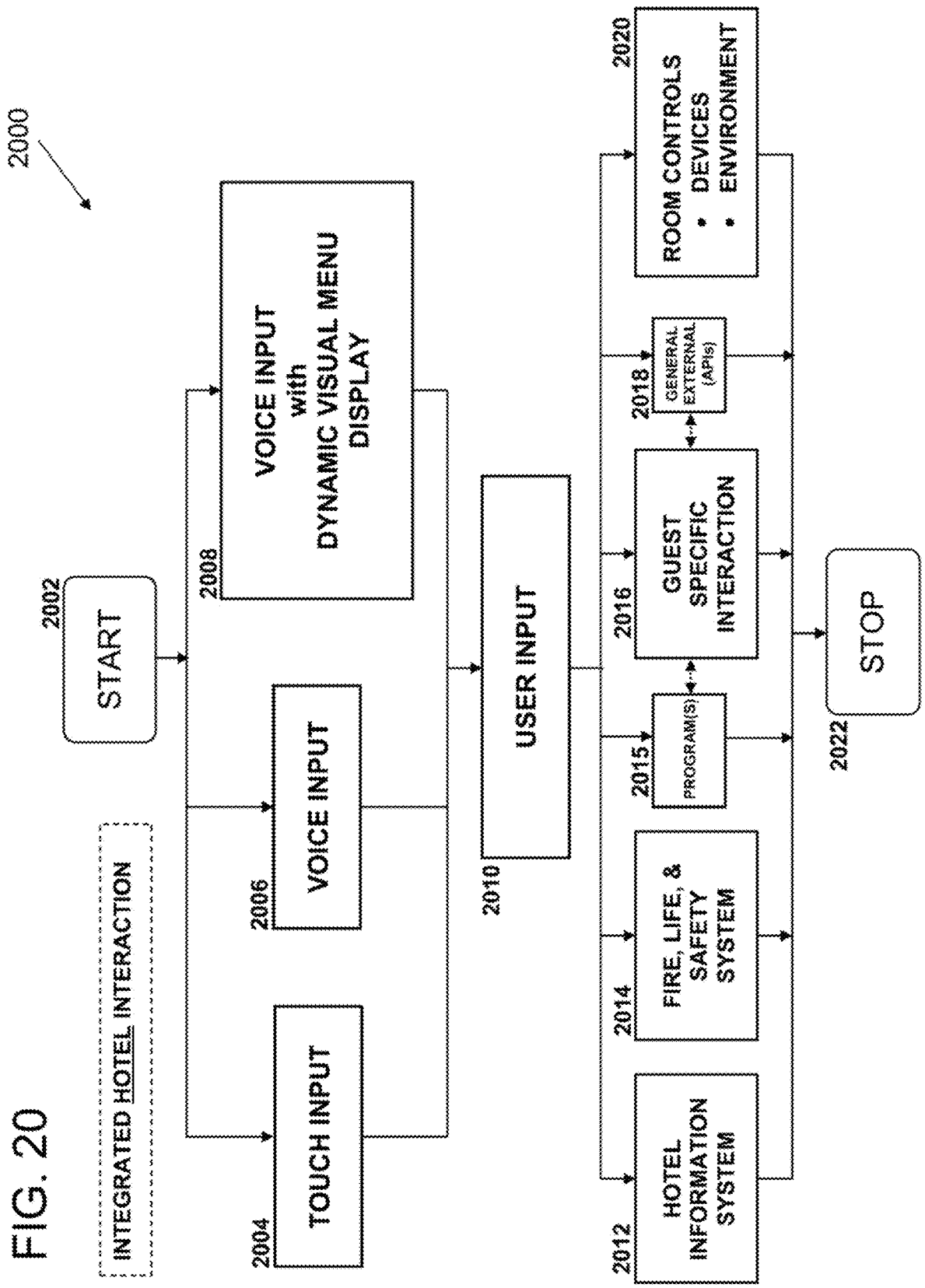
FIG. 20 illustrates an integrated hospitality guest experience according to embodiments of the invention.

FIG. 20 illustrates, generally at 2000, an integrated hospitality guest experience according to embodiments of the invention. In various embodiments, the integrated hospitality guest experience combines a number of programs, such as, but not limited to; programs that provide functionality to an interactive device, programs that integrate with various external application programming interfaces APIs, programs that provide user input such as touch input, voice input, touch and voice input, and programs that provide an interaction from the system responsive to the user's input. Some examples of programs that provide an interaction responsive to a user's input are, but are not limited to; text to speech generation, printer interfaces, etc.

With reference to FIG. 20, a process starts at a block 2002. A guest of a hotel or more generally a user of the system represented in FIG. 20 provides an input to the system by one or more of; a touch input 2004, a voice input 2006, or a voice input facilitated with the assistance of a visual menu of choices presented to the user at 2008. Iconography associated with touch input 2004 can include, but is not limited to, buttons, keyboards, etc. The visual menu of choices can be presented in various ways, for example via text communication to a user's mobile device such as a mobile phone. Alternatively, the visual menu choice can be presented via email. In other embodiments, the visual menu assistance is provided on a display of an interactive device as described in conjunction with the figures above. At the block 2006, a menu of choices can be presented by an intelligent interactive device that communicates to the user via speech synthesis as described above.

The input originating from 2008 can be a voice input to an intelligent voice interactive device or it can be a combination of voice input and a touch input to an intelligent voice interactive device. In some embodiments, an intelligent voice interactive device is provided in a form of a mirror. In other embodiments, an intelligent voice interactive device is provided in a form other than a mirror.

The user input 2010 is directed to one or more of the processes illustrated by 2012, 2014, 2015, 2016, 2018, and 2020. Each process utilizes a combination of; program code, an intelligent interactive device, and a system to provide a user with an interaction between the user and a hotel. Each of the processes 2012, 2014, 2015, 2016, 2018, and 2020 are described more fully below. The process stops at a block 2022.

Hotel Services

Figure 21A:
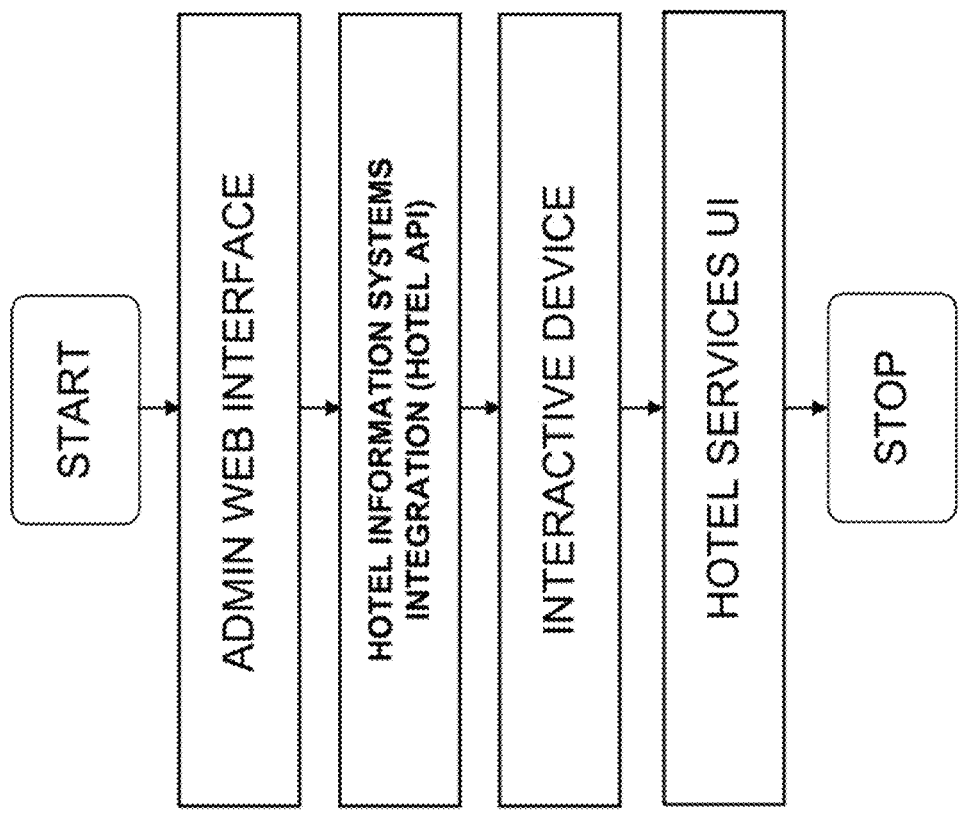
FIG. 21A illustrates hospitality services provided through an interactive device, utilizing the communications network architecture of FIG. 9A, FIG. 9B, FIG. 10, or FIG. 11 according to embodiments of the invention.

FIG. 21A illustrates hospitality services provided through an interactive device, utilizing the communications network architecture illustrated by one or more or a variation of FIG. 5A, FIG. 5B, FIG. 9A, FIG. 9B, FIG. 10, or FIG. 11, etc. according to embodiments of the invention. With reference to FIG. 20 and FIG. 21A, a Hotel Service Artificial Intelligence (HSAI) program integrates a hotel information system (as represented by 2012) with an intelligent interactive device and associated network to present a number of hotel goods and services that a hotel, such as Hotel Mischel in the examples above, can sell to, perform for, or provide to the customer or guest. Such an integrated system is referred to herein as a HSAI system. The terms "customer," "guest," and "user" are used synonymously in this description of embodiments. The terms "hotel admin user," "admin," or "administrator" are used synonymously to refer to a person or persons who are responsible for administrator functions. It is understood that such a person might be an employee or a contractor or the like and that no limitation is intended by the use of such terms. Examples of such services are, but are not limited to: room service, sending replacements of any room equipment to the customer's room (e.g., food, towels, blankets, pillows, bathroom articles, TV remote, etc.); purchasing any item offered by Hotel Mischel (e.g., gift shop items, etc.); making a reservation for the customer for use of a Hotel Mischel facility (e.g., massage, hot tub session, etc.); valet service; bell desk service, etc. In the case of the companion example of touch interaction, described above, the customer orders fresh towels as facilitated by the HSAI program by touching the appropriate selection on the touch interactive artificially intelligent (AI) device. Goods and services provided under the HSAI experience are described more fully below.

During set-up configuration, using the web based Hotel Device Management Portal, each hotel property or brand configures individual, group or all devices to allow Hotel Service Integration via the ADMIN Web Interface, EM ADMIN Server, EM Database Server, and EM API Server into interactive devices deployed within their respective properties. The Hotel Device Management Portal is represented by the EM API Server, the EM Admin Server, and the EM Database API Server in FIG. 9A or the EM API Server in FIG. 9B and can provide all of the functionality of the individual servers. Hotel Service Integration enables the interactive devices to communicate a wide variety of guest requests to the Hotel Information System, such as but not limited to; meal purchases, concierge services, laundry, maintenance requests, valet, bell desk, and any other hotel specific guest service or product provided. The interactive device provides a unified interface for the hotel customer to access any service or product provided by the hotel. Through the unified interface, the hotel can enhance the guest's experience through personalized interaction with the guest. The personalized interaction with the guest is not possible without the interactive device and system integration described in these embodiments. In one or more embodiments, the interactive device communicates user input to the Hotel Device Management Portal that integrates with the Hotel Information System to complete the delivery of the request to hotel staff.

In operation, a hotel admin user sets up configuration parameters of the HSAI program for use with the Hotel Information System. The hotel admin user defines device display, messaging, and behavior settings in the ADMIN Web Interface specifying what options will be available on interactive devices to guests in specific rooms or room types. Interactive devices adapt to the parameters defined in the setup/configuration. After set-up, interactive devices will allow the guest to interact with the available Hotel Services via the HSAI program and system.

The integration of the Hotel Device Management Portal with a hotel's Hotel Information System (HIS) permits bidirectional communication with the interactive devices deployed within the hotel. The description above describes communication from an interactive device to the hotel's Hotel Information System in order to obtain goods or services, i.e., a first direction. The other mode of communication that the described network architecture provides is communication from the hotel's HIS to one or more interactive devices deployed in the hotel, i.e., a second direction. Additional functionality directed to enhancing the customer's experience via the bi-directional communication channel is described below in conjunction with the HSAI program and system that follows. The bi-directional network enables the hotel to send a personalized message to an interactive device in a guest's room, such as, but not limited to: "Happy Birthday," "Happy Anniversary," or any other message that the hotel desires to send, some additional examples of which are described below.

In one or more embodiments, the HSAI program provides functionality to the guest that is organized into the following general categories: Room Services; Reservations, Retail Sales; Hotel Information; Personalization; Rewards Program; Room Scenes/Atmosphere; Bell & Valet; Concierge, Survey, Guest Office, etc. Each category is described in more detail below. The listed categories do not comprise an exclusive list. The categories are merely an illustration of one method of organizing the interactions between a hotel guest the hotel. In other embodiments, there are more categories, fewer categories, or different categories; however, all such categories are directed to providing intelligent interaction between a hotel and a guest as facilitated by the HSAI program/system.

In various embodiments, as described above, the HSAI program is implemented on a touch interactive device utilizing touch input 2004 (FIG. 20). In other embodiments, the HSAI program is implemented on a voice interactive device utilizing voice input 2006 (FIG. 20). In yet other embodiments, the HSAI program is implemented on a voice interactive device with display functionality utilizing voice input and display assistance 2008. In yet other embodiments, an interactive device is configured with a combination of input types 2004, 2006, and 2008.

Note that, as described above in conjunction with previous figures, a plurality of interactive devices is configured by a hotel in order to provide uniform functionality for the plurality of devices. In one or more embodiments, using Amazon Voice Services (AVS) for the VTAI system, one or more SKILLs are developed to provide the functionality described with respect to the HSAI program. Using the plurality of devices with the SK LL or SKILLs permits a hotel to essentially mange the plurality of interactive devices at a single control point in the system without the need to make individual changes to each interactive device. This architecture saves the hotel time and money while providing a uniform look and feel to the voice interactive experience provided by the hotel property.

FIG. 9C illustrates central control and management of a plurality of interactive devices through a common control point indicated in the figure as EM API Server. The plurality of interactive devices is distributed by hotel. For example, hotel 1 has a plurality of interactive devices indicated by a general number "n." Hotel 2 has a plurality of interactive devices indicated by a general number "m." A general number of hotels is indicated by "P" and hotel P contains a general number of interactive devices "o."

Within the management configuration 970 the functionality of the SKILL or SKILLs is customized for each hotel by the respective hotel admin user through the HOTEL ADMIN Web Interface in order in order to provide the desired hotel experience to the given hotel.

In various embodiments, the experience provided by the HSAI program can be initiated in different ways. In one method of initiation, when a guest checks into the hotel, the HSAI system receives the time of the check in as an input. Throughout the hotel, guest room doors are instrumented such that the system knows when a room door is first opened following a guest's check in. The first time that the guest's room door opens, the HSAI system is activated and the system announces its presence to the guest with a greeting such as, in one embodiment, "Hello Sue, welcome, I'm here to assist you, the dining room is open for another 30 minutes." In another embodiment, the first time that the guest's room door opens after check in, the system is brought to the LISTEN state, as described in conjunction with the figures above. In other embodiments, a user speaks a VT & AI system wake word to bring the HSAI system to the listen state. Other methods of initiation are but are not limited to, motion detection, heat detection, sound detection, gas detection, etc.

In one or more embodiments, the Room Services category provides any service or goods that a hotel guest might require. In one or more embodiments, using AVS for the VT & AI system a SKILL is developed, such as a Hotel Mischel SKILL, and a user initiates the HSAI program by saying: "Alexa open Hotel Mischel." Alexa responds: "Welcome can I help you with 1, 2, 3, 4, . . . i, what would you like?" Where 1 through i are the categories listed above. In one embodiment, the user responds: "Tell me about what is available through Room Service." The HSAI system responds: "I can help you with 1, 2, 3 . . . j," where 1 through j are items, such as, but not limited to; do not disturb, food, towels, pillows, blankets, soap, shampoo, toiletries, cleaning, turn down services, slippers, maintenance order for room repair, etc. The guest responds by voice command articulating the desired request, for example: "I would like to order the lobster tails." The voice command is processed by the interactive device and a request is sent to the Hotel Information System or to an appropriate part of the hotel in order to fulfill the guest's request. In some embodiments, where the choices presented to the user are multifaceted, like for example, a food menu, the interactive device sends a communication to a user's personal device such as a text message to a mobile phone in order to communicate the options that are available to the user. In other embodiments, where the interactive device has a display, the ISAI program utilizes the display to present the menu options to the user.

The other categories of the SKILL Hotel Mischel are accessed similarly by asking for more information pertaining to the particular category of interest as described below.

In one or more embodiments, the Reservations & Menu category permits a hotel guest to make reservations at any facility or for any service within the hotel, such as but not limited to; a reservation time, choice of service, and choice of goods at for example, the dining room, a reservation time at the spa with a selection of goods and services, a reservation for a massage and type, tee time on a golf course, reservations for child care, reservations for pet care such as dog walking, grooming, etc. Menu options are provided to the guest through an interactive device such as the menu for the hotel dining room. Presentation of a hotel dining room menu eliminates the need to print hardcopy menus every time the menu is changed, thereby saving the hotel time, money, and as well providing convenience and time savings for the guest.

In one embodiment, the Retail category permits a hotel guest to buy goods in the room, for example, bottled drinks, wine, liquor, packaged snacks, etc. are dispensed from within the room. The user interacts with the HSAI system to purchase goods which are then billed to user and can be paid for upon checkout by integration with the user's bill.

In one or more embodiments, the Retail category is facilitated by the use of one or more intelligent devices, such as for example, an instrumented platter. In one example, an instrumented platter is located in a room where items are placed for examination and purchase by the guest. In one embodiment, the instrumented platter is "aware" of the load placed on it (in one or more embodiments, through the use of a load cell and logic program module). In another embodiment, the instrumented platter is aware of the load placed on it through the use of a radio frequency identification tag (RFID) reader which identifies a quantity of items present. In some embodiments, a variety of different items are placed on the platter. In one or more embodiments, an RFID reader is part of the system and each of the different items on the platter is equipped with an RFID tag. In one non-limiting example of operation, when the guest removes an item from the platter, the system can respond with a voice announcement, such as: "Hello Bill would you like to purchase that 'name of item here,' I can also provide information on the 'name of item here' just ask." In some embodiments, a sensor is used to bring the VT & AI system to the wake or LISTEN state, as described in conjunction with the figures above, and in so doing, initiate a voice announcement to the user. A sensor in the guest room, such as the RFID reader or the load cell, used in the example directly above, is used as the switch input to "wake" the VT & AI system for example when AVS is used for the VT & AI system.

In other embodiments, only one sensor is used on a platter such as a load cell that monitors the weight of items placed on the platter, such as towels. The HSAI system through its integration into the hotel information system, described above, is capable of "knowing" when there are no more towels on the rack by virtue of the weight measurement and output from the processing logic program module. In one non-limiting example of operation, when the monitored weight of an instrumented structure, such as a platter, a rack, or other instrumented structure reaches a preset point, the system can respond with a voice announcement, such as: "Hello Sue I think that you might need more fresh towels is that right?" In another implementation of the HSAI system, the information from the instrumented structure is used by the HSAI system to produce a response from the hotel. In the above example, when the weight measured by the structure holding the item, such as towels, falls below a threshold, the hotel responds by providing room service to the guest. These examples are just several use cases that flow from the integration of an intelligent device with a hotel information system and are not limiting. In other embodiments, these examples are applied to any item used by the hotel guest during the guest's stay at the hotel or purchased by the guest to accompany the guest on check out.

In one or more embodiments, the Advertise category permits a hotel guest to hear an advertisement for a good or service. The advertisement category can be accessed directly by the user's request to hear what is available or an advertisement can be added by the hotel through the HOTEL ADMIN Web Interface as an ancillary solicitation of the user. For example, in one embodiment, when a user orders fresh towels, the system can respond: "Did you know we are having a special on our towels today they are 20% off?" In another example of advertising, the guest uses the interactive device to request slippers. The ISAI program responds back, at the conclusion of the guest's request for slippers: "in case you didn't know our restaurant is offering 10% off tonight."

In various embodiments, the Advertise category lets the hotel guest order one or more of the items that are part of the guest room collection, such as but not limited to; slippers, bath robe, shampoo, soap, bed mattress, desk lamp, items for sale in the gift shop, etc. Some items are stocked and wrapped and waiting for the guest on check out. Thereby saving the guest valuable time since the guest does not have to go into the hotel gift shop to buy the item or order it through other means. In the case of items not stocked in the hotel, such as, for example, a mattress, the interactive system orders the item for shipment to the guest's home address or shipping address.

In one or more embodiments, the Hotel Info category permits a hotel guest to learn about aspects of the hotel, such as but not limited to; WIFI info, gym, location, phone numbers, events, booking, extended stay, lost items, pool, check out, spa, airport, taxi, rental, emergency, etc. In one non-limiting embodiment, in operation, once inside the SKILL Hotel Mischel, a hotel guest enters the Hotel Info category by articulating: "Tell me about Hotel Info." While in the SKILL, the guest can utter words that indicate the intention that he or she would like more info on events. For example, the guest speaks the word "events" or says "tell me about events." The HSAI system replies: "Today the events at Hotel Mischel are X, and Y," where X and Y are the events occurring at the hotel. X and Y represent a flexible number of events that are used merely for illustration and do not limit embodiments of the invention. The functionality provided by the Hotel Info category represents another dimension of the guest experience provided by the integration of an intelligent interactive device with the hotel information system. This integrated functionality saves the guest time by providing immediate information on the hotel and the surrounding environment that the hotel is situated in, e.g., airport, emergency services, restaurants, etc.

In one or more embodiments, the Personalization category of the HSAI program provides personalized communications to a guest, which can include communications about goods and services. In one or more embodiments, provided only for illustration and with no limitation intended thereby, when a guest checks into the hotel, the guest's name is available to the HSAI system through integration with the hotel information system. The guest's name is used by the HSAI system to provide personalized communications with the guest during the time of the guest's stay. Some examples of personalized communications within the category of Personalization are, but are not limited to: name; guest's special event such as but not limited to birthday, wedding day, anniversary, special day, etc.; question(s) to the guest regarding the stay (e.g., how was your pillow?, did you enjoy your stay?, etc.); special needs (wheel chair service, access, etc.); reminders (reservations at the hotel restaurant or spa for example); greetings; personal message; notification; preferences (which can include a learning function based on successive stays at a hotel by the same guest. Information on a guest's preferences such as taste in music, room lighting, etc. learned about a guest from a previous stay is stored and is used on a subsequent stay to personalize communication with the guest and/or to adjust the aspects of the guest's room that can be controlled by the HSAI system such as room lighting, menu preference on an interactive device such as an interactive mirror with display, etc.); location of a family member within the hotel property by use of, for example, integrated RFID tag and reader system, conference alerts, schedule changes, etc.

In one or more embodiments, the Rewards Program category permits a hotel guest to sign up for the hotel's rewards program through the HSAI system. Invitations to the guest to do so can be put to the guest at various points in the guest's stay at the hotel with a reminder provided just before check out. The invitations are put to the guest by voice invitation. Such an invitation can be the combination of one or more categories such as Advertise and Rewards Program.

In one or more embodiments, the Room Scenes/Atmosphere category permits the presence of the room to be changed through system adjustment of devices in the room that have an effect on the presentation of the room environment to the guest. Some examples of effects within the category of Room Scenes/Atmosphere are, but are not limited to, adjusting/controlling: room lighting, window blinds, room sounds or music, room temperature, video displayed to a display combined with an interactive device, etc.

In one non-limiting example of an embodiment presented for illustration with no limitation implied thereby, a guest wakes up and speaks the command: "Alexa set scene to morning." The HSAI system responds by executing a predefined protocol that engages one or more of the devices in the room to provide the morning environment. In one embodiment, this means gradually opening the blinds and gradually adjusting the light and temperature within the room.

It will be appreciated that interactive devices vary in functionality as illustrated above in FIG. 20. Some interactive devices provide voice input without a display. Other interactive devices provide voice input and have a display, such as are indicated at 2008 in FIG. 20. As illustrated above, with the description of interactive devices that include screens, some are configured as interactive mirrors. When an interactive device includes a display, a voice request by the user such as, "set scene to evening," can include a response by the HSAI system that provides a fireplace scene displayed on the display in the interactive device as video with accompanying audio of the sounds of a fireplace. In some embodiments, this combination is the result of combining an AVS SKILL with a video stream from, for example, an external video API.

In one or more embodiments, the Bell & Valet category permits a hotel guest to interact with the Bell desk and Valet services, such as for example; the guest can issue a voice command to the interactive system that informs the Valet to bring the guest's car out in front of the hotel and the bell desk is informed that the guest needs help with his or her bags; the guest can request pick-up of clothes for laundry service, etc. In various embodiments, the HSAI system provides full functionality for the guest to interact with the hotel's Bell & Valet services through the Bell & Valet category. The functionality provided by a voice interactive HSAI system permits a guest to interact with both the Bell & Valet services within the hotel without the need to pickup any hardwired device such as a telephone. The interactive device saves the guest and the hotel time and money by increasing the efficiency of the hospitality experience provided by the hotel to the guest.

In one or more embodiments, the Concierge category permits a hotel guest to gain assistance from the hotel's concierge services through a guest's voice command issued to the interactive device. In one or more embodiments, voice interaction within either the Bell & Valet or the Concierge category provides the guest with hands free initiation of a phone call with the hotel's service desk as facilitated by the interactive device utilizing voice over internet protocol (VOIP).

In one or more embodiments, the Guest Office category permits a hotel guest to receive assistance from the hotel's guest business office services, such as, but not limited to; document printing, Internet search and printing, for example printing airplane boarding passes, maps, info, etc., facsimile receipt and transmission, etc. Guest Office services are obtained through a guest's voice command issued to the interactive device. In one or more embodiments, voice interaction within the Guest Office category provides the guest with hands free initiation of a phone call.

In various embodiments, one or more of the categories are combined together to provide a guest experience, such as for example, combining; Personalization, Advertise, and Retail to provide a shopping experience to the hotel guest. In one non-limiting example, provided merely for illustration, combining these three categories is initiated by Personalization where the HSAI system asks the guest by voice announcement: "How did you sleep last night, did you enjoy the pillow?" In one embodiment, supposing that the guest's response was in the affirmative, for example, the guest replies by voice: "I slept great, I love the pillow." The interaction then progresses to Retail and the H SAI system can ask the guest by voice interaction: "Would you like to purchase one of our pillows?" if the guest responds in the affirmative then the pillow is sold to the guest. In various embodiments, the transaction can be included on the guest's bill or the transaction can be billed to the guest separately. The guest experience described above saves the guest and the hotel time by providing a unified purchase experience without the need for "shopping" via brick and mortar store, such as the hotel gift store or on-line shopping.

The products offered for sale to the guest through the HSAI system are not limited to the products used by the guest within the hotel room. In other embodiments, products such as menu items at a nearby restaurant are offered to the hotel guest through the HSAI system as well as products that are unrelated to the hotel or the environment of the hotel, such as but not limited to plane fares, consumer goods, etc.

In one or more embodiments, the Admin function provides analytics and admin control on guest interactions with the HSAI system, such as but not limited to; providing data on the most requested aspects of a guest's stay, storing data on particular guests via "Learning" to facilitate "Preferences" associated with a particular hotel customer. In various embodiments, the hotel admin can enable the mute on an interactive device's microphone so that privacy was increased for the hotel guest.

In other embodiments, individual SKILLs are created for each category of Hotel Mischel. For example, the SKILL for Room Service can be invoked when the user says: "Alexa open Room Service." Other SKILLs for other categories are opened by similar command to the VTAI system.

Figure 21B:
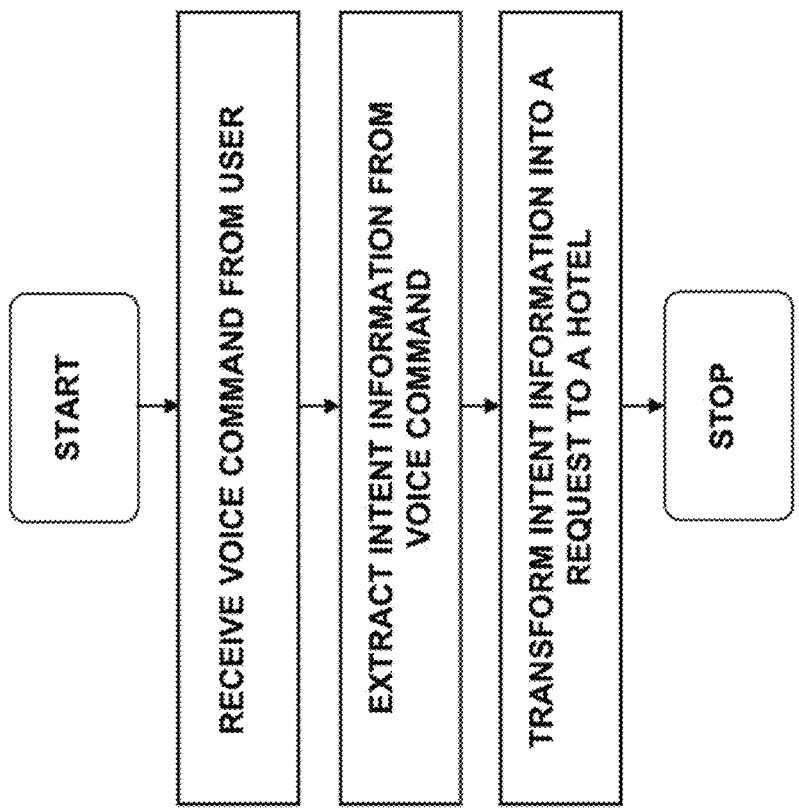
FIG. 21B illustrates a process for interaction between a guest and a hotel according to embodiments of the invention.

FIG. 21B illustrates, generally at 2130, a process for interaction between a guest and a hotel according to embodiments of the invention.

Figure 21C:
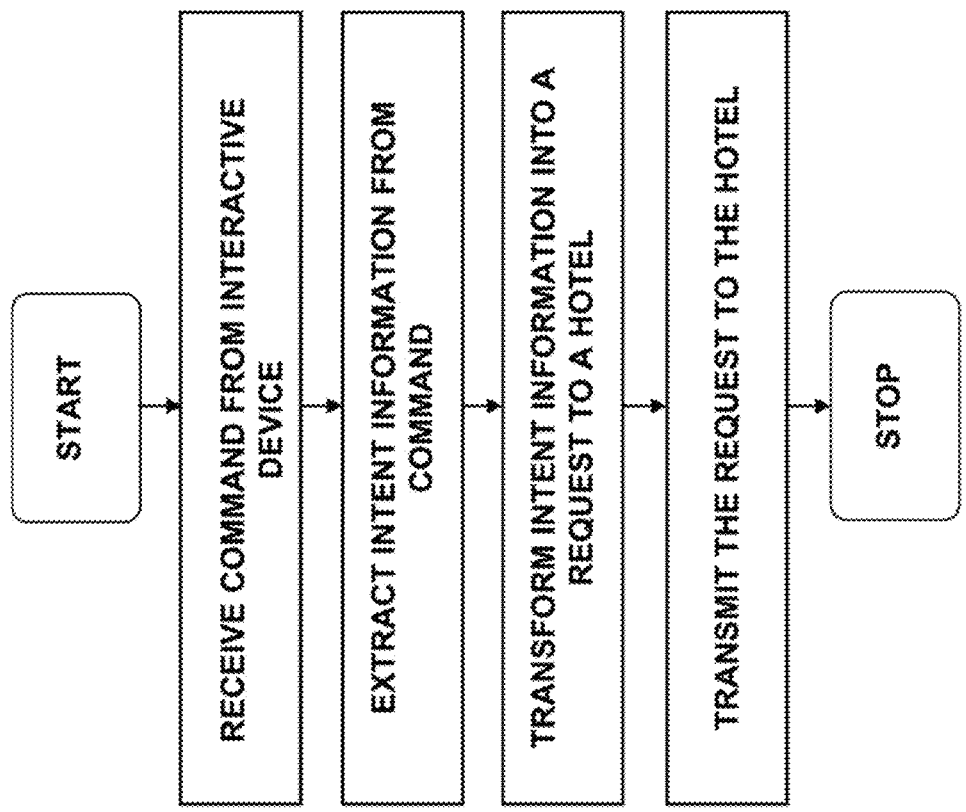
FIG. 21C illustrates another process for interaction between a guest and a hotel according to embodiments of the invention.

FIG. 21C illustrates, generally at 2150, another process for interaction between a guest and a hotel according to embodiments of the invention.

Figure 21D:
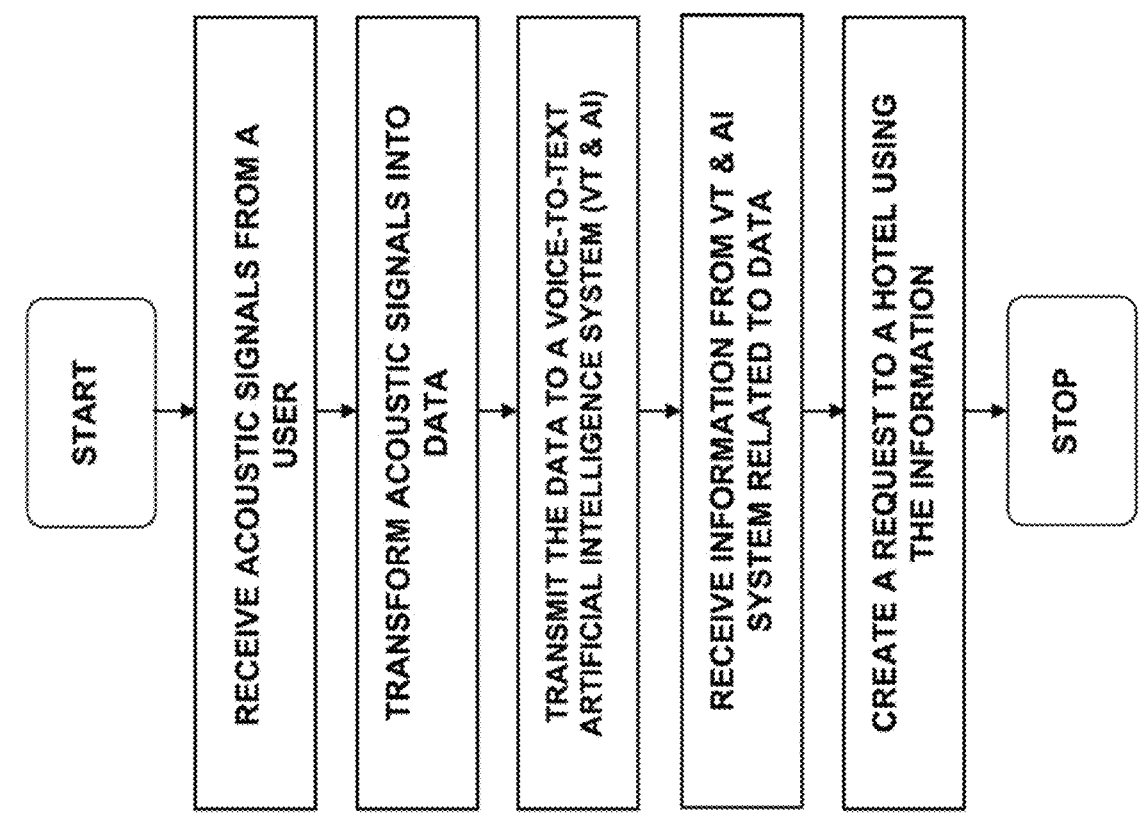
FIG. 21D illustrates yet another process for interaction between a guest and a hotel according to embodiments of the invention.

FIG. 21D illustrates, generally at 2170, yet another process for interaction between a guest and a hotel according to embodiments of the invention.

Fire, Life, and Safety

Figure 22:
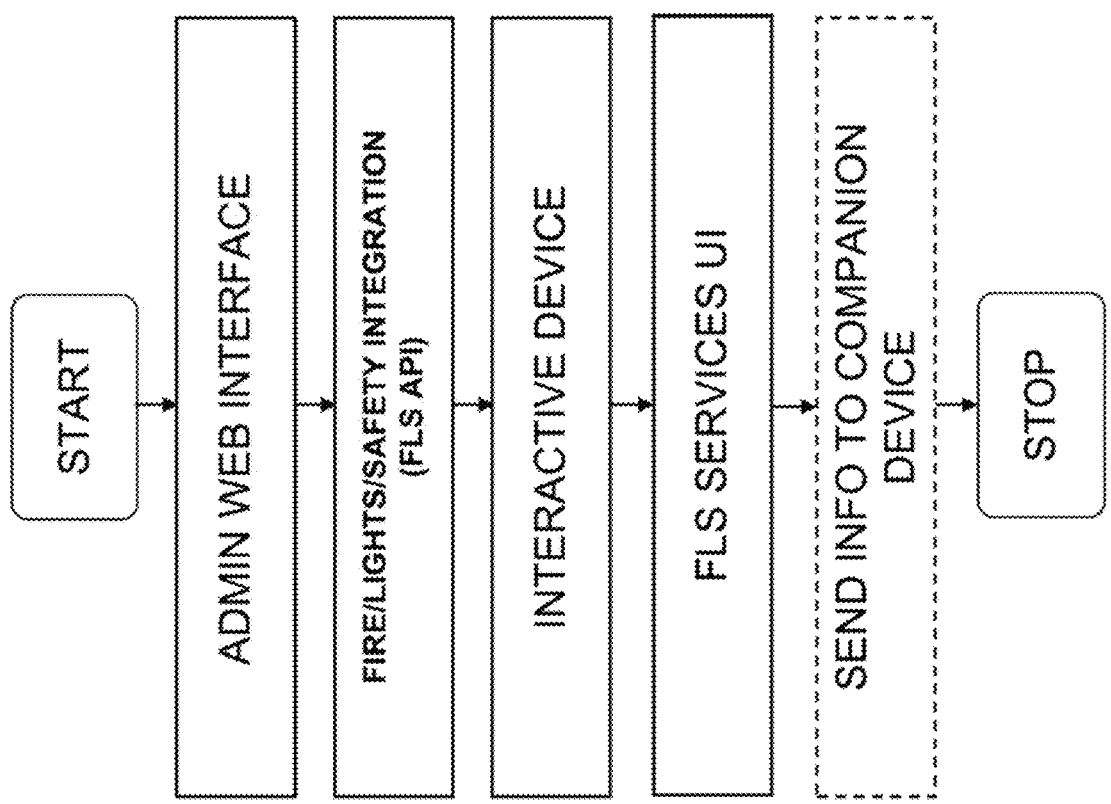
FIG. 22 illustrates fire, life, and safety services provided through an interactive device, utilizing the communications network architecture of FIG. 9A, FIG. 9B, FIG. 10, or FIG. 11 according to embodiments of the invention.

FIG. 22 illustrates, generally at 2200, fire, life, and safety services provided through an interactive device, utilizing the communications network architecture of FIG. 9A, FIG. 9B, FIG. 10, or FIG. 11 according to embodiments of the invention. With reference to FIG. 22, in overview, an interactive device Fire Life and Safety Service program integrates with the Fire, Life, and Safety System (FLSS) from a given geographical area or building. The integration provides FLSS data to the intelligent interactive device network deployed in a given hotel following the process illustrated in FIG. 22.

In the event of a fire or other life threatening event, such as a natural disaster or an emergency instigated by crime or other disturbance of the peace, communication from the FLS System is provided to an interactive device to alert the guest of the present danger. As described above, an interactive device is located in the guest room or an interactive device is located in an area associated with the building in order to communicate to the guest instructions and information related to the emergency. Some examples of information related to an emergency are, but are not limited to, a map of the escape plan that is used during a fire, locations within the room or building to seek during an earth quake. FLS information is provided on a data display of an interactive device when an interactive device is so equipped. In other embodiments, an interactive device receives data and provides an audible warning by means of a speaker or a visual warning by means of a light. The speaker, the light, the display, etc. can be physical phenomena devices that are part of an interactive device as described above in conjunction with the preceding figures. In other embodiments a speaker, light, etc, are connected devices by means of a network. Some devices that are physical phenomena devices, which are used in this capacity, are also indicated on FIG. 22 as "companion devices." The integration of an interactive device with a FLS system provides the hotel guest with enhanced protection from dangerous situations by bringing the FLS warning directly into the user's hotel room by virtue of the location of the interactive device.

Messaging Service

Figure 23:
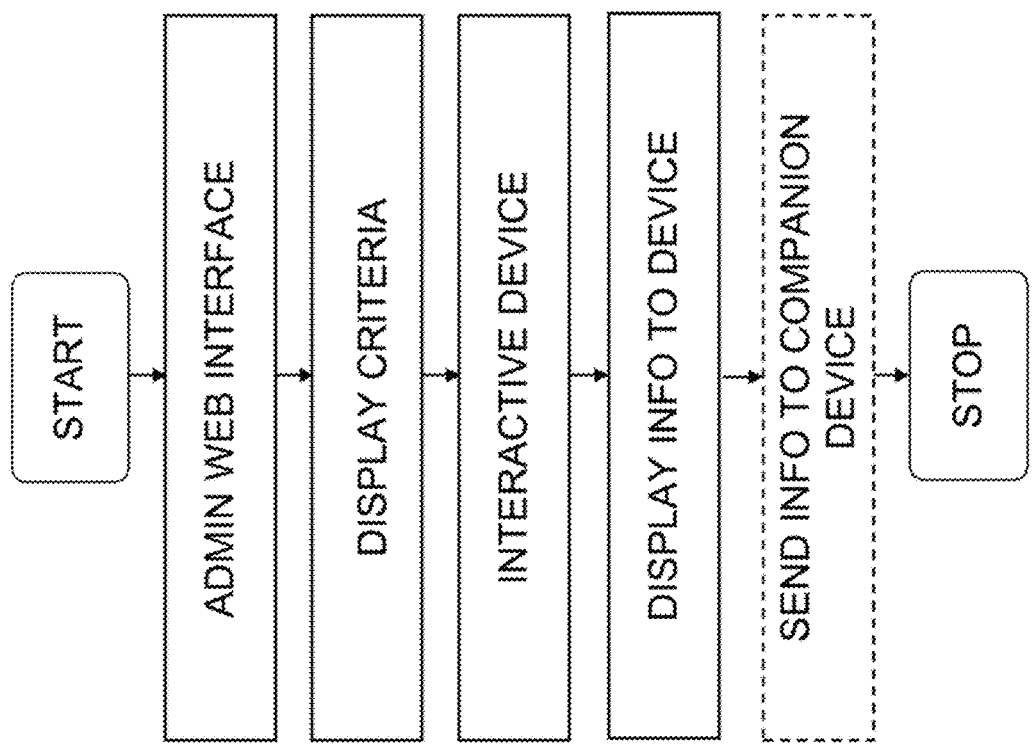
FIG. 23 illustrates external content integration provided through an interactive device, utilizing the communications network architecture of FIG. 9A, FIG. 9B, FIG. 10, or FIG. 11 according to embodiments of the invention.

FIG. 23 illustrates external content integration provided through an interactive device, utilizing the communications network architecture of FIG. 9A, FIG. 9B, FIG. 10, or FIG. 11 according to embodiments of the invention. With reference to FIG. 23 messaging functionality is one form of content that is provided to one or more interactive devices and is controlled from a centralized point.

In various embodiments, messaging to an interactive device is accomplished either by integration of an interactive device with a hotel's information system as described above with the HSAI program/system or messaging to an interactive device is accomplished through the Messaging Service Program.

During set-up configuration, using the Messaging Service Program, a hotel admin user sets up configuration parameters using the web based Hotel Device Management Portal. The hotel admin user defines "Display Criteria," for example specifying which set of rooms or room type a given message will be sent to. "Interactive Device" indicates which interactive devices will be able to receive a given massage. "Display Info To Device," indicates the communication of the message to the interactive devices. Interactive devices communicate with the EM API Server, thereby adapting to the parameters defined during the setup configuration. "Display Info To Companion Device" is an optional communication of a message to other devices in a hotel guest's room such as a physical phenomena device in the interactive device or a smart device within the guest's room that is controllable through the network, such as but not limited to; a light in an interactive device, such as for example a light within an interactive device, a sound notification from an interactive device, a voice communication from a VT & AI system to the user through the interactive device When an interactive device has a display, the message is placed on the display for the guest to see. In some embodiments, a companion device is used to get the guest's attention, for example an audible tone from a speaker. In other examples, a companion device is a user's personal device such as the guest's mobile phone (one example of an optional companion device) and the message is sent to the guest via text message to the mobile phone.

In one embodiment, illustrating one example of operation, a hotel desires to send a message to all hotel guests that are attending a conference at the hotel. The hotel uses the HOTEL ADMIN Web Interface to enter the data to compose the message and to specify the subset of rooms that will receive the message. The EM API Server updates the set of interactive devices that have been selected to receive the message as described above and sends the message out to the subset of devices.

Multi Touch/Gestures

In some embodiments, the interactive device is an interactive device that contains a touch screen. In some embodiments, this is an interactive mirror with a touch screen. In some embodiments, the interactive device has a touch screen that supports multiple independent inputs referred to as multi-touch gestures. e.g., swipe, twist, turn, zoom, etc.

Using gestures to control interactive mirror functionality, the user interacts with the interactive mirror device using touch, multi touch, voice and companion devices. Using fingers or a touch stylus, the user can operate the mirror device User Interface (UI) to navigate the menu system and access all available features and functionality. By supporting multi-touch, more than one touch input method is available to the user. This enables two hand operation, or multiple fingers manipulating the UI. This functionality allows for more natural movements and interactions with objects and controls provided in the UI. An example of multi-touch gesture is the use of a dial or knob that requires the user to twist or turn the dial to set a temperature setting or color selection. By supporting multi touch, within an interactive device, this input method and UI behavior is available to the user.

Lighting Scenes

In some embodiments, the interactive device is an interactive device that contains a display screen as illustrated above in previous figures. Custom light scene functionality is provided as a program that controls the lighting of the display screen in the interactive device according to various themes. Some examples of themes are, but are not limited to; rainforest, rainbow, moving lights around a perimeter of the display screen, etc.

The interactive device includes pre-set lighting scenes that are available to be changed by the user. The presets include theme based effects which include custom color combinations to achieve the lighting effect. This includes mood setting for cool white and soft white modes, and creative themes like 'rainforest' lighting theme includes cool blues and warm greens that dynamically adjust variable intensity, brightness and contrast. Preset lighting settings can be configured from the Hotel Mirror Management Portal based on the administrator's settings.

Room Control

In various embodiments, the interactive device connects to and controls a number of smart automated room peripherals, such as, but not limited to; blinds & curtains, door locks, lamps, shades, entertainment consoles, TV's, phones, etc. The setup and administration of these integrations is managed by the Device Management Portal which integrates to the Hotel Information System and integrated smart room devices. Depending on the settings provided by the hotel administrator, the interactive device user interface (UI) will allow guests to interact with the guest room smart devices by using the touch or voice interface of the interactive device.

Some examples of interactive device functionality provided by Room Control are, but are not limited to, ability to lock room doors, turn TV on, off, control lighting, etc. by voice command or through the touch interface on an interactive device.

In some embodiments, Room Control is presented to a user on a menu, such as, for example 816 in FIG. 8A above.

Room control can also be accomplished by a companion device such as a user's mobile phone or computer. In one or more embodiments, a companion device can be a user's mobile phone running a mobile application program that allows the user to interface with the interactive device in the room and accomplish control of a device. Room Control is a temporary user customization of an interactive device and the automated room peripherals. The status of the room is returned to a default configuration when the guest checks out. A hotel admin user sets up configuration parameters for Room Control using the web-based Hotel Device Management Portal and the process of FIG. 23.

Volume Control

In some embodiments, the interactive device includes audio speakers used for music, audio prompts, etc. In some embodiments, the volume control for the speakers is included in the graphical user interface available by touch as well as by voice control, thereby providing the ability for a user to lodge a voice request to the device to adjust the volume. Volume settings can also be controlled by the Device Management Portal remotely or from optional companion devices. In one or more embodiments, a companion device can be a user's mobile phone running a mobile application program that allows the user to interface with the interactive device in the room and accomplish volume control.

In some embodiments, Volume Control is presented to a user on a menu such as for example 816 in FIG. 8A above.

Personalized Greeting

In various embodiments, using the Device Management Portal, hotel admins can provide guest specific messaging and content to individual interactive devices. Following the process of FIG. 23, the devices are managed in the Device Management Portal which gives the admins access and control to each specific interactive device. For custom messaging, admins can provide images, text content and media specific to a guest. For example, welcome the guest to their conference, congratulate them on an anniversary, provide them a personal welcome message, etc. The Device Management Portal also provides the ability to integrate with the Hotel Information System (HIS), following the process of FIG. 21A in order to sync custom messages between platforms. Utilizing the HIS to provide personalized greetings can provide a streamlined flow of data within a hotel's guest management process, thereby reducing the duplication of effort and saving the hotel time and money.

Games

In various embodiments, based on configuration setup in the Device Management Portal, interactive devices will provide a game menu option. In one or more embodiments, via a menu selection from 816 in FIG. 8A for example. Games include basic games the user can easily navigate using the touch interface or answer questions via voice. Games could include trivia games such as Jeopardy which is played via voice, or touch games such as Snake. Games are provided for customers to play via interactive touch or interactive voice interface or a combination of both via the multiple user inputs described in FIG. 20 and a program(s) 2015.

Sports and News

In various embodiments, from the Device Management Portal, hotel admins can adjust settings and/or provide custom feeds to sports and or news content providers. In various embodiments, sports or news content is obtained, for example, through a sports API or a news API. Integration with the interactive device system is accomplished with one or more of the APIs in the external API stack shown in the figures above. With reference to FIG. 20 a user input 2010 causes sports content or news content or both to be retrieved from 2018 (general external API) in various embodiments and then to be delivered to the interactive device that was the subject of the interaction with the user. In various embodiments, the interactive device sports feed or news feed uses an aggregate of freely available content sources to provide general sports or news headlines which are configurable by the hotel admin in the Device Management Portal. Audio, video, and text content are supported according to the particular configuration of an interactive device.

In some embodiments, the Device Management Portal is used by a hotel to provide restriction based on geography, for example restricting sports or news to the events going on at or near the particular hotel property. These restrictions can be used by the hotel to drive guest attention to the particular hotel's property and away from activities going on at competitors' properties.

Weather

In various embodiments, based on location data provided in the Device Management Portal, the interactive devices will present time, date, and weather information in the main user interface (UI) view. In various embodiments, the weather data is represented using iconography and type to display the temperature, humidity, precipitation, forecast and any severe weather warnings. The user can adjust the location of weather if they want to explore neighboring cities or other areas of interest. The user can also ask the interactive device for the weather using voice control, to have the weather audio read back to them. The source of the weather data is an aggregate or open weather data providers that have been integrated into the interactive device network. Severe weather warnings (alerts), e.g.; tornado, flood, lake effect snow, tsunami, etc. will be provided as a visual and audio alert, along with any companion/instructional text related to safety recommendations. Audio, video, and text content are supported for interactive devices. In various embodiments, an example of the UI described above is illustrated above with FIG. 8A, FIG. 8B, FIG. 8C, and FIG. 8D.

In various embodiments, the weather content provided to the user through the interactive device UI is a proactive display of weather information that saves the user time because the user does not have to perform Internet searches for the weather. In addition, the proactive display of weather or weather alerts on an interactive device's UI can alert the user ahead of time so that a user can adjust plans before moving into an area of problematic or dangerous weather.

Stocks

In various embodiments, following the process described above in conjunction with FIG. 23 various levels of stock market information and news are integrated into the interactive device network from the Device Management Portal. Hotel administrators can select which stock market indexes or stocks they want to provide in the UI for the interactive devices. These settings can be saved in profiles that are related to room types in some embodiments. Stock market data is represented in a variety of formats from intraday to year-to-date. Users can browse the data at multiple detailed levels and access news information that is related to selected stocks. Users can also ask the interactive device with voice control to have the stock market data returned as audio and played through the speakers.

Nearby Events

In various embodiments, following the process described above in conjunction with FIG. 23 various local events and attractions in the area are provided to interactive devices within the interactive device network.

Based on location data provided in the Device Management Portal, the interactive device will present a menu option for users to discover events happening around them. The source of this data is a combination of different data providers that have been aggregated into a proprietary feed. The event data is presented to the user visually when the interactive device has a display with the ability to discover more. Events can also be presented in map view to communicate to the user how far the events are from the hotel location via a display. When an interactive device does not have a display, the events can be broadcast to the user with a speaker in an audio interaction between the interactive device and the user.

Events are both events nearby to a hotel as well as events that a hotel is sponsoring itself, perhaps at the hotel. For example, a list of events is, but is not limited to: we are having yoga at noon today, breakfast on the beach in the morning, paddle boards at noon, etc. In one or more embodiments, Google Places API is integrated into the interactive device network to provide a portion of the events in a geographic area. In one or more embodiments, more granular data is added that pertains to the local events to create the custom feed of nearby events, which is not available via commercial APIs like Google Places.

Leave Notes/Message on Mirror

In various embodiments, using touch and multi touch functionality, an interactive device has a draw mode that allows the user to choose a pen type and color to freehand write or draw on the surface of the interactive device, displaying their creation on the screen. This provides the ability for the user to write notes, messages, draw pictures, and preserve them on the display screen for another viewer to see. This feature can be administered from the Device Management Portal by a hotel administrator, and remotely reset when the guest completes checkout. This functionality is a guest specific interaction, such as is indicated at 2016 in FIG. 20 with one or more of APIs 2018 and program(s) 2015.

Visual Window

In various embodiments, an interactive device with a display provides the ability to display a static or live display from another region on the display. This functionality is referred to as a "glass window" or a "visual window." The image displayed could be a live image from outside, from another place like Paris, or a looped image of waves crashing on a beach. The content displayed is controlled by the hotel administrator using the Device Management Portal as described above in conjunction with FIG. 23. Options for the user to select different visuals are also provided in some embodiments. In various embodiments, the interactive device can provide a menu option for Visual Window such as in the menu of FIG. 8A or Visual Window can be invoked by voice command when an interactive device is equipped with voice interaction functionality.

Security Camera

In various embodiments, a user is provided with the ability to connect to and view his or her own security system through the user interface of an interactive device. Based on the settings and configuration provided by the hotel administrator using the Device Management Portal (FIG. 23), interactive device users can provide connection details to their home security system inside of the device user interface (UI). This provides the user with the ability to turn the interactive device into a remote video monitor of their home security system.

In one or more embodiments, a web browser is provided in the UI to enable a user to access the URL of their security system provider. In other embodiments, one or more security system APIs are integrated into the interactive device network to provide direct access to a security system's login interface. In various embodiments, one or more security system login user interfaces are integrated into the interactive device network and are presented as menu options within 816 in FIG. 8A.

Access to user accessed external resources that required user login credentials are reset when the guest completes checkout. In addition, such functionality of Security Camera is a guest specific interaction, such as is indicated at 2016 in FIG. 20 with one or more of 2018 and or 2015.

Traffic Maps

In various embodiments, traffic information is displayed to a user on an interactive device. In other embodiments, an interactive device provides traffic information via voice interaction with the user. In some embodiments, both voice and visual display are used to present traffic information to the user.

The Interactive device provides mapping functionality to display traffic information around the user. Using the Google Maps service and other traffic services, a custom UI is created that provides important information to hotel guests in regards to travel times, traffic delays, road construction, detours, closures, etc. This mapping and way finding functionality provides the user information but also options for travel. In some embodiments, options for travel involve understanding the walking route or distance, hills and elevation, public transit options, multi-modal transport, ferry schedules, fees & toll roads, alternative transport options such as UBER®, LYFT™, and other rideshare services. This is a feature that can be enabled or disabled based on the hotel administrator settings in the Device Management Portal as described in conjunction with FIG. 23.

Light Controls

In various embodiments, an interactive device provides different lighting options that are configurable and controllable from within a touch and/or a voice user interface. This allows the user to change colors, brightness, shade and other attributes of lights that are controlled by the interactive device. Lighting controls are also available for other smart devices that are connected in the room to the interactive device, for example through Room Controls described above. Lighting preferences can also include auto on, off, easy wake up—gradually increase light brightness in morning hours, and evening modes. Lighting parameters can be joined to other interactive device operations such as alarm settings, sunrise, sunset, silent alarm/lights only, etc. Custom light preferences are reset to defaults defined in the Device Management Portal on guest checkout. Light Controls is a temporary user customization of an interactive device.

Wearable Features

In various embodiments, the interactive device provides an interface and connectivity functions that support integration to wearable devices. This allows for an interactive device to serve as a visual interface that can be used to configure a wearable device that does not provide a visual UI. This also enables an interactive device to receive information from the wearable to display on screen within the interactive device. In one or more embodiments, a non-limiting example is displaying progress of your daily step goal, or congratulating the user for meeting the user's step goal. In some embodiments, an interactive device is configured to receive alerts from wearables such as message notifications, mobile phone alerts, incoming phone calls, new emails, calendar reminders, etc. If placed in communication with a child or pet tracking device, an interactive device could provide real time visual data indicating a current location and status, with interactive controls. This functionality allows the user to interact with their wearable device with the interactive device acting as an extension of that device. Other devices could include health monitors such as scales, body mass index (BMI) calculators, pulse monitors during exercise, etc. This functionality is controllable from the Device Management Portal by hotel administrators, and reset to default values on guest checkout.

Some wearables, such as some watches or wrist bands, are designed to communicate with a phone and the phone provides the network connection for the wearable. Other wearables provide their own network connection directly. In some embodiments, the interactive device network is integrated with an API such as the API from My Fitness Pal®. Integration with the My Fitness Pal® API provides connectivity to a large user base of wearables through a single API integration and in some cases integration to devices that do not have an API. Wearable Features is a temporary user customization of an interactive device.

Front and Rear Camera

In various embodiments, camera assistance is provided by an interactive device to aid the user with activities performed proximate to an interactive device. For example, in some embodiments, an interactive device is configured as an interactive mirror providing assistance to a user with hair and makeup. In one or more embodiments, an interactive device has a camera function that provides assistance to a user on topics, such as, but not limited to; analysis and recommendations for makeup/cosmetic applications. When the camera system is enabled, the optical sensor and processor calculate and project different shades, tones, shadows and colors to the subject in focus. The UI allows the user to adjust and calibrate the sensors for optimal output. In one or more embodiments, the interactive device provides the user cosmetic options and recommendations. The camera(s) can take video or still photos by voice or touch control, and also provide a rear view for assistance with; hair styling, clothing, etc. In some embodiments, using advanced image and facial feature recognition, the interactive device can allow the user to see options for hair styles, hair color, and makeup choices.

In various embodiments, the user is able to zoom one, or the other, or both of the cameras in order to provide the desired view of the user. In some embodiments, voice interaction permits hands free zooming of the camera(s) by voice command.

Front and Rear Camera functionality is controllable from the Device Management Portal by hotel administrator and is reset to defaults on guest checkout. Front and Rear Camera functionality is a temporary user customization of an interactive device.

Wireless Beacon

In various embodiments, a user is alerted to an interactive device's capabilities by communication with a wireless beacon. In one or more embodiments, the interactive device is equipped with beacon functionality, for example in Eddystone™ format that advertises itself to other smart devices. In other embodiments, other wireless protocols are used, such as but not limited to; iBeacon™, etc. The Wireless Beacon function allows the interactive device to be discoverable to devices that come within range of the beacon. The alert informs the user of the interactive device's presence and capabilities. One non-limiting example is the interactive device announcing: "Hello! Your room is equipped with an interactive device that can help in many ways. Tap the interactive device glass or say 'Hi Electric Mirror' to get started."

Transportation Info

In various embodiments, a map display of transportation options is provided to a user on an interactive device. When available, an interactive device provides a function to view multiple transportation options available to a user in the user's area. In some embodiments, in combination with Google Maps, traffic, and transit information is provided. The interactive device also integrates with ride services such as UBER® and LYFT™, to provide a visual display of cars available in the area of the hotel. This functionality allows the user to explore multiple transport options when planning a trip. The functionality of displaying available cars is available to a user without needing to log in or to create an account. If the user chooses to log in to enhance the functionality, the account will be automatically logged out when the guest completes checkout. This feature can be enabled/disabled by hotel administrator using the Device Management Portal. Transportation Info functionality can be a temporary user customization of an interactive device.

Music

In various embodiments, a streaming music player is provided in an interactive device. From the interactive device UI, with touch controls, voice controls or a combination of voice and touch controls the user can select music to listen to via the interactive device. The menu for music provides a UI that allows the user to select from a range of tracks and genre based channels. The interactive device uses a variety of back end services to connect to that make streaming music possible to the user. In addition to streaming music, the user can optionally log in to streaming services such as Pandora™ and others to access music personalized from the user's account. If the user chooses to log in, to enhance their music experience, the account will be automatically logged out when the guest completes checkout. This feature can be enabled/disabled by hotel administrators using the Device Management Portal. Music functionality can be a temporary user customization of an interactive device.

Clock/Alarm/Timer

In various embodiments, an interactive device displays time in different formats that are selectable by the user. Time is provided by a network time service, therefore there is no setting or adjusting of time functionality even in the event of a power failure or power cycle, including time zone and daylight savings time adjustments. Alarms are available to users to customize for audio sounds, music selections, light and light color behavior in any combination. Countdown timers and stop watch/counter functionality is also available in an interactive device UI. Countdown, timer, and alarm functions can also be controlled with voice commands. Any custom Clock/Alarm/Timer settings customized by a user are reset to hotel defaults in the Device Management Portal at guest checkout. Clock/Alarm/Timer functionality is a temporary user customization of an interactive device.

Background Noise/Sleep Aid

In various embodiments, the interactive device performs a variety of sleep aid sound operations. A non-limiting list includes, but is not limited to; playing white noise which mutes tones disruptive to sleep, playing ocean wave sounds, playing babbling brook sounds, playing cricket sounds, peep frog sounds, etc. The lighting operations can also be tuned for sleep aid, such as night light mode, reduced brightness and warm/cool color tones selectable by the user. Any Background Noise/Sleep Aid settings customized by a user are reset to hotel defaults in the Device Management Portal at guest checkout. Background Noise/Sleep Aid functionality is a temporary user customization of an interactive device.

Quote of the Day

In various embodiments, using the Device Management Portal, hotel administrators can select from services that provide quotes or supply their own, such as for example inspirational quotes. The quotes are displayed as a noninvasive message to the user that can quickly be dismissed. This setting is configurable from the management interface by hotel administrators in the Device Management Portal.

Content Casting

In various embodiments, content casting via a personal device to an interactive device can be allowed by hotel administrators in the Device Management Portal. Such functionality permits a user to cast a content stream from their personal device to the interactive device's display. This function allows users the ability to use their own device to deliver the content of choice to the interactive device, such as, but not limited to; custom video streams from YouTube® or Netflix®, downloaded/localized content from their device media library, audio streams from pod casts or local music libraries, etc.

HDMI Input

In various embodiments, HDMI Input allows hotel administrators to pair the interactive device with some other video content device such as a set-top-box or a media device that outputs video in HDMI format. By being connected to the interactive device, via HDMI, the video and audio inputs are made available for viewing on the interactive device display. From the interactive device menu, a user can select other video and audio options that are configured and setup by the hotel administrator in the Device Management Portal.

Live TV

In various embodiments, from within the interactive device UI, users can select and view live TV programming.

This functionality is supported by a variety of TV Internet streams that have been sourced and aggregated to provide this content if hotel administrators allow it in the Device Management Portal. The channel guide is configurable in the portal and requires channel lists be set up and organized by hotel administrators. Providing live TV to users in guest rooms as described in these embodiments through online streaming to an interactive device is an alternative to television content provided by cable TV or Satellite TV.

Bluetooth Pairing

In various embodiments, Bluetooth Pairing enables a user to pair their personal device to an interactive device, thereby allowing audio output from the personal device to be heard through the speakers in the interactive device. This enables any type of audio content to be played through the interactive device, such as, but not limited to; personal music collections, personal streaming services, pod casts, etc. Any custom Bluetooth pairing settings are reset to hotel defaults in the Device Management Portal at guest checkout. Bluetooth Pairing functionality is a temporary user customization of an interactive device.

Web Search and Search Results Display

In various embodiments, an interactive device provides an intelligent, voice interactive interface to; receive a user's voice command, convert the voice command to text and user intent with a VT & AI system, conduct an Internet search, return the search results for display to the user, and interact with the user via voice interface to manipulate the search results. In one or more embodiments, a VT & AI system converts the voice command to text and extracts user intent information, from the user's voice interaction. The system passes a search string to a search engine that performs the search and then passes search results back to the system for analysis and display to the user. Voice interaction between the user and the system facilitates display and manipulation of the search results on the display of the interactive device.

In one on-limiting example, provided merely for illustration, a user speaks a command such as: Show me the houses that are for sale on 1st Avenue in Seattle." The system returns search results which include an array of results, for example; text, image, and video data and a voice response based on the user's voice command. One example of a system response is—the VT & AI system replies; "I have results, would you like to see images, video, or text results?" Following the selection of search results, the user can interact with the interactive device to examine the search results.

In various embodiments, Web Search & Results Display functionality is provided by a combination of a program(s) (such as 2015 in FIG. 20) that integrates with a search engine API or APIs and a VT & AI system.

Voice-to-Text Artificial Intelligence (VT & AI) Integration

In various embodiments, as described above, the interactive device provides a voice interface that utilizes a voice-to-text artificial intelligence (VT & AI) system to extract user intent from the captured voice signals. An example of a VT & AI system is the Amazon Alexa Voice Service (AVS). Other examples, are one or more of Google™ speech-to-text, International Business Machine's IBM speech-to-text, International Business Machine's IBM Watson, etc. A voice interface enables the user to interact with and to control interactive device functionality by voice command. Some examples of functionality that are controlled by voice command are, but are not limited to; time, date, weather, power on, power off, lights on, lights off, etc., as well as more advanced functions that the hotel administrator can enable in the Device Management Portal.

In various embodiments, one or more of the program functionality described herein, such as but not limited to; Fire Life and Safety, Messaging Services. Multi Touch Gesture, Lighting Scenes, Room Control, Volume Control, Games, Sports, News, Weather, Stocks, Nearby Events, Leave Notes/Messages on Mirror, Visual Window, Security Camera, Traffic Maps, Light Controls, Wearable Features, Front and Rear Camera, Wireless Beacon, Transportation Info, Clock/Alarm/Timer, Background Noise/Sleep Aid, Quote of The Day, Content Casting, HDMI Input, Live TV, Bluetooth Pairing, Web Search and Search Results Display, etc. can be voice enabled (either fully or partially or in combination with touch input) to assist the user through voice interaction. In various embodiments, other functions include, but are not limited to; interfacing with other smart in-room devices such as lighting, blinds, door locks, do not disturb, guest service requests and calls for help in the case of emergency. Functionality is controllable from the Device Management Portal by a hotel administrator and is reset to defaults on guest checkout. Interactive device functionality is a temporary user customization of an interactive device.

In various embodiments, the programs, networks, and APIs described above are combined into an integrated hospitality experience that provides time savings, safety, and opportunities to a hotel and hotel guests that heretofore have not been achievable.

Figure 24:
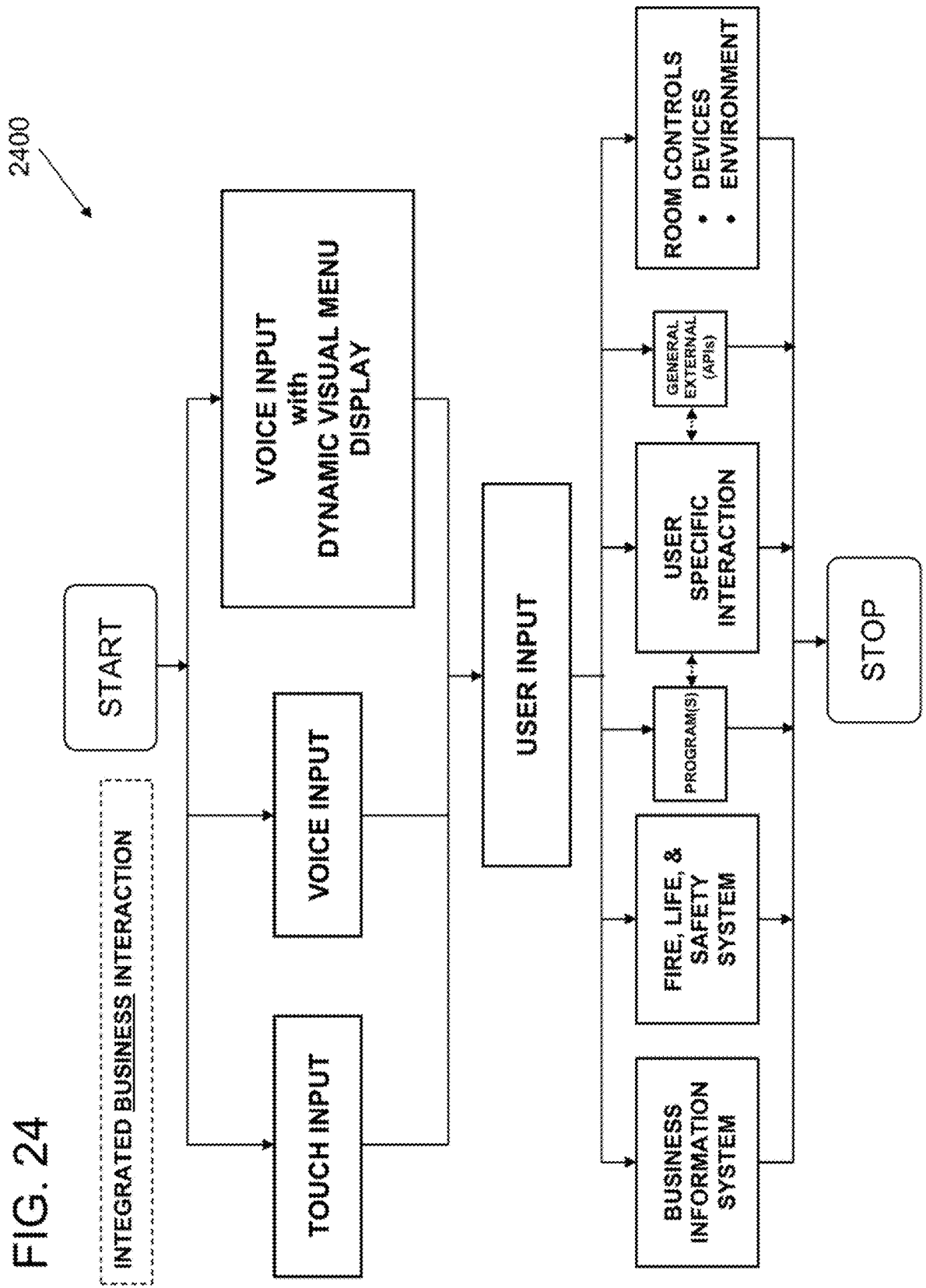
FIG. 24 illustrates an integrated business experience according to embodiments of the invention.

FIG. 24 illustrates, generally at 2400, an integrated business experience according to embodiments of the invention. With reference to FIG. 24, all of the interactive device functionality described above for a hospitality environment is applied to a commercial setting for a business. In the context of FIG. 24, integration is performed with a business information system (BIS). Employees and customers of a business interact with interactive devices of the system as described above with respect to the hospitality environment. In some embodiments, the person in charge of the business's information system(s) functions as the admin user to establish permissions/device functionality, etc. for the other users, employees, guests, etc. in an analogous fashion to that described above in the hospitality environment.

Figure 25:
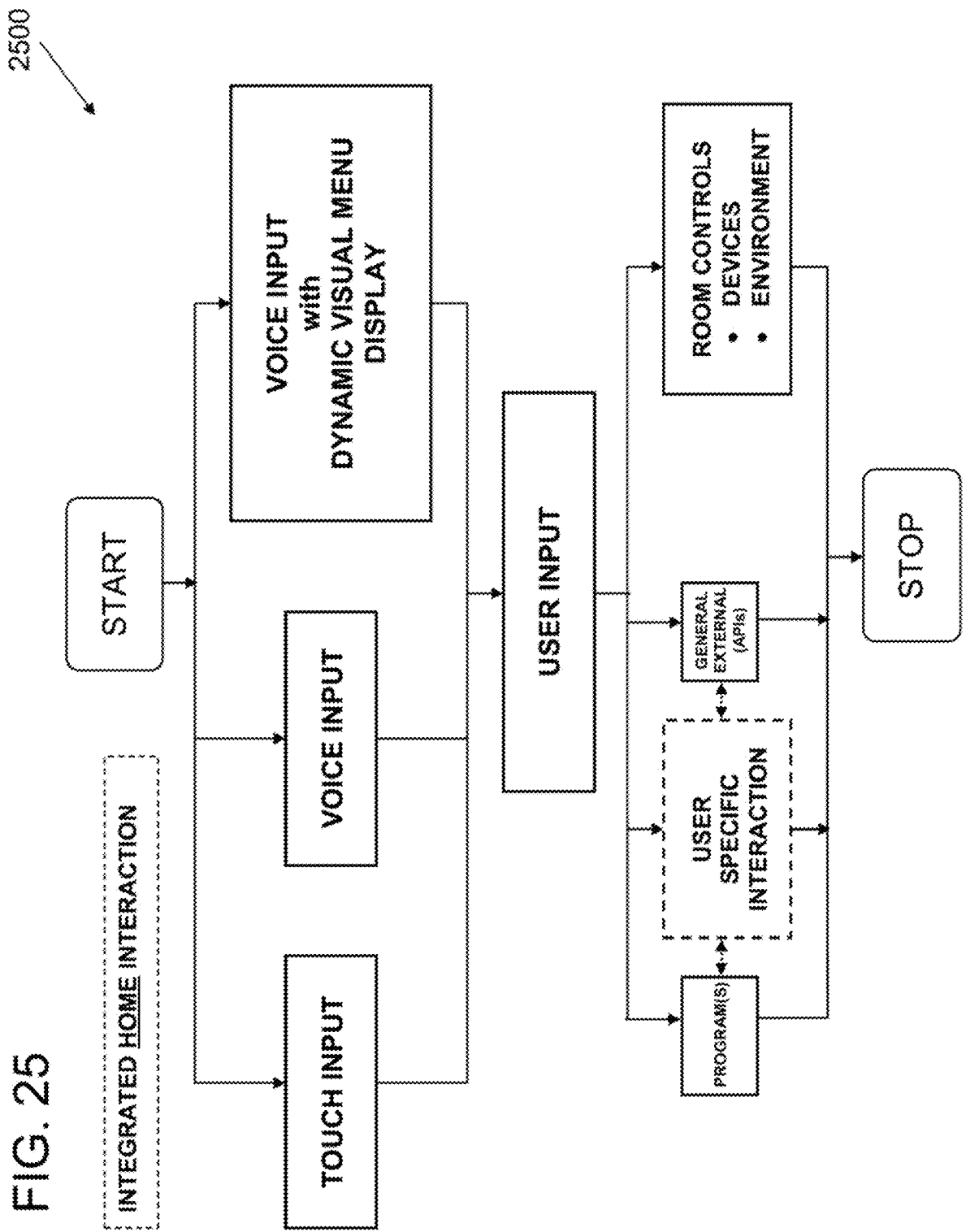
FIG. 25 illustrates an integrated home experience according to embodiments of the invention.

FIG. 25 illustrates, generally at 2500, an integrated home experience according to embodiments of the invention. With reference to FIG. 25, all of the interactive device functionality described above for a hospitality environment is applied to a residential setting for a home environment. In the context of FIG. 25, the functionality described above for interactive devices is provided to a home owner and other people who use the home, such as, family members and guests. In some embodiments, the person in charge of the home functions as the admin user to establish permissions/device functionality, etc. for the other family members or guests in an analogous fashion to that described above in the hospitality environment.

FIG. 26 illustrates an Artificial Intelligence (AI) process according to embodiments of the invention. With reference to FIG. 26, in various embodiments, an artificial intelligence or machine learning system (AI), described herein, provides the ability to enhance the hospitality information system's (HIS) ability to interact with the guest over time based on ongoing data collection and learning that results from processing the data by the AI system.

Data acquisition proceeds based on initial data that is collected within a hospitality environment, this schemaless data is the aggregate of all of the data that the hospitality information system has available to it. Examples of this data have been described on conjunction with the figures above.

An ontology is created for a hospitality environment or business based on the hospitality environment's business activity and performance metrics. Ontologies are influenced by the things that a hotel or brand has, such as but not limited to, rooms, restaurant, golf course, pool, spa, parking lot, etc. all contributing to a multivariable ontology for a hospitality environment. Hospitality businesses provide goods and services to their guests and desire to accomplish goals like customer satisfaction, sales of products, etc. in order to have repeat customers and a successful business. Different ontologies can be created. In one or more embodiments, the categories described above for hotel services can be used in the creation of various ontologies for hospitality environments.

In operation, the formerly schemaless data is collected from the hospitality environment and is mapped to the ontology created for the hospitality environment. From the map, a node relationship model is built. Each node has edges and weights. Similarity models are built based on node edges and weights all resulting from the data that's been collected and mapped onto the ontology. The AI algorithm processes the data that's been mapped to the ontology. The small circles represent nodes, the larger circles represent similarity maps and the overlapping areas of the similarity maps represent areas where the nodes are more similar. The similarity maps feed the Knowledge Graph and the Social Graph. The Interest Graph is derived from the Knowledge Graph and the Social Graph. All three Graphs are used to produce the AI outputs. In the context of the Hotel Services Artificial Intelligence (HSAI) system described herein, some outputs can drive actions including, not limited to whether to offer products for purchase to a particular customer, whether to suggest a dinner menu item to a particular customer, etc. Sometimes the AI Output is passed to hotel management for final decision on whether to take a particular action.

The process described above usually proceeds in a continuous fashion where the collection and analysis of data is ongoing. Thus, the AI output is dynamic and is informed by the data collected as a function of time.

In various embodiments, the descriptions provided herein enable interactive devices to provide multiple functions to users. These multiple functions enable more efficient parallel processing by people when at home, away from home, and when in various hospitality environments and when in environments associated with buildings.

For purposes of discussing and understanding the different embodiments, it is to be understood that various terms are used by those knowledgeable in the art to describe techniques and approaches. Furthermore, in the description, for purposes of explanation, numerous specific details are set forth in order to provide a thorough understanding of an embodiment. It will be evident, however, to one of ordinary skill in the art that an embodiment may be practiced without these specific details. In some instances, well-known structures and devices are shown in block diagram form, rather than in detail, in order to avoid obscuring various embodiments. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), dynamic random access memories (DRAM), electrically programmable read-only memories (EPROM)s, electrically erasable programmable read-only memories (EEPROMs), FLASH memories, magnetic or optical cards, RAID, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the embodiments can be implemented in hard-wired circuitry, by programming a general-purpose processor, or by any combination of hardware and software. One of ordinary skill in the art will immediately appreciate that the embodiments can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The embodiments can also be practiced in distributed computing environments where tasks are performed by remote processing devices that are linked through a communications network.

The methods herein may be implemented using computer software. If written in a programming language conforming to a recognized standard, sequences of instructions designed to implement the methods can be compiled for execution on a variety of hardware platforms and for interface to a variety of operating systems. In addition, the embodiments are not described with reference to any particular programming language. It will be appreciated that a variety of programming languages may be used to implement the teachings of the embodiments as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical representation in at least hardware and/or software (such as a computer system in which the techniques of the present invention may be practiced as well as implemented as an embodiment).

Non-transitory machine-readable media is understood to include any mechanism for storing information (such as program code, etc.) in a form readable by a machine (e.g., a computer). For example, a machine-readable medium, synonymously referred to as a computer-readable medium, includes read only memory (ROM); random access memory (RAM); magnetic disk storage media; optical storage media; flash memory devices; except electrical, optical, acoustical or other forms of transmitting information via propagated signals (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

While the invention has been described in terms of several embodiments, those of skill in the art will recognize that the invention is not limited to the embodiments described, but can be practiced with modification and alteration within the spirit and scope of the appended claims. The description is thus to be regarded as illustrative instead of limiting.

What is claimed is:

1. A method to personalize a user's stay at a hospitality environment using a hotel services artificial intelligence (HSAI) system, comprising:
receiving acoustic signals from the user, wherein the acoustic signals pertain to the user's stay at the hospitality environment;
transforming the acoustic signals into data;
transmitting the data to a voice-to-text conversion system over a network, to generate information from the data;
creating a specific hospitality environment ontology for the hospitality environment, the specific hospitality environment ontology enables an artificial intelligence algorithm to learn about the user within a context of the hospitality environment;
generating a customized response for the user, the customized response is generated by the HSAI system using the information, relevant data, and the artificial intelligence algorithm;
transmitting the customized response to a hotel information system (HIS); and
sending, with the HIS, a customized communication to the user based on the customized response.

2. A computer readable medium containing executable computer program instructions, which when executed by a data processing system, cause the data processing system to perform a process comprising:
receiving information resulting from a voice-to-text conversion process applied to acoustic signals uttered by a user, the acoustic signals pertain to the user's stay at a hospitality environment;
creating a specific hospitality environment ontology for the hospitality environment, the specific hospitality environment ontology enables an artificial intelligence algorithm to learn about the user within a context of the hospitality environment;
generating a customized response for the user, the customized response is generated by the hotel services artificial intelligence (HSAI) system using the information, relevant data, and the artificial intelligence algorithm;
transmitting the customized response to a hotel information system (HIS); and
sending, with the HIS, a customized communication to the user based on the customized response.

3. A system to personalize a user's stay at a hospitality environment using a hotel services artificial intelligence (HSAI) system, comprising:
a mirror, the mirror is configured to receive acoustic signals uttered by a user;
a specific hospitality environment ontology for the hospitality environment, the specific hospitality environment ontology enables an artificial intelligence algorithm to learn about the user within a context of the hospitality environment;
a data processing system, the data processing system is configured to process information and data, and
a computer readable medium containing executable computer program instructions, which when executed by the data processing system, cause the data processing system to perform a process comprising:
receiving information resulting from a voice-to-text conversion process applied to acoustic signals uttered by the user and received by the mirror, the acoustic signals pertain to the user's stay at the hospitality environment;
generating a customized response for the user, the customized response is generated by the HSAI system using the information, relevant data, and the artificial intelligence algorithm;
transmitting the customized response to a hotel information system (HIS); and sending, with the HIS, a customized communication to the user based on the customized response.

4. The method of claim 1, wherein the acoustic signals from the user convey a question about hospitality services at the hospitality environment and the customized communication is responsive to the question.

5. The method of claim 4, wherein the question, further comprising:
requesting suggestions for entertainment provided by the hospitality environment, the relevant data includes data from at least one prior interaction between the user and the hospitality environment, the relevant data is used in the process to learn about the user's preferences and the user's preferences are used in the generating.

6. The method of claim 1, wherein the acoustic signals from the user convey a question about purchasing goods at the hospitality environment and the customized communication is responsive to the question.

7. The method of claim 6, wherein the question, further comprising:
requesting suggestions for purchasing goods used within the hospitality environment, the relevant data includes data from at least one prior interaction between the user and the hospitality environment, the relevant data is used in the process to learn about the user's preferences and the user's preferences are used in the generating.

8. The computer readable medium of claim 2, wherein the acoustic signals from the user convey a question about hospitality services at the hospitality environment and the customized communication is responsive to the question.

9. The computer readable medium of claim 8, wherein the question, further comprising:
requesting suggestions for entertainment provided by the hospitality environment, the relevant data includes data from at least one prior interaction between the user and the hospitality environment, the relevant data is used in the process to learn about the user's preferences and the user's preferences are used in the generating.

10. The computer readable medium of claim 2, wherein the acoustic signals from the user convey a question about purchasing goods at the hospitality environment and the customized communication is responsive to the question.

11. The computer readable medium of claim 10, wherein the question, further comprising:
requesting suggestions for purchasing goods used within the hospitality environment, the relevant data includes data from at least one prior interaction between the user and the hospitality environment, the relevant data is used in the process to learn about the user's preferences and the user's preferences are used in the generating.

12. The system of claim 3, wherein the acoustic signals from the user convey a question about hospitality services at the hospitality environment and the customized communication is responsive to the question.

13. The system of claim 12, wherein the question, further comprising:
requesting suggestions for entertainment provided by the hospitality environment, the relevant data includes data from at least one prior interaction between the user and the hospitality environment, the relevant data is used in the process to learn about the user's preferences and the user's preferences are used in the generating.

14. The system of claim 3, wherein the acoustic signals from the user convey a question about purchasing goods at the hospitality environment and the customized communication is responsive to the question.

15. The system of claim 14, wherein the question, further comprising:
requesting suggestions for purchasing goods used within the hospitality environment, the relevant data includes data from at least one prior interaction between the user and the hospitality environment, the relevant data is used in the process to learn about the user's preferences and the user's preferences are used in the generating.

16. The method of claim 1, wherein the relevant data includes data from at least one previous interaction the user had with the hospitality environment.

17. The computer readable medium of claim 2, wherein the relevant data includes data from at least one previous interaction the user had with the hospitality environment.

18. The system of claim 3, wherein the relevant data includes data from at least one previous interaction the user had with the hospitality environment.

19. The method of claim 1, the artificial intelligence algorithm further comprising:
mapping the information and relevant data onto the specific hospitality environment ontology;
creating similarity models from the information mapped onto the specific hospitality environment ontology;
providing input to a knowledge graph and a social graph from the similarity models;
deriving an interest graph from the knowledge graph and the social graph; and
producing an artificial intelligence output, the producing uses the knowledge graph, the interest graph, and the social graph, wherein the customized response is derived from the artificial intelligence output.

20. The method of claim 19, wherein the specific hospitality environment ontology is based on the hospitality environment's business activity and performance metrics.

21. The method of claim 20, wherein the generating proceeds continuously making the artificial intelligence output dynamic as it is informed by data collected as a function of time.

22. The computer readable medium of claim 2, the artificial intelligence algorithm further comprising:
mapping the information and relevant data onto the specific hospitality environment ontology;
creating similarity models from the information mapped onto the specific hospitality environment ontology;
providing input to a knowledge graph and a social graph from the similarity models;
deriving an interest graph from the knowledge graph and the social graph; and
producing an artificial intelligence output, the producing uses the knowledge graph, the interest graph, and the social graph, wherein the customized response is derived from the artificial intelligence output.

23. The computer readable medium of claim 22, wherein the specific hospitality environment ontology is based on the hospitality environment's business activity and performance metrics.

24. The computer readable medium of claim 23, wherein the generating proceeds continuously making the artificial intelligence output dynamic as it is informed by data collected as a function of time.

25. The system of claim 3, the artificial intelligence algorithm further comprising:
mapping the information and relevant data onto the specific hospitality environment ontology;
creating similarity models from the information mapped onto the specific hospitality environment ontology;

providing input to a knowledge graph and a social graph from the similarity models;

deriving an interest graph from the knowledge graph and the social graph; and producing an artificial intelligence output, the producing uses the knowledge graph, the interest graph, and the social graph, wherein the customized response is derived from the artificial intelligence output.

26. The system of claim 25, wherein the specific hospitality environment ontology is based on the hospitality environment's business activity and performance metrics.

27. The system of claim 26, wherein the generating proceeds continuously making the artificial intelligence output dynamic as it is informed by data collected as a function of time.

* * * * *